(12) United States Patent
Bradley et al.

(10) Patent No.: US 9,235,833 B2
(45) Date of Patent: Jan. 12, 2016

(54) INTEROPERABLE SYSTEMS AND METHODS FOR PEER-TO-PEER SERVICE ORCHESTRATION

(75) Inventors: William Bradley, Newark, DE (US); David Maher, Livermore, CA (US); Gilles Boccon-Gibod, Los Altos, CA (US)

(73) Assignee: Intertrust Technologies Corporation, Sunnyvale, CA (US)

(*) Notice: Subject to any disclaimer, the term of this patent is extended or adjusted under 35 U.S.C. 154(b) by 392 days.

(21) Appl. No.: 12/617,164

(22) Filed: Nov. 12, 2009

(65) Prior Publication Data

US 2010/0131412 A1 May 27, 2010

Related U.S. Application Data

(60) Division of application No. 11/829,751, filed on Jul. 27, 2007, which is a continuation of application No. 11/804,667, filed on May 17, 2007, which is a continuation of application No. 10/863,551, filed on Jun. 7, 2004.

(Continued)

(51) Int. Cl.
*G06Q 20/00* (2012.01)
*G06Q 20/12* (2012.01)
(Continued)

(52) U.S. Cl.
CPC ............ *G06Q 20/1235* (2013.01); *G06F 21/10* (2013.01); *H04L 9/0822* (2013.01);
(Continued)

(58) Field of Classification Search
CPC ..... G06Q 10/10; G06Q 20/202; G06Q 30/00; G06Q 30/06; G06Q 10/06; G06Q 20/341; G06Q 20/357; G06Q 20/35765; G06Q 20/3674; G06Q 20/3821; G06Q 20/40975; G06Q 2220/18; G06Q 30/02; G06Q 50/18; G06Q 50/184; G06Q 20/1235; G06F 21/10; H04L 2209/603; H04L 2463/101; H04L 9/0822; H04L 63/0428; H04L 9/0825; H04L 2209/60; H04N 21/4627; H04N 21/2541; H04N 21/8355; H04N 21/4405; H04N 7/1675
USPC .................................................... 705/50–79
See application file for complete search history.

(56) References Cited

U.S. PATENT DOCUMENTS 4,827,508 A 5/1989 Shear
4,977,594 A 12/1990 Shear
(Continued)

FOREIGN PATENT DOCUMENTS

CN 1274461 A 11/2000
CN 1371056 A 9/2002
(Continued)

OTHER PUBLICATIONS

Office Action dated Jan. 4, 2008 issued in related U.S. Appl. No. 10/863,551, filed Jun. 7, 2004.
(Continued)

*Primary Examiner* — Calvin L Hewitt, II
*Assistant Examiner* — Mohammad A Nilforoush
(74) *Attorney, Agent, or Firm* — Finnegan, Henderson, Farabow, Garrett & Dunner, LLP

(57) ABSTRACT

Systems and methods are described for performing policy-managed, peer-to-peer service orchestration in a manner that supports the formation of self-organizing service networks that enable rich media experiences. In one embodiment, services are distributed across peer-to-peer communicating nodes, and each node provides message routing and orchestration using a message pump and workflow collator. Distributed policy management of service interfaces helps to provide trust and security, supporting commercial exchange of value. Peer-to-peer messaging and workflow collation allow services to be dynamically created from a heterogeneous set of primitive services. The shared resources are services of many different types, using different service interface bindings beyond those typically supported in a web service deployments built on UDDI, SOAP, and WSDL. In a preferred embodiment, a media services framework is provided that enables nodes to find one another, interact, exchange value, and cooperate across tiers of networks from WANs to PANs.

29 Claims, 34 Drawing Sheets

Related U.S. Application Data

(60) Provisional application No. 60/476,357, filed on Jun. 5, 2003, provisional application No. 60/504,524, filed on Sep. 15, 2003.

(51) Int. Cl.
*G06F 21/10* (2013.01)
*H04L 29/06* (2006.01)
*H04L 9/08* (2006.01)
*H04L 9/32* (2006.01)
*H04L 29/08* (2006.01)

(52) U.S. Cl.
CPC ............ *H04L9/0861* (2013.01); *H04L 9/3263* (2013.01); *H04L 63/0428* (2013.01); *H04L 63/061* (2013.01); *H04L 63/08* (2013.01); *H04L 63/0823* (2013.01); *G06F 2221/0759* (2013.01); *G06F 2221/0786* (2013.01); *G06F 2221/0788* (2013.01); *G06Q 2220/10* (2013.01); *G06Q 2220/18* (2013.01); *H04L 9/0825* (2013.01); *H04L 9/3271* (2013.01); *H04L 63/20* (2013.01); *H04L 67/16* (2013.01); *H04L 2209/603* (2013.01); *H04L 2463/101* (2013.01); *H04L 2463/102* (2013.01)

(56) References Cited

U.S. PATENT DOCUMENTS

| | | | |
|---|---|---|---|
| 5,050,213 A | 9/1991 | Shear | |
| 5,410,598 A | 4/1995 | Shear | |
| 5,414,845 A | 5/1995 | Behm et al. | |
| 5,530,235 A | 6/1996 | Stefik et al. | |
| 5,534,975 A | 7/1996 | Stefik et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,673,315 A | 9/1997 | Wolf | |
| 5,715,403 A | 2/1998 | Stefik | |
| 5,765,152 A | 6/1998 | Erickson | |
| 5,774,652 A | 6/1998 | Smith | |
| 5,825,883 A | 10/1998 | Archibald et al. | |
| 5,892,900 A * | 4/1999 | Ginter et al. | 726/26 |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,937,041 A | 8/1999 | Cardillo et al. | |
| 5,940,504 A | 8/1999 | Griswold | |
| 5,941,951 A | 8/1999 | Day et al. | |
| 5,943,422 A | 8/1999 | Van Wie et al. | |
| 5,949,876 A | 9/1999 | Ginter et al. | |
| 5,968,175 A | 10/1999 | Morishita et al. | |
| 5,982,891 A | 11/1999 | Ginter et al. | |
| 5,991,399 A | 11/1999 | Graunke et al. | |
| 5,999,949 A | 12/1999 | Crandall | |
| 6,006,332 A | 12/1999 | Rabne et al. | |
| 6,023,765 A | 2/2000 | Kuhn | |
| 6,044,469 A | 3/2000 | Horstmann | |
| 6,052,780 A | 4/2000 | Glover | |
| 6,112,181 A | 8/2000 | Shear et al. | |
| 6,119,108 A | 9/2000 | Holmes et al. | |
| 6,138,119 A | 10/2000 | Hall et al. | |
| 6,157,721 A | 12/2000 | Shear et al. | |
| 6,185,683 B1 | 2/2001 | Ginter et al. | |
| 6,188,995 B1 | 2/2001 | Garst et al. | |
| 6,223,291 B1 | 4/2001 | Puhl et al. | |
| 6,226,618 B1 | 5/2001 | Downs et al. | |
| 6,233,577 B1 | 5/2001 | Ramasubramani et al. | |
| 6,233,608 B1 | 5/2001 | Laursen et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,363,488 B1 | 3/2002 | Ginter et al. | |
| 6,389,402 B1 | 5/2002 | Ginter et al. | |
| 6,427,140 B1 | 7/2002 | Ginter et al. | |
| 6,449,367 B2 | 9/2002 | Van Wie et al. | |
| 6,618,484 B1 | 9/2003 | Weber et al. | |
| 6,640,304 B2 | 10/2003 | Ginter et al. | |
| 6,658,568 B1 | 12/2003 | Ginter et al. | |
| 6,668,325 B1 | 12/2003 | Collberg et al. | |
| 6,735,253 B1 | 5/2004 | Chang et al. | |
| 6,769,019 B2 | 7/2004 | Ferguson | |
| 6,772,340 B1 | 8/2004 | Peinado et al. | |
| 6,785,815 B1 | 8/2004 | Serret-Avila et al. | |
| 6,807,534 B1 | 10/2004 | Erickson | |
| 6,824,051 B2 | 11/2004 | Reddy | |
| 6,832,316 B1 | 12/2004 | Sibert | |
| 6,842,863 B1 | 1/2005 | Fox et al. | |
| 6,850,252 B1 | 2/2005 | Hoffberg | |
| 6,883,100 B1 | 4/2005 | Elley et al. | |
| 6,928,545 B1 | 8/2005 | Litai et al. | |
| 6,934,702 B2 | 8/2005 | Faybishenko et al. | |
| 6,959,290 B2 | 10/2005 | Stefik et al. | |
| 6,961,858 B2 | 11/2005 | Fransdonk | |
| 6,976,164 B1 | 12/2005 | King et al. | |
| 6,985,953 B1 | 1/2006 | Sandhu et al. | |
| 6,996,544 B2 | 2/2006 | Sellars et al. | |
| 7,036,011 B2 | 4/2006 | Grimes et al. | |
| 7,089,594 B2 | 8/2006 | Lal et al. | |
| 7,107,449 B2 | 9/2006 | Mont et al. | |
| 7,113,912 B2 | 9/2006 | Stefik et al. | |
| 7,171,558 B1 | 1/2007 | Mourad et al. | |
| 7,203,966 B2 | 4/2007 | Abburi et al. | |
| 7,210,039 B2 | 4/2007 | Rodgers et al. | |
| 7,272,228 B2 | 9/2007 | Atkin et al. | |
| 7,308,717 B2 | 12/2007 | Koved et al. | |
| 7,356,690 B2 | 4/2008 | Benantar | |
| 7,359,517 B1 | 4/2008 | Rowe | |
| 7,389,270 B2 | 6/2008 | Stefik et al. | |
| 7,389,273 B2 | 6/2008 | Irwin et al. | |
| 7,484,103 B2 | 1/2009 | Woo et al. | |
| 7,487,363 B2 | 2/2009 | Alve et al. | |
| 7,493,289 B2 | 2/2009 | Verosub et al. | |
| 7,496,757 B2 | 2/2009 | Abbott et al. | |
| 7,509,492 B2 * | 3/2009 | Boyen et al. | 713/165 |
| 7,516,331 B2 | 4/2009 | Jin et al. | |
| 7,549,172 B2 | 6/2009 | Tokutani et al. | |
| 7,558,759 B2 | 7/2009 | Valenzuela et al. | |
| 7,574,219 B2 | 8/2009 | Rofheart et al. | |
| 7,587,368 B2 | 9/2009 | Felsher | |
| 7,590,863 B2 | 9/2009 | Lambert | |
| 7,610,011 B2 | 10/2009 | Albrett | |
| 7,631,318 B2 | 12/2009 | Cottrille et al. | |
| 7,711,647 B2 | 5/2010 | Gunaseelan et al. | |
| 8,234,387 B2 | 7/2012 | Bradley et al. | |
| 8,302,178 B2 | 10/2012 | Camiel | |
| 8,656,178 B2 | 2/2014 | Foster et al. | |
| 2001/0001147 A1 | 5/2001 | Hutchison et al. | |
| 2001/0033554 A1 | 10/2001 | Ayyagari et al. | |
| 2001/0042043 A1 | 11/2001 | Shear et al. | |
| 2001/0051996 A1 | 12/2001 | Cooper et al. | |
| 2002/0002674 A1 | 1/2002 | Grimes et al. | |
| 2002/0010679 A1 | 1/2002 | Felsher | |
| 2002/0023214 A1 | 2/2002 | Shear et al. | |
| 2002/0044657 A1 | 4/2002 | Asano et al. | |
| 2002/0048369 A1 | 4/2002 | Ginter et al. | |
| 2002/0059425 A1 | 5/2002 | Belfiore et al. | |
| 2002/0087859 A1 | 7/2002 | Weeks et al. | |
| 2002/0108050 A1 | 8/2002 | Raley et al. | |
| 2002/0112171 A1 | 8/2002 | Ginter et al. | |
| 2002/0144108 A1 | 10/2002 | Benantar | |
| 2002/0144283 A1 | 10/2002 | Headings et al. | |
| 2002/0152173 A1 | 10/2002 | Rudd | |
| 2002/0157002 A1 | 10/2002 | Messerges et al. | |
| 2002/0161996 A1 | 10/2002 | Koved et al. | |
| 2002/0164047 A1 | 11/2002 | Yuval | |
| 2002/0194081 A1 | 12/2002 | Perkowski | |
| 2003/0009423 A1 | 1/2003 | Wang et al. | |
| 2003/0009681 A1 | 1/2003 | Harada et al. | |

(56) References Cited

U.S. PATENT DOCUMENTS

| | | |
|---|---|---|
| 2003/0023856 A1 | 1/2003 | Horne et al. |
| 2003/0028488 A1 | 2/2003 | Mohammed et al. |
| 2003/0037139 A1 | 2/2003 | Shteyn |
| 2003/0041239 A1 | 2/2003 | Shear et al. |
| 2003/0046244 A1 | 3/2003 | Shear et al. |
| 2003/0051134 A1 | 3/2003 | Gupta |
| 2003/0055878 A1 | 3/2003 | Fletcher et al. |
| 2003/0061404 A1 | 3/2003 | Atwal et al. |
| 2003/0065956 A1 | 4/2003 | Belapurkar et al. |
| 2003/0069748 A1 | 4/2003 | Shear et al. |
| 2003/0069749 A1 | 4/2003 | Shear et al. |
| 2003/0078891 A1 | 4/2003 | Capitant |
| 2003/0079133 A1 | 4/2003 | Breiter et al. |
| 2003/0084003 A1 | 5/2003 | Pinkas et al. |
| 2003/0084172 A1 | 5/2003 | deJong et al. |
| 2003/0105721 A1 | 6/2003 | Ginter et al. |
| 2003/0105864 A1 | 6/2003 | Mulligan et al. |
| 2003/0126086 A1 | 7/2003 | Safadi |
| 2003/0131251 A1 | 7/2003 | Fetkovich |
| 2003/0135628 A1 | 7/2003 | Fletcher et al. |
| 2003/0140119 A1 | 7/2003 | Acharya et al. |
| 2003/0144859 A1 | 7/2003 | Hsu et al. |
| 2003/0145044 A1 | 7/2003 | Raivisto et al. |
| 2003/0145093 A1 | 7/2003 | Oren et al. |
| 2003/0159033 A1* | 8/2003 | Ishiguro .................. 713/156 |
| 2003/0167236 A1 | 9/2003 | Stefik et al. |
| 2003/0172127 A1 | 9/2003 | Northrup et al. |
| 2003/0177187 A1 | 9/2003 | Levine et al. |
| 2003/0182235 A1 | 9/2003 | Wang et al. |
| 2003/0184431 A1 | 10/2003 | Lundkvist |
| 2003/0194093 A1* | 10/2003 | Evans et al. .................. 380/282 |
| 2003/0207687 A1 | 11/2003 | Svedevall et al. |
| 2003/0220835 A1 | 11/2003 | Barnes |
| 2003/0220880 A1 | 11/2003 | Lao et al. |
| 2003/0225701 A1 | 12/2003 | Lee et al. |
| 2003/0226012 A1 | 12/2003 | Asokan et al. |
| 2003/0236978 A1 | 12/2003 | Evans et al. |
| 2004/0003139 A1 | 1/2004 | Cottrille et al. |
| 2004/0003270 A1 | 1/2004 | Bourne et al. |
| 2004/0003398 A1 | 1/2004 | Donian et al. |
| 2004/0024688 A1 | 2/2004 | Bi et al. |
| 2004/0054630 A1 | 3/2004 | Ginter et al. |
| 2004/0054894 A1 | 3/2004 | Lambert |
| 2004/0054912 A1 | 3/2004 | Adent et al. |
| 2004/0059951 A1 | 3/2004 | Pinkas et al. |
| 2004/0073813 A1 | 4/2004 | Pinkas et al. |
| 2004/0088175 A1 | 5/2004 | Messerges et al. |
| 2004/0088541 A1* | 5/2004 | Messerges et al. ............ 713/156 |
| 2004/0098580 A1 | 5/2004 | DeTreville |
| 2004/0103305 A1 | 5/2004 | Ginter et al. |
| 2004/0103312 A1 | 5/2004 | Messerges et al. |
| 2004/0107356 A1 | 6/2004 | Shamoon et al. |
| 2004/0107368 A1 | 6/2004 | Colvin |
| 2004/0117490 A1 | 6/2004 | Peterka et al. |
| 2004/0123104 A1 | 6/2004 | Boyen et al. |
| 2004/0123129 A1 | 6/2004 | Ginter et al. |
| 2004/0128499 A1 | 7/2004 | Peterka et al. |
| 2004/0128546 A1 | 7/2004 | Blakley et al. |
| 2004/0133793 A1 | 7/2004 | Ginter et al. |
| 2004/0139312 A1 | 7/2004 | Medvinsky |
| 2004/0143546 A1 | 7/2004 | Wood et al. |
| 2004/0143736 A1 | 7/2004 | Cross et al. |
| 2004/0158709 A1 | 8/2004 | Narin et al. |
| 2004/0158731 A1 | 8/2004 | Narin et al. |
| 2004/0162870 A1 | 8/2004 | Matsuzaki et al. |
| 2004/0205028 A1 | 10/2004 | Verosub et al. |
| 2004/0205333 A1 | 10/2004 | Bjorkengren |
| 2004/0205765 A1 | 10/2004 | Beringer et al. |
| 2004/0216127 A1 | 10/2004 | Datta et al. |
| 2004/0249768 A1 | 12/2004 | Kontio et al. |
| 2004/0254851 A1 | 12/2004 | Himeno et al. |
| 2004/0267965 A1 | 12/2004 | Vasudevan et al. |
| 2005/0004875 A1 | 1/2005 | Kontio et al. |
| 2005/0008163 A1 | 1/2005 | Leser et al. |
| 2005/0022227 A1 | 1/2005 | Shen et al. |
| 2005/0027871 A1 | 2/2005 | Bradley et al. |
| 2005/0050332 A1 | 3/2005 | Serret-Avila et al. |
| 2005/0060560 A1 | 3/2005 | Sibert |
| 2005/0060584 A1 | 3/2005 | Ginter et al. |
| 2005/0078822 A1 | 4/2005 | Shavit et al. |
| 2005/0086501 A1 | 4/2005 | Woo et al. |
| 2005/0102513 A1 | 5/2005 | Alve |
| 2005/0108555 A1 | 5/2005 | Sibert |
| 2005/0108707 A1 | 5/2005 | Taylor et al. |
| 2005/0119977 A1 | 6/2005 | Raciborski |
| 2005/0177516 A1 | 8/2005 | Vandewater et al. |
| 2005/0192902 A1 | 9/2005 | Williams |
| 2005/0204391 A1 | 9/2005 | Hunleth et al. |
| 2005/0228858 A1 | 10/2005 | Mizutani et al. |
| 2005/0234735 A1 | 10/2005 | Williams |
| 2005/0235361 A1 | 10/2005 | Alkove et al. |
| 2005/0262520 A1 | 11/2005 | Burnett et al. |
| 2005/0262568 A1 | 11/2005 | Hansen et al. |
| 2005/0273629 A1 | 12/2005 | Abrams et al. |
| 2005/0278256 A1 | 12/2005 | Vandewater et al. |
| 2005/0278259 A1 | 12/2005 | Gunaseelan et al. |
| 2006/0015580 A1 | 1/2006 | Gabriel et al. |
| 2006/0020784 A1 | 1/2006 | Jonker et al. |
| 2006/0021065 A1 | 1/2006 | Kamperman et al. |
| 2006/0036554 A1 | 2/2006 | Schrock et al. |
| 2006/0041642 A1 | 2/2006 | Rosner et al. |
| 2006/0050870 A1 | 3/2006 | Kimmel et al. |
| 2006/0129818 A1 | 6/2006 | Kim et al. |
| 2006/0136718 A1 | 6/2006 | Moreillon |
| 2006/0150257 A1 | 7/2006 | Leung et al. |
| 2006/0173985 A1 | 8/2006 | Moore |
| 2006/0174194 A1 | 8/2006 | Miyazawa |
| 2006/0248340 A1 | 11/2006 | Lee et al. |
| 2006/0294580 A1 | 12/2006 | Yeh |
| 2007/0074270 A1 | 3/2007 | Meehan et al. |
| 2007/0083757 A1 | 4/2007 | Nakano et al. |
| 2007/0098162 A1 | 5/2007 | Shin |
| 2007/0192480 A1 | 8/2007 | Han et al. |
| 2007/0300070 A1 | 12/2007 | Shen-Orr et al. |
| 2008/0133417 A1 | 6/2008 | Robinson |
| 2009/0007198 A1 | 1/2009 | Lavender et al. |
| 2009/0031038 A1 | 1/2009 | Shukla et al. |
| 2009/0112867 A1 | 4/2009 | Roy et al. |
| 2010/0070774 A1 | 3/2010 | Bradley et al. |

FOREIGN PATENT DOCUMENTS

| | | |
|---|---|---|
| CN | 1396568 A | 2/2003 |
| EP | 0668695 | 8/1995 |
| EP | 0 715 247 | 6/1996 |
| EP | 0840194 A2 | 6/1998 |
| EP | 1 191 422 | 3/2002 |
| EP | 1724699 | 11/2006 |
| JP | 2001-290724 | 10/2001 |
| JP | 2003-122635 | 4/2003 |
| JP | 2012-53913 | 3/2012 |
| TW | 1229559 | 3/2005 |
| TW | 200512592 A | 4/2005 |
| WO | WO 96/27155 | 9/1996 |
| WO | WO 97/41654 | 11/1997 |
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 99/01815 | 1/1999 |
| WO | WO 99/05600 | 2/1999 |
| WO | WO 99/24928 | 5/1999 |
| WO | WO 99/48296 | 9/1999 |
| WO | WO 00/75925 | 12/2000 |
| WO | WO 01/06374 | 1/2001 |
| WO | WO 01/09702 | 2/2001 |
| WO | WO 01/10076 | 2/2001 |
| WO | WO 01/80472 | 10/2001 |
| WO | WO 01/86462 | 11/2001 |
| WO | WO 02/078238 | 10/2002 |
| WO | WO 02/084975 | 10/2002 |
| WO | WO 02/093290 | 11/2002 |
| WO | WO 03/034408 | 4/2003 |
| WO | WO 03/044716 | 5/2003 |

(56) References Cited

FOREIGN PATENT DOCUMENTS

| WO | WO 2004/008297 | 1/2004 |
|---|---|---|
| WO | WO 2004/027588 | 4/2004 |
| WO | WO 2004/030311 | 4/2004 |
| WO | WO 2004/038568 | 5/2004 |
| WO | WO 2004/055650 | 7/2004 |
| WO | WO 2004/059451 | 7/2004 |
| WO | WO 2004/070538 | 8/2004 |
| WO | WO 2005/017654 A2 | 2/2005 |
| WO | WO 2005/055009 | 6/2005 |
| WO | WO 2006/118391 | 11/2006 |
| WO | WO 2007/043015 | 4/2007 |

OTHER PUBLICATIONS

Office Action dated Jun. 28, 2008 issued in related U.S. Appl. No. 10/863,551, filed Jun. 7, 2004.
Office Action dated Apr. 14, 2009 issued in related U.S. Appl. No. 10/863,551, filed Jun. 7, 2004.
Office Action dated Dec. 8, 2009 issued in related U.S. Appl. No. 10/863,551, filed Jun. 7, 2004.
Office Action dated Sep. 11, 2009 issued in related U.S. Appl. No. 11/804,667, filed May 17, 2007.
Office Action dated Jan. 6, 2010 issued in related U.S. Appl. No. 11/829,751, filed Jul. 27, 2007.
Office Action dated Feb. 3, 2010 issued in related U.S. Appl. No. 11/894,624, filed Aug. 20, 2007.
Office Action dated Oct. 23, 2008 issued in related U.S. Appl. No. 11/894,372, filed Aug. 20, 2007.
Office Action dated Jun. 10, 2009 issued in related U.S. Appl. No. 11/894,372, filed Aug. 20, 2007.
Office Action dated Nov. 13, 2009 issued in related U.S. Appl. No. 11/894,372, filed Aug. 20, 2007.
Office Action dated Nov. 14, 2008 issued in related U.S. Appl. No. 11/929,937, filed Oct. 30, 2007.
International Search Report mailed Feb. 1, 2006 issued in related International Application No. PCT/US04/18120.
International Preliminary Examination Report mailed Jul. 17, 2006, issued in related International Application No. PCT/US04/18120.
Examiner's First Report dated Mar. 30, 2009 issued in related Australian Application No. 2004264582.
English translation of Office Action issued Apr. 3, 2009 issued in related Chinese Patent Application No. 200480021795.9.
English translation of Office Action issued Oct. 15, 2009 issued in related Chinese Patent Application No. 200480021795.9.
Supplementary European Search Report completed Apr. 14, 2008 issued in related European Application No. 04776350.3.
Examination Report dated Sep. 17, 2009 issued in related European Application No. 04776350.3.
English translation of Notice of Reasons for Rejection mailed Jul. 14, 2009 issued in related Japanese Patent Application No. 2006-509076.
English translation of Notice of Grounds for Rejection issued Feb. 10, 2010 issued in related Korean Application No. 2005-7023383.
English translation of Official Action issued in related Eurasian Application No. 200700510/27.
Chinnici, Roberto et al., "Web Services Description Language (WSDL) Version 1.2, Part 1: Core Language", W3C Working Draft, Jun. 11, 2003, 78 pages.
Curbera et al., "Using WSDL in a UDDI Registry, Version 1.07," UDDI Best Practice, found online at http://www.uddi.org/pubs/wsdlbestpractices-V1.07-Open_20020521.pdf, May 21, 2002.
Erickson, J.S., "Toward an Open Rights Management Interoperability Framework", Yankee Book Peddler, Inc. Jun. 24, 1999.
Erikson, J.S., "A Digital Object Approach to Interoperable Rights Management: Fine-grained Policy Enforcement Enabled by a Digital Object Infrastructure," D-Lib Magazine, Jun. 2001, 18 pages, vol. 7, No. 6, available at http://www.dlib.org/dlib/june01/erickson/06erickson.html.
Gudgin, M. et al., "SOAP Version 1.2 Part 2: Adjunts, W3C Recommendation Jun. 24, 2003," W3C, pp. 1-58, from http://www.w3.org/TR/2003/REC-soap12-part2-20030624/ on Nov. 4, 2004.
http://en.wikipedia.org/wiki/Authorization_Certificate, Sep. 27, 2008.
http://en.wikipedia.org/wiki/Public_key_Certificate, Sep. 27, 2008.
Peltz, C., "web services orchestration: a review of emerging technologies, tools, and standards." Hewlett Pachard, Co., Jan. 2003: pp. 1-19.
Sibert, O. et al., "Digibox: A Self-Protecting Container for Information Commerce," Proceedings of the First USENIX Workshop on Electronic Commerce, Jul. 1995, 13 pages, New York, NY.
Sibert, O. et al., "Securing the Content, Not the Wire, for Information Commerce," 1996, 12 pages, InterTrust Technologies Corporation.
Stefik, M., "Introduction to Knowledge Systems, Chapter 7: Classification," 1995, pp. 543-607, Morgan Kaufmann Publishers, Inc., San Francisco, CA.
Stefik, M., "Letting Loose the Light: Igniting Commerce in Electronic Publication," 1994-1995, 37 pages, Xerox PARC, Palo Alto, CA.
Stefik, M., "Letting Loose the Light: Igniting Commerce in Electronic Publication," Internet Dreams: Archetypes, Myths, and Metaphors, 1996, pp. 219-253, Massachusetts Institute of Technology.
Stefik, M., "Trusted Systems," Scientific American, Mar. 1997, pp. 78-81.
Swenson, K., "Process Management Standards Overview," Fujitsu Software Corporation, 26 pages.
Zur Meuhlen, M. et al., "Developing Web Services Choreography Standards—The Case of REST vs. SOAP," Wesley J. Howe School of Technology Management, Stevens Institute of Technology, pp. 1-25.
Office Action dated May 12, 2010 issued in related U.S. Appl. No. 10/863,551, filed Jun. 7, 2004.
International Search Report mailed Aug. 13, 2007, for International Application No. PCT/US2006/040898, filed Oct. 18, 2006.
International Preliminary Report on Patentability issued Apr. 23, 2008, for International Application No. PCT/US2006/040898, filed Oct. 18, 2006.
European Search Report and European Search Opinion completed Jul. 2, 2009, for European Application No. EP09156631.5.
Hancke et al., "An RFID Distance Bounding Protocol," Proceedings of IEEE/Create-Net SecureComm 2005, [Online,] URL:http://www.rfidblog.org.uk/RFIDdistancebound-Securecomm2005.pdf.
Office Action mailed Jan. 13, 2010 for U.S. Appl. No. 11/583,693, filed Oct. 18, 2006.
Office Action dated Apr. 19, 2010 issued in related U.S. Appl. No. 11/804,667, filed May 17, 2007.
Office Action mailed May 12, 2010 issued in related U.S. Appl. No. 10/863,551, filed Jun. 7, 2004.
Office Action mailed Mar. 31, 2010 issued in related U.S. Appl. No. 11/829,805, filed Jul. 27, 2007.
Office Action mailed Feb. 17, 2009 issued in related U.S. Appl. No. 11/583,671, filed Oct. 18, 2006.
Office Action mailed Nov. 24, 2009 issued in related U.S. Appl. No. 11/583,671, filed Oct. 18, 2006.
Bradley et al., "The NEMO P2P Service Orchestration Framework," 37th HICSS, Jan. 5-8, 2004, All pages.
Office Action mailed Nov. 6, 2008 issued in related U.S. Appl. No. 11/583,646, filed Oct. 18, 2006.
Office Action mailed Apr. 10, 2009 issued in related U.S. Appl. No. 11/583,646, filed Oct. 18, 2006.
Office Action mailed Dec. 2, 2009 issued in related U.S. Appl. No. 11/583,646, filed Oct. 18, 2006.
Office Action mailed Feb. 16, 2010 issued in related U.S. Appl. No. 11/583,622, filed Oct. 18, 2006.
Office Action mailed Mar. 15, 2010 issued in related U.S. Appl. No. 11/583,695, filed Oct. 18, 2006.
Office Action mailed Jul. 5, 2007 issued in related U.S. Appl. No. 11/583,527, filed Oct. 18, 2006.
Office Action mailed Jan. 3, 2008 issued in related U.S. Appl. No. 11/583,527, filed Oct. 18, 2006.
Office Action mailed Jun. 13, 2008 issued in related U.S. Appl. No. 11/583,527, filed Oct. 18, 2006.
Advisory Action mailed Oct. 6, 2008 issued in related U.S. Appl. No. 11/583,527, filed Oct. 18, 2006.

(56) References Cited

OTHER PUBLICATIONS

Office Action mailed Mar. 17, 2009 issued in related U.S. Appl. No. 11/583,527, filed Oct. 18, 2006.
Office Action mailed Dec. 29, 2009 issued in related U.S. Appl. No. 11/583,527, filed Oct. 18, 2006.
Examination Report dated Feb. 19, 2010, for European Application No. EP09156631.5.
Office Action mailed Jun. 24, 2010 issued in related U.S. Appl. No. 12/459,490, filed Jun. 30, 2009.
European Search Report and European Search Opinion completed Mar. 1, 2010, for European Application No. EP09156702.4.
European Search Report and European Search Opinion completed Feb. 24, 2010, for European Application No. EP09156727.1.
Office Action dated Jul. 7, 2010 issued in related U.S. Appl. No. 11/829,751, filed Jul. 27, 2007.
Office Action dated Jul. 8, 2010 issued in related U.S. Appl. No. 12/620,445, filed Nov. 17, 2009.
Office Action dated Jul. 14, 2010 issued in related U.S. Appl. No. 11/583,671, filed Oct. 18, 2006.
White, How Computers Work, Que Corp. Millennium Ed. 1999, All pages.
Smith et al., "Virtual Machines: Versatile Platforms for Systems and Processes," Elsevier Science, May 2005, All pages.
Office Action dated Jul. 20, 2010 issued in related U.S. Appl. No. 11/894,624, filed Aug. 20, 2007.
Interview Summary dated Jul. 20, 2010 issued in related U.S. Appl. No. 11/583,622, filed Oct. 18, 2006.
Office Action dated Jul. 20, 2010 issued in related U.S. Appl. No. 12/620,452, filed Nov. 17, 2009.
Office Action dated Jul. 20, 2010 issued in related U.S. Appl. No. 12/459,491, filed Jun. 30, 2009.
Office Action dated Jul. 22, 2010 issued in related U.S. Appl. No. 11/583,646, filed Oct. 18, 2006.
English language translation of Notice of Grounds for Rejection, issued Jul. 29, 2010 in related Korean Application No. 2010-7007909.
Office Action dated Aug. 3, 2010 issued in related U.S. Appl. No. 11/829,805, filed Jul. 27, 2007.
Office Action dated Apr. 14, 2010 issued in related U.S. Appl. No. 11/583,526, filed Oct. 18, 2006.
Office Action dated Aug. 19, 2010 issued in related U.S. Appl. No. 11/583,527, filed Oct. 18, 2006.
English translation of Notice of Grounds for Rejection issued Aug. 24, 2010 issued in related Korean Application No. 2005-7023383.
English translation of Notice of Reasons for Rejection mailed Aug. 10, 2010 issued in related Japanese Patent Application No. 2006-509076.
English translation of Official Action issued Aug. 3, 2010 in related Eurasian Application No. 200901153.
Office Action mailed Sep. 1, 2010 for U.S. Appl. No. 11/583,693, filed Oct. 18, 2006.
Yamato, "A Method of Service Composition Using Mobile Agent, Multimedia, Distributed, Cooperative and Mobile," (DICOMO 2003) Symposium, IPSJ, vol. 2003, No. 9, pp. 589-592, Jun. 4, 2003.
Examination Report dated Jul. 7, 2010, issued in related Canadian Application No. 2,528,428.
English translation of Office Action issued on Aug. 20, 2010 for related Chinese Application No. 2006-80047769.2.
English translation of Office Action issued on Jul. 15, 2010 for related Eurasian Application No. 2007-00510/31.
Office Action mailed Sep. 21, 2010, issued in related U.S. Appl. No. 11/583,695, filed Oct. 18, 2006.
Office Action mailed Oct. 6, 2010, issued in related U.S. Appl. No. 11/829,774, filed Jul. 27, 2007.
Office Action mailed Oct. 7, 2010 issued in related U.S. Appl. No. 12/622,218, filed Nov. 19, 2009.
European Search Opinion mailed Oct. 19, 2010 for related European Application No. 09156727.1.
European Search Opinion mailed Oct. 19, 2010 for related European Application No. 09156702.4.
Office Action mailed Oct. 27, 2010 issued in related U.S. Appl. No. 11/583,622, filed Oct. 18, 2006.
Office Action dated Nov. 16, 2010 issued in related U.S. Appl. No. 11/583,526, filed Oct. 18, 2006.
Office Action dated Dec. 7, 2010 issued in related U.S. Appl. No. 11/583,671, filed Oct. 18, 2006.
Office Action dated Dec. 21, 2010 issued in related U.S. Appl. No. 10/863,551, filed Jun. 7, 2004.
Office Action dated Jan. 18, 2011 issued in related U.S. Appl. No. 11/829,774, filed Jul. 27, 2007.
Office Action dated Jan. 19, 2011 issued in related U.S. Appl. No. 12/620,445, filed Nov. 17, 2009.
Advisory Action mailed Feb. 11, 2011 issued in related U.S. Appl. No. 11/583,671, filed Oct. 18, 2006.
Advisory Action mailed Feb. 17, 2011 issued in related U.S. Appl. No. 11/583,527, filed Oct. 18, 2006.
Office Action mailed Mar. 8, 2011 issued in related U.S. Appl. No. 10/863,551, filed Jun. 7, 2004.
Office Action mailed Mar. 15, 2011 issued in related U.S. Appl. No. 12/459,490, filed Jun. 30, 2009.
Office Action mailed Mar. 15, 2011 issued in related U.S. Appl. No. 12/620,452, filed Nov. 17, 2009.
Office Action mailed Mar. 24, 2011 issued in related U.S. Appl. No. 12/459,491, filed Jun. 30, 2009.
English translation of Conclusion on Invention mailed Mar. 31, 2011 in related Eurasian Patent Application No. 2009011543.
Examination Report dated Apr. 13, 2011 issued in related European Application No. 06826285.6.
"IBM Cryptolope Live!," General Information Guide, Version 1, pp. 1-36 (1997).
Kaplan, "IBM Cryptolopes™, Super Distribution and Digital Rights Management," retrieved from internet on Mar. 14, 2000: URL:http://www.research.ibm.com/people/k/kaplan/cryptolope-docs/crypap.html (1996).
First Examination Report dated Apr. 4, 2011 issued in related Australian Application No. 2006-304655.
English translation of Notice of Reasons for Rejection mailed Apr. 5, 2011 issued in related Japanese Patent Application No. 2007-320348.
Office Action mailed Apr. 27, 2011 issued in related U.S. Appl. No. 12/622,218, filed Nov. 19, 2009.
Office Action mailed May 23, 2011 issued in related U.S. Appl. No. 11/583,695, filed Oct. 18, 2006.
English translation of Decision on Rejection issued Apr. 25, 2011 in related Chinese Patent Application No. 200480021795.9.
Examination Report dated Apr. 11, 2011 issued in related Australian Patent Application No. 2010212301.
English translation of Notice of Reasons for Rejection mailed Jun. 21, 2011 in related Japanese Patent Application No. 2008-536800.
Examiner Interview Summary mailed Jul. 7, 2011 issued in related U.S. Appl. No. 12/622,218, filed Nov. 19, 2009.
Examination Report mailed Jul. 13, 2011 issued in related European Application No. 04776350.3.
English translation of Decision of Final Rejection mailed Jul. 12, 2011 in related Japanese Application No. 2006-509076.
Office Action mailed Aug. 10, 2011, issued in related U.S. Appl. No. 10/863,551, filed Jun. 7, 2004.
Office Action mailed Sep. 19, 2011, issued in related U.S. Appl. No. 11/583,527, filed Oct. 18, 2006.
English translation of Notice of Grounds for Rejection, issued Sep. 22, 2011, for Korean Application No. 2008-7011852.
Office Action mailed Oct. 7, 2011, issued in related U.S. Appl. No. 11/804,667, filed May 17, 2007.
Office Action mailed Oct. 17, 2011, issued in related U.S. Appl. No. 11/829,837, filed Jul. 27, 2007.
English translation of a Decision of Final Rejection mailed Oct. 25, 2011 in related Japanese Patent Application No. 2007-320348.
Examiner's Answer mailed Nov. 4, 2011 in related U.S. Appl. No. 11/583,693, filed Oct. 18, 2006.
Examiner's Answer mailed Nov. 10, 2011 in related U.S. Appl. No. 11/583,671, filed Oct. 18, 2006.
Examiner's Answer mailed Nov. 9, 2011 in related U.S. Appl. No. 11/583,646, filed Oct. 18, 2006.

(56) References Cited

OTHER PUBLICATIONS

Office Action mailed Nov. 18, 2011 in related U.S. Appl. No. 12/789,004, filed May 27, 2010.
English translation of Decision of Final Rejection mailed Nov. 22, 2011 in related Japanese Patent Application No. 2008-536800.
Office Action mailed Dec. 13, 2011 in related U.S. Appl. No. 12/792,965, filed Jun. 3, 2010.
Office Action mailed Dec. 21, 2011, in related U.S. Appl. No. 11/829,809, filed Jul. 27, 2007.
English translation of Notification No. 25, Official Action, mailed Nov. 8, 2011 in related Israeli Patent Application No. 172366.
English translation of Notice of Granting, mailed Nov. 28, 2011, in related Indonesian Patent Application No. W-00200801253.
Office Action mailed Jan. 10, 2012 in related U.S. Appl. No. 12/792,952, filed Jun. 3, 2010.
Office Action mailed Jan. 17, 2012 in related U.S. Appl. No. 11/583,695, filed Oct. 18, 2006.
English translation of First Office Action mailed Dec. 7, 2011 issued in related Chinese Patent Application No. 201110009994X.
Examination Report dated Feb. 23, 2012 issued in related European Application No. 09156702.4.
English translation of Notice of Grounds for Rejection issued Feb. 17, 2012 in related Korean Patent Application No. 2011-7030396.
English translation of Conclusion on Patentability mailed Jan. 26, 2012, issued in related Eurasian Patent Application No. 2412-163357EA/3023.
English translation of Notice of Amendment mailed Feb. 21, 2012 issued in related Chinese Patent Application No. 201110260513.2.
Office Action mailed Mar. 14, 2012 in related U.S. Appl. No. 13/283,245, filed Oct. 27, 2011.
Examination Report dated Apr. 2, 2012 issued in related European Application No. 09156631.5.
English translation of Substantive Examination Report Stage I, issued in related Indonesian Patent Application No. W00 2007 01456.
Notice of Acceptance mailed Feb. 29, 2012 issued in related Australian Patent Application No. 2010212301.
English Translation of Notice of Grounds for Rejection issued Oct. 26, 2012 in related Korean Patent Application No. 2011-7030396.
International Search Report and Written Opinion dated Oct. 23, 2012 in related PCT Application No. PCT/US2012/033150.
English translation of Second Office Action issued Oct. 9, 2012 in related Chinese Patent Application No. 201110009994.X.
English translation of Conclusion on Patentability mailed Sep. 28, 2012, issued in related Eurasian Patent Application No. 200901153.
Search and Examination Report dated Oct. 10, 2012, issued in related ARIPO Patent Application No. AP/P/2008/004453.
Summons to Attend Oral Proceedings Pursuant to Rule 115(1) EPC dated Feb. 21, 2013 in related European Patent Application No. 06826285.6.
Wong, et al. "Dynamically Loaded Classes as Shared Libraries: an Approach to Improving Virtual Machine Scalability" Parallel and Distributed Processing Symposium, 2003. Proceedings International Apr. 22-26, 2003, pp. 38-47, cited in related European Patent Application No. 06826285.6.
Office Action dated Mar. 14, 2013 issued in related U.S. Appl. No. 13/283,126, filed Oct. 27, 2011.
Office Action dated Mar. 20, 2013 issued in related U.S. Appl. No. 11/829,837, filed Mar. 20, 2013.
Office Action dated May 7, 2013 issued in related U.S. Appl. No. 13/283,245, filed Oct. 27, 2011.
English translation of Notification No. 25, Official Action, mailed May 9, 2013 in related Israeli Patent Application No. 223027.
Office Action dated May 28, 2013 issued in related U.S. Appl. No. 13/283,313, filed Oct. 27, 2011.
Office Action dated Jun. 11, 2013 issued in related U.S. Appl. No. 11/583,526, filed Oct. 18, 2006.
English translation of Notice of Reasons for Rejection mailed Aug. 20, 2013 in related Japanese Patent Application No. 2011-248897.
English translation of First Office Action mailed Jun. 6, 2013, issued in related Mexican Patent Application No. 2011/000735.
Office Action dated Oct. 4, 2013 in related Canadian Patent Application No. 2,626,244.
Office Action dated Oct. 21, 2013 issued in related U.S. Appl. No. 11/829,837, filed Jul. 27, 2007.
English translation of Third Office Action, mailed Sep. 23, 2013 in related Chinese Patent Application No. 200480021795.9.
Office Action dated Nov. 14, 2013 issued in related U.S. Appl. No. 13/283,126, filed Oct. 27, 2011.
Notice of Allowance mailed Nov. 21, 2013 in related U.S. Appl. No. 11/583,693.
Chang, et al.; "Multimedia Rights Management for the Multiple Devices of End-User"; Proceedings of the 23rd International Conference on Distributed Computing Systems Workshops; IEEE; 2003; pp. 1-6.
Jonker, W. et al.; "Digital Rights Management in Consumer Electronics Products"; IEEE Signal Processing Magazine; Mar. 2004; pp. 82-92.
Simon, J. et al.; "A Digital Licensing Model for the Exchange of Learning Objects in a Federated Environment"; Proceedings of the First International Workshop on Electronic Contracting; 2004; pp. 1-8.
Tari, Z. et al.; "Controlling Aggregation in Distributed Object Systems: A Graph-Based Approach"; IEEE Transactions on Parallel and Distributed Systems; vol. 12, No. 12; Dec. 2001; pp. 1236-1256.
Office Action dated Dec. 3, 2013 issued in related U.S. Appl. No. 13/444,624, filed Apr. 11, 2012.
Office Action dated Dec. 11, 2013 issued in related U.S. Appl. No. 11/583,526, filed Oct. 18, 2006.
Office Action dated Dec. 20, 2013 issued in related U.S. Appl. No. 12/789,004, filed May 27, 2010.
English translation of TW Search Report and Office Action issued Jan. 21, 2014 in related Taiwan Application No. 095138235.
Applicant-initiated Interview Summary mailed Mar. 19, 2012 issued in related U.S. Appl. No. 11/583,527.
Applicant-initiated Interview Summary mailed Apr. 9, 2012 issued in related U.S. Appl. No. 13/283,245.
Office Action mailed May 3, 2012 in related U.S. Appl. No. 11/804,667, filed May 17, 2007.
Notice of Allowance mailed May 11, 2012 in related U.S. Appl. No. 10/863,551.
Office Action mailed May 30, 2012 in related U.S. Appl. No. 11/829,837.
English translation of Preliminary Rejection (final notification) issued May 31, 2012 in related Korean Application No. 2008-7011852.
Final Office Action mailed Jun. 15, 2012 in related U.S. Appl. No. 12/792,952.
Final Office Action mailed Jun. 15, 2012 in related U.S. Appl. No. 12/789,004.
Office Action dated Jun. 25, 2012 in related Israeli Patent Application No. 190957.
Final Office Action dated Jul. 16, 2012 in related U.S. Appl. No. 12/792,965.
European Search Report dated Jul. 11, 2012 in related European Patent Application No. 10180088.6.
European Search Report dated Jul. 11, 2012 in related European Patent Application No. 10181095.0.
Final Office Action dated Jul. 23, 2012 in related U.S. Appl. No. 11/829,809.
English Translation of Notice of Grounds for Rejection issued Jul. 12, 2012 in related Korean Patent Application No. 2012-7015783.
Office Action dated Aug. 23, 2012 in related U.S. Appl. No. 13/283,245.
Office Action dated Oct. 4, 2012 in related U.S. Appl. No. 13/283,313.
Examination Report dated Sep. 11, 2012 in related Australian Patent Application No. 2012202810.
Indian Examination Report issued Jan. 31, 2014 in related Indian Application No. 2720/KOLNP/2008.
Office Action dated Feb. 20, 2014 issued in related U.S. Appl. No. 11/583,622, filed Oct. 18, 2006.

(56) References Cited

OTHER PUBLICATIONS

Office Action dated Mar. 13, 2014 issued in related U.S. Appl. No. 12/792,965, filed Jun. 3, 2010.
Office Action dated Mar. 20, 2014 issued in related U.S. Appl. No. 12/459,490, filed Jun. 30, 2009.
Office Action dated Mar. 24, 2014 issued in related U.S. Appl. No. 11/894,624, filed Aug. 20, 2007.
Office Action dated Apr. 1, 2014 issued in related U.S. Appl. No. 11/829,805, filed Jul. 27, 2007.
English translation of JP Final Rejection issued Mar. 25, 2014 in related Japanese Application 2011-248897.
Office Action dated May 6, 2014 issued in related U.S. Appl. No. 11/583,527, filed Oct. 18, 2006.
Australian Office Action issued May 19, 2014 in related Australian Application No. 2012242895.
Office Action dated May 21, 2014 issued in related U.S. Appl. No. 12/620,445, filed Nov. 17, 2009.
Office Action dated May 20, 2014 issued in related U.S. Appl. No. 12/459,491, filed Jun. 30, 2009.
Office Action dated May 23, 2014 issued in related U.S. Appl. No. 12/789,004, filed May 27, 2010.
Office Action dated May 29, 2014 issued in related U.S. Appl. No. 11/829,751, filed Jul. 27, 2007.
Examination Report dated Jun. 11, 2014 issued in related European Application No. 10180088.6.
Examination Report dated Jun. 11, 2014 issued in related European Application No. 10181095.0.
Office Action dated Jun. 12, 2014 in related Canadian Patent Application No. 2,626,244.
Office Action dated Jun. 25, 2014 issued in related U.S. Appl. No. 12/622,218, filed Nov. 19, 2009.
English translation of JP First Office Action issued Jun. 24, 2014 in related Japanese Application 2014-030471.
English translation of Fourth Office Action, mailed May 21, 2014 in related Chinese Patent Application No. 200480021795.9.
Office Action dated Jun. 27, 2014 in related Canadian Patent Application No. 2,776,354.
Office Action dated Aug. 8, 2014 issued in related U.S. Appl. No. 11/583,622, filed Oct. 18, 2006.
Extended European Search Report dated Aug. 25, 2014 in related EP Application No. 12770687.7.
Office Action dated Sep. 11, 2014 issued in related U.S. Appl. No. 12/620,452, filed Nov. 17, 2009.
Office Action dated Sep. 17, 2014 issued in related U.S. Appl. No. 11/829,774, filed Jul. 27, 2007.
Office Action dated Sep. 17, 2014 issued in related U.S. Appl. No. 12/459,490, filed Jun. 30, 2009.
Office Action dated Sep. 26, 2014 issued in related U.S. Appl. No. 11/804,667, filed May 17, 2007.
Office Action dated Sep. 26, 2014 issued in related U.S. Appl. No. 12/792,952, filed Jun. 3, 2010.
Office Action dated Sep. 26, 2014 issued in related U.S. Appl. No. 11/829,809, filed Jul. 27, 2007.
English translation of First Office Action, mailed Aug. 5, 2014 in related Chinese Patent Application No. 201210218731.4.
Indian Examination Report issued Sep. 10, 2014 in related Indian Application No. 1969/KOLNP/2008.
Office Action dated Nov. 7, 2014 issued in related U.S. Appl. No. 11/894,624, filed Aug. 20, 2007.
Office Action dated Nov. 12, 2014 issued in related U.S. Appl. No. 11/583,527, filed Oct. 18, 2006.
English translation of JP Final Rejection issued Nov. 11, 2014 in related Japanese Application 2014-030471.
English translation of Fifth Office Action, issued Nov. 24, 2014 in related Chinese Patent Application 200480021795.9.
Office Action dated Jan. 9, 2015 issued in related U.S. Appl. No. 13/444,624, filed Apr. 11, 2012.
Office Action dated Jan. 26, 2015 issued in related U.S. Appl. No. 12/622,218, filed Nov. 19, 2009.
Office Action dated Feb. 10, 2015 issued in related U.S. Appl. No. 13/283,126, filed Oct. 27, 2011.
English translation and First Office Action, issued Dec. 31, 2014 in related Chinese Patent Application 201110260513.2.
Office Action dated Mar. 10, 2015 issued in related U.S. Appl. No. 11/583,622, filed Oct. 18, 2006.

* cited by examiner

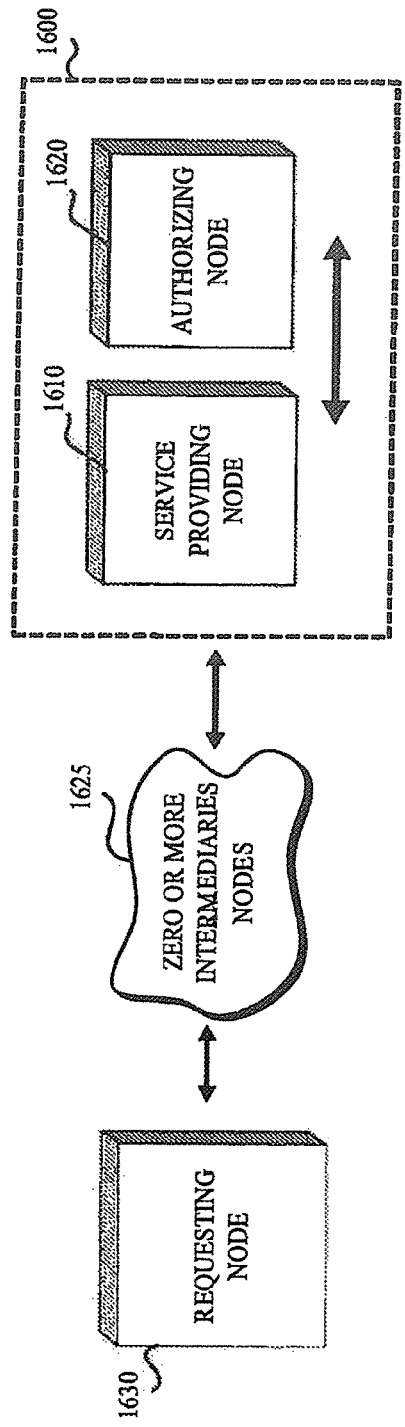

Flow of Events in Requesting Node:

1. Service Discovery
2. Service Binding Selection
3. Negotiation of Acceptable Trusted Relationship with Service Provider
4. Creation of Request Message
5. Dispatching of Request
6. Receiving One or More Response Messages
7. Validate Response Adheres to Negotiated Trust Semantics
8. Processing of Message Payload

Flow of Events within Service Provider:

1. Determine if Requested Service is Supported
2. Negotiation of Acceptable Trusted Relationship with Requesting Node
3. Dispatch Authorization Request to node(s) that Authorize Access to this Interface
4. Upon Receiving Authorization Response do any Appropriate Message Processing
5. Return Response Message

FIG. 16

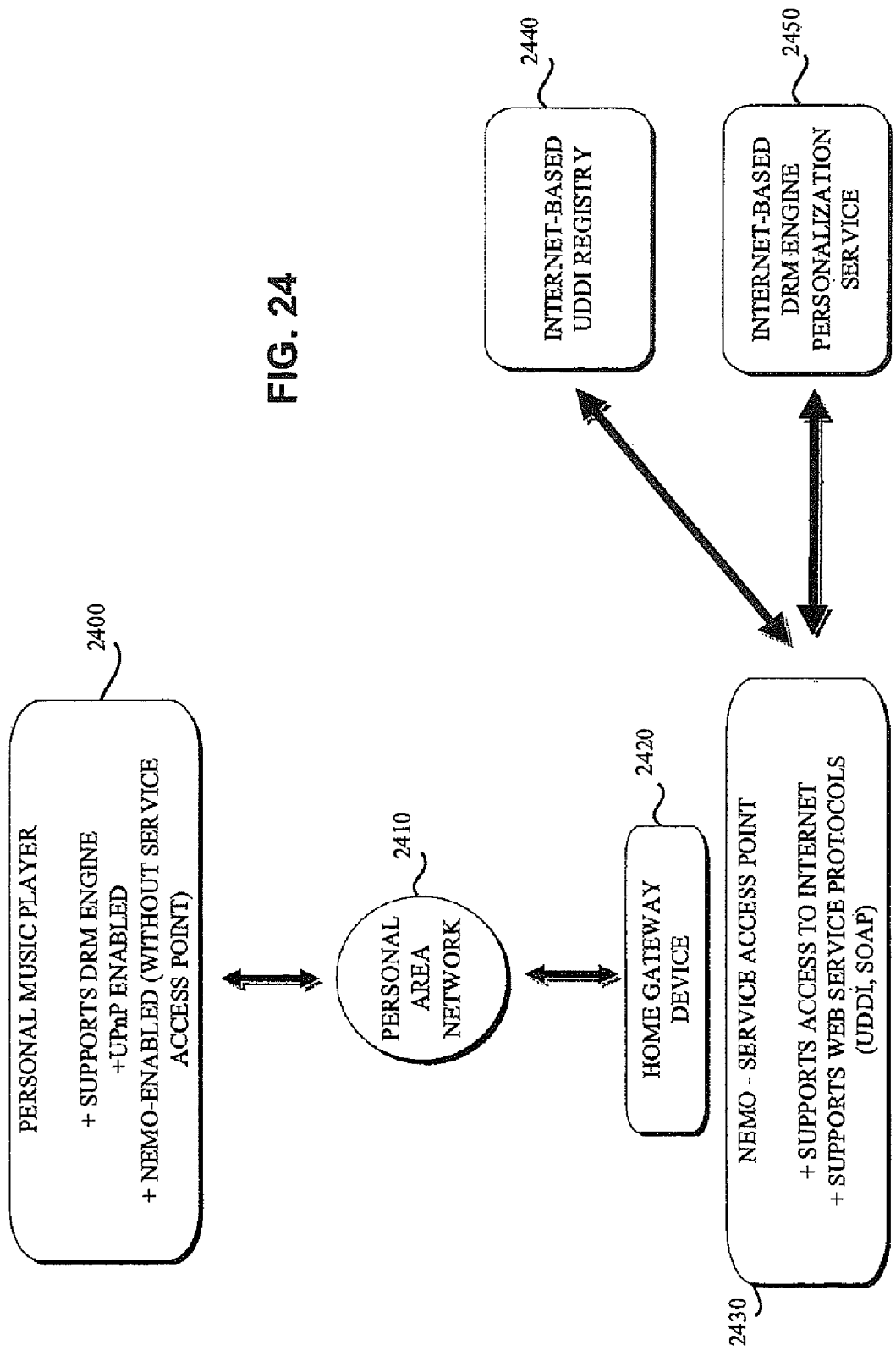

INTEROPERABLE SYSTEMS AND METHODS FOR PEER-TO-PEER SERVICE ORCHESTRATION

RELATED APPLICATIONS

This application is a division of U.S. application Ser. No. 11/829,751, file Jul. 27, 2007, which is a continuation of U.S. application Ser. No. 11/804,667, filed May 17, 2007, which is a continuation of U.S. application Ser. No. 10/863,551, filed Jun. 7, 2004, which claims the benefit of U.S. Provisional Applications Nos. 60/476,357, filed Jun. 5, 2003, entitled Systems and Methods for Peer-To=Peer Service Orchestration, attached hereto as Appendix 1(A), and 60/504,524, filed Sep. 15, 2003, entitled Digital Rights Management Engine Systems and Methods, attached hereto as Appendix 1(B), all of which are incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Networks such as the Internet have become the predominant medium for the delivery of digital content and media related services. The emergence of standard web services protocols promises to accelerate this trend, enabling companies to provide services that can interoperate across multiple software platforms and support cooperation between business services and consumers via standardized mechanisms.

Yet, significant barriers exist to the goal of an interoperable and secure world of media-related services. For example, multiple, overlapping de facto and formal standards can actually inhibit straightforward interoperability by forcing different implementations to choose between marginally standard, but otherwise incompatible, alternative technical approaches to addressing the same basic interoperability or interconnection problems. In some cases these incompatibilities are due to problems that arise from trying to integrate different generations of technologies, while in other cases the problems are due to market choices made by different parties operating at the same time but in different locales and with different requirements. Thus, despite standardization, it is often difficult to locate, connect to, and interact with devices that provide needed services. And there are frequently incompatibility issues between different trust and protection models.

While emerging web service standards such as WSDL (Web Services Description Language) are beginning to address some of these issues for Internet-facing systems, such approaches are incomplete. They fail to address these issues across multiple network tiers spanning personal and local area networks; home, enterprise, and department gateways; and wide area networks. Nor do they adequately address the need for interoperability based on dynamic orchestration of both simple and complex services using a variety of service interface bindings (e.g., CORBA, WS-I, Java RMI, DCOM, C function invocation, Net, etc.), thus limiting the ability to integrate many legacy applications. The advent of widely deployed and adopted peer-to-peer (P2P) applications and networks further compounds the challenges of creating interoperable media-related services, due in part to the fact that there is no unified notion of how to represent and enforce usage rights on digital content.

SUMMARY

Embodiments of the systems and methods described herein can be used to address some or all of the foregoing problems. In one embodiment, a services framework is provided that enables multiple types of stakeholders in the consumer or enterprise media space (e.g., consumers, content providers, device manufacturers, service providers) to find each other, establish a trusted relationship, and exchange value in rich and dynamic ways through exposed service interfaces. Embodiments of this framework—which will be referred to generally as the Network Environment for Media Orchestration (NEMO)—can provide a platform for enabling interoperable, secure, media-related e-commerce in a world of heterogeneous consumer devices, media formats, communication protocols, and security mechanisms. Distributed policy management of the service interfaces can be used to help provide trust and security, thereby facilitating commercial exchange of value.

While emerging web service standards are beginning to address interoperability issues for Internet-facing services, embodiments of NEMO can be used to address interoperability across multiple network tiers spanning personal and local area networks; home, enterprise, and department gateways; and wide area networks. For example, NEMO can provide interoperability in one interconnected system using cell phones, game platforms, PDAs, PCs, web-based content services, discovery services, notification services, and update services. Embodiments of NEMO can further be used to provide dynamic, peer-to-peer orchestration of both simple and complex services using a variety of local and remote interface bindings (e.g. WS-I [1], Java RMI, DCOM, C, Net, etc.), thereby enabling the integration of legacy applications.

In the media world, the systems and interfaces required or favored by the major sets of stakeholders (e.g., content publishers, distributors, retail services, consumer device providers, and consumers) often differ widely. Thus, it is desirable to unite the capabilities provided by these entities into integrated services that can rapidly evolve into optimal configurations meeting the needs of the participating entities.

For example, diverse service discovery protocols and registries, such as Bluetooth, UPnP, Rendezvous, JINI, UDDI, and LDAP (among others) can coexist within the same service, enabling each node to use the discovery service(s) most appropriate for the device that hosts that node. Another service might support IP-based as well as wireless SMS notification, or various media formats (MP4, WMF, etc.).

Embodiments of NEMO satisfy these goals using peer-to-peer (P2P) service orchestration. While the advantages of P2P frameworks have been seen for such things as music and video distribution, P2P technology can be used much more extensively.

Most activity in web services has focused on machine-to-machine interaction with relatively static network configuration and client service interactions. NEMO is also capable of handling situations in which a person carries parts of their personal area network (PAN), moves into the proximity of a LAN or another PAN, and wants to reconfigure service access immediately, as well as connect to many additional services on a peer basis.

Opportunities also exist in media and various other enterprise services, and especially in the interactions between two or more enterprises. While enterprises are most often organized hierarchically, and their information systems often reflect that organization, people from different enterprises will often interact more effectively through peer interfaces. For example, a receiving person/service in company A can solve problems or get useful information more directly by talking to the shipping person in company B. Traversing hierarchies or unnecessary interfaces generally is not useful. Shipping companies (such as FedEx and UPS) realize this and allow direct visibility into their processes, allowing events to be directly monitored by customers. Companies and municipalities are organizing their services through enterprise portals, allowing crude forms of self-service.

However, existing peer-to-peer frameworks do not allow one enterprise to expose its various service interfaces to its customers and suppliers in such a way as to allow those entities to interact at natural peering levels, enabling those entities to orchestrate the enterprise's services in ways that best suit them. This would entail, for example, some form of trust management of those peer interfaces. Preferred embodiments of the present invention can be used to not only permit, but facilitate, this P2P exposure of service interfaces.

In the context of particular applications such as DRM (Digital Rights Management), embodiments of NEMO can be used to provide a service-oriented architecture designed to address the deficiencies and limitations of closed, homogeneous DRM systems. Preferred embodiments can be used to provide interoperable, secure, media-related commerce and operations for disparate consumer devices, media formats, and security mechanisms.

In contrast to many conventional DRM systems, which require relatively sophisticated and heavyweight client-side engines to handle protected content, preferred embodiments of the present invention enable client-side DRM engines to be relatively simple, enforcing the governance policies set by richer policy management systems operating at the service level. Preferred embodiments of the present invention can also provide increased flexibility in the choice of media formats and cryptographic protocols, and can facilitate interoperability between DRM systems.

A simple, open, and flexible client-side DRM engine can be used to build powerful DRM-enabled applications. In one embodiment, the DRM engine is designed to integrate easily into a web services environment, and into virtually any host environment or software architecture.

Service orchestration is used to overcome interoperability barriers. For example, when there is a query for content, the various services (e.g., discovery, search, matching, update, rights exchange, and notification) can be coordinated in order to fulfill the request. Preferred embodiments of the orchestration capability allow a user to view all home and Internet-based content caches from any device at any point in a dynamic, multi-tiered network. This capability can be extended to promote sharing of streams and playlists, making impromptu broadcasts and narrowcasts easy to discover and connect to, using many different devices, while ensuring that rights are respected. Preferred embodiments of NEMO provide an end-to-end interoperable media distribution system that does not rely on a single set of standards for media format, rights management, and fulfillment protocols.

In the value chain that includes content originators, distributors, retailers, service providers, device manufacturers, and consumers, there are often a number of localized needs in each segment. This is especially true in the case of rights management, where content originators may express rights of use that apply differently in various contexts to different downstream value chain elements. A consumer gateway typically has a much more narrow set of concerns, and an end user device may have a yet simpler set of concerns, namely just playing the content. With a sufficiently automated system of dynamically self-configuring distribution services, content originators can produce and package content, express rights, and confidently rely on value added by other service providers to rapidly provide the content to interested consumers, regardless of where they are or what kind of device they are using.

Preferred embodiments of NEMO fulfill this goal by providing means for multiple service providers to innovate and introduce new services that benefit both consumers and service providers without having to wait for or depend on a monolithic set of end-to-end standards. Policy management can limit the extent to which pirates can leverage those legitimate services. NEMO allows the network effect to encourage the evolution of a very rich set of legitimate services providing better value than pirates can provide.

Some "best practice" techniques common to many of the NEMO embodiments discussed below include the following:
  Separation of complex device-oriented and service-oriented policies
  Composition of sophisticated services from simpler services
  Dynamic configuration and advertisement of services
  Dynamic discovery and invocation of various services in a heterogeneous environment
  Utilization of gateway services from simple devices A novel DRM engine and architecture is also presented that can be used with the NEMO framework. This DRM system can be used to achieve some or all of the following goals:

Simplicity. In one embodiment, a DRM engine is provided that uses a minimalist stack-based Virtual Machine (VM) to execute control programs (e.g., programs that enforce governance policies). For example, the VM might consist of only a few pages of code.

Modularity. In one embodiment, the DRM engine is designed to function as a single module integrated into a larger DRM-enabled application. Many of the functions that were once performed by monolithic DRM kernels (such as cryptography services) can be requested from the host environment, which may provide these services to other code modules. This allows designers to incorporate standard or proprietary technologies with relative ease.

Flexibility. Because of its modular design, preferred embodiments of the DRM engine can be used in a wide variety of software environments, from embedded devices to general-purpose PCs.

Open. Embodiments of the DRM engine are suitable for use as reference software, so that code modules and APIs can be implemented by users in virtually any programming language and in systems that they control completely. In one embodiment, the system does not force users to adopt particular content formats or restrict content encoding.

Semantically Agnostic. In one embodiment, the DRM engine is based on a simple graph-based model that turns authorization requests into queries about the structure of the graph. The vertices in the graph represent entities in the system, and directed edges represent relationships between these entities. However, the DRM engine does not need to be aware of what these vertices and edges represent in any particular application.

Seamless Integration with Web Services. The DRM client engine can use web services in several ways. For example, vertices and edges in the graph can be dynamically discovered through services. Content and content licenses may also be discovered and delivered to the DRM engine through sophisticated web services. Although one embodiment of the DRM engine can be configured to leverage web services in many places, its architecture is independent of web services, and can be used as a stand-alone client-side DRM kernel.

Simplified Key Management. In one embodiment, the graph topology can be reused to simplify the derivation of content protection keys without requiring cryptographic retargeting. The key derivation method is an optional but powerful feature of the DRM engine—the system can also, or alternatively, be capable of integrating with other key management systems.

Separation of Governance, Encryption, and Content. In one embodiment, the controls that govern content are logically distinct from the cryptographic information used to enforce the governance. Similarly, the controls and cryptographic information are logically distinct from content and content formats. Each of these elements can be delivered separately or in a unified package, thus allowing a high degree of flexibility in designing a content delivery system.

Embodiments of the NEMO framework, its applications, and its component parts are described herein. It should be understood that the framework itself is novel, as are many of its components and applications. It should also be appreciated that the present inventions can be implemented in numerous ways, including as processes, apparatuses, systems, devices, methods, computer readable media, or a combination thereof. These and other features and advantages will be presented in more detail in the following detailed description and the accompanying drawings which illustrate by way of example the principles of the inventive body of work.

BRIEF DESCRIPTION OF THE DRAWINGS

Embodiments of the inventive body of work will be readily understood by referring to the following detailed description in conjunction with the accompanying drawings, wherein like reference numerals designate like structural elements, and in which:

FIG. 16 illustrates a basic interaction pattern between client and service-providing system nodes.

FIG. 24 illustrates DRM music player application scenarios.

DETAILED DESCRIPTION

Figure 1:
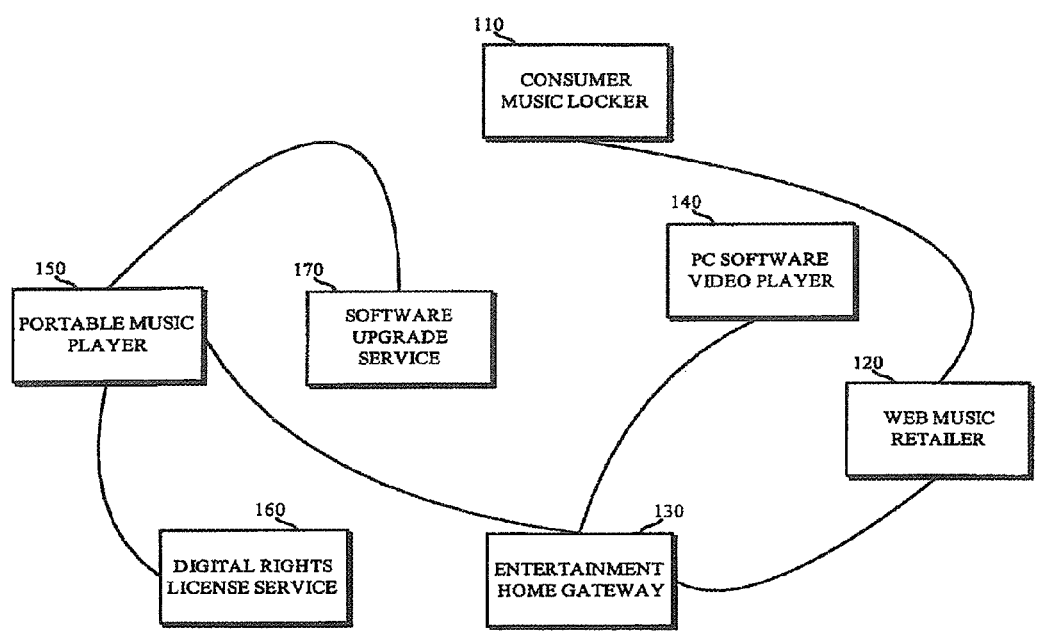
FIG. 1 illustrates a sample embodiment of the system framework.

A detailed description of the inventive body of work is provided below. While this description is provided in conjunction with several embodiments, it should be understood that the inventive body of work is not limited to any one embodiment, but instead encompasses numerous alternatives, modifications, and equivalents. For example, while some embodiments are described in the context of consumer-oriented content and applications, those skilled in the art will recognize that the disclosed systems and methods are readily adaptable for broader application. For example, without limitation, these embodiments could be readily adapted and applied to the context of enterprise content and applications. In addition, while numerous specific details are set forth in the following description in order to provide a thorough understanding of the inventive body of work, some embodiments may be practiced without some or all of these details. Moreover, for the purpose of clarity, certain technical material that is known in the art has not been described in detail in order to avoid unnecessarily obscuring the inventive body of work.

1. Concepts 1.1. Web Services

The Web Services Architecture (WSA) is a specific instance of a Service Oriented Architecture (SOA). An SOA is itself a type of distributed system consisting of loosely coupled, cooperating software agents. The agents in an SOA may provide a service, request (consume) a service, or do both. A service can be seen as a well-defined, self-contained set of operations managed by an agent acting in a service provider role. The operations are invoked over the network at some network-addressable location, called an endpoint, using standard protocols and data formats. By self-contained, it is meant that the service does not depend directly on the state or context of another service or encompassing application.

Examples of established technologies that support the concepts of an SOA include CORBA, DCOM, and J2EE. WSA is attractive because it is not tied to a specific platform, programming language, application protocol stack, or data format convention. WSA uses standard formats based on XML for describing services and exchanging messages which promotes loose coupling and interoperability between providers and consumers, and supports multiple standard Internet protocols (notably HTTP), which facilitates deployment and participation in a potentially globally distributed system.

An emerging trend is to view an SOA in the context of a "plug-and-play" service bus. The service bus approach provides for orchestration of services by leveraging description, messaging, and transport standards. The infrastructure may also incorporate standards for discovery, transformation, security, and perhaps others as well. Through the intrinsic qualities of the ubiquitous standards incorporated into the WSA, it is flexible, extensible, and scalable, and therefore provides the appropriate foundation for constructing an orchestrated service bus model. In this model, the fundamental unit of work (the service) is called a web service.

There are a wide number of definitions for a web service. The following definition comes from the World Wide Web Consortium (W3C) Web Services Architecture working draft (Aug. 8, 2003—see www.w3.org/TR/ws-arch):

A Web service is a software system designed to support interoperable machine-to-machine interaction over a network. It has an interface described in a machine-processable format (specifically WSDL). Other systems interact with the Web service in a manner prescribed by its description using SOAP-messages, typically conveyed using HTTP with an XML serialization in conjunction with other Web-related standards.

While the W3C definition provides a useful starting point, it should be understood that the term "web services" is used herein in a broader sense, without limitation, for example, to the use of specific standards, formats, and protocols (e.g., WSDL, SOAP, XML, HTTP, etc.).

A particular web service can be described as an abstract interface for a logically coherent set of operations that provides a basis for a (possibly transient) relationship between a service provider and a service requester.

Of course, actual web services have concrete implementations. The provider's concrete implementation is sometimes referred to as the service (as distinguished from web service). The software that actually implements the functionality for the service provider is the provider agent and for the service requester, the requester agent. The person or organization that owns the agent is referred to as the provider entity or requester entity, as appropriate. When used by itself, requester or provider may refer to either the respective entity or agent depending on context.

A web service exists to fulfill a purpose, and how this is achieved is specified by the mechanics and semantics of the particular web service message exchange. The mechanics refers to the precise machine-processable technical specifications that allow the message exchange to occur over a network. While the mechanics are precisely defined, the semantics might not be. The semantics refers to the explicit or implicit "contract," in whatever form it exists, governing the understanding and overall expectations between the requester and provider entities for the web service.

Web services are often modeled in terms of the interactions of three roles: (i) Service Provider; (ii) Service Requester; and (iii) Service Registry. In this model, a service provider "publishes" the information describing its web service to a service registry. A service requester "finds" this information via some discovery mechanism, and then uses this information to "bind" to the service provider to utilize the service. Binding simply means that the requester will invoke the operations made available by the provider using the message formatting, data mapping, and transport protocol conventions specified by the provider in the published service description. The XML-based language used to describe this information is called Web Services Description Language (WSDL).

A service provider offers access to some set of operations for a particular purpose described by a WSDL service description; this service description is published to a registry by any of a number of means so that the service may be discovered. A registry may be public or private within a specific domain.

A service registry is software that responds to service search requests by returning a previously published service description. A service requester is software that invokes various operations offered by a provider according to the binding information specified in the WSDL obtained from a registry.

The service registry may exist only conceptually or may in fact exist as real software providing a database of service descriptions used to query, locate, and bind to a particular service. But whether a requester actually conducts an active search for a service or whether a service description is statically or dynamically provided, the registry is a logically distinct aspect of the web services model. It is interesting to note that in a real world implementation, a service registry may be a part of the service requester platform, the service provider platform, or may reside at another location entirely identified by some well-known address or an address supplied by some other means.

The WSDL service description supports loose coupling, often a central theme behind an SOA. While ultimately a service requester will understand the semantics of the interface of the service it is consuming for the purpose of achieving some desired result, the service description isolates a service interface from specific service binding information and supports a highly dynamic web services model.

A service-oriented architecture can be built on top of many possible technology layers. As currently practiced, web services typically incorporate or involve aspects of the following technologies:

HTTP—a standard application protocol for most web services communications. Although web services can be deployed over various network protocols (e.g., SMTP, FTP, etc), HTTP is the most ubiquitous, firewall-friendly transport in use. For certain applications, especially within an intranet, other network protocols may make sense depending on requirements; nevertheless, HTTP is a part of almost any web services platform built today.

XML—a standard for formatting and accessing the content (and information about the content) of structured information. XML is a text-based standard for communicating information between web services agents. Note that the use of XML does not mean that message payloads for web services may not contain any binary data; but it does mean that this data will be formatted according to XML conventions. Most web services architectures do not necessarily dictate that messages and data be serialized to a character stream—they may just as likely be serialized to a binary stream where that makes sense—but if XML is being used, these streams will represent XML documents. That is, above the level of the transport mechanism, web service messaging will often be conducted using XML documents.

Two XML subset technologies that are particularly important to many web services are XML Namespaces and XML Schema. XML-Namespaces are used to resolve naming conflicts and assert specific meanings to elements contained with XML documents. XML-Schema are used to define and constrain various information items contained within an XML document. Although it is possible (and optional) to accomplish these objectives by other means, the use of XML is probably the most common technique used today. The XML document format descriptions for web service documents themselves are defined using XML-Schema, and most real world web services operations and messages themselves will be further defined incorporating XML-Schema.

SOAP—an XML-based standard for encapsulating instructions and information into a specially formatted package for transmission to and handling by other receivers. SOAP (Simple Object Access Protocol) is a standard mechanism for packaging web services messages for transmission between agents. Somewhat of a misnomer, its legacy is as a means of invoking distributed objects and in that respect it is indeed "simpler" than other alternatives; but the recent trend is to consider SOAP as an XML-based wire protocol for purposes that have transcended the original meaning of the acronym.

SOAP defines a relatively lightweight convention for structuring messages and providing information about content. Each SOAP document contains an envelope that is divided into a header and a body. Although structurally similar, the header is generally used for meta-information or instructions for receivers related to the handling of the content contained in the body.

SOAP also specifies a means of identifying features and the processing needed to fulfill the features' obligations. A Message Exchange Pattern (MEP) is a feature that defines a pattern for how messages are exchanged between nodes. A common MEP is request-response, which establishes a single, complete message transaction between a requesting and a responding node (see http://www.w3.org/TR/2003/REC-soap12-part2-20030624/#soapsupmep.).

WSDL—an XML-based standard for describing how to use a web service. From a WSDL perspective, a service is related to a set of messages exchanged between service requesters and providers. Messages are described in an abstract manner that can be mapped to specific protocols. The exchange of messages that invokes some functionality is called an operation. A specific set of operations defines an interface. An interface is tied to a concrete message format and protocol by a named binding. The binding (the mapping of an interface to a concrete protocol) is associated with a URI appropriate to the protocol, resulting in an endpoint. A collection of one or more related endpoints (mapping an interface to concrete protocols at specific URIs) comprises a service.

These definitions map to specific WSDL elements:

| | |
|---|---|
| Types | container element for type definitions |
| Message | an abstract definition of the type of data being sent |
| Operation | an abstract description of an action based on a combination of input, output, and fault messages |
| portType | an abstract set of operations - an interface |
| binding | specification of a concrete protocol and data format for an interface (portType) |
| port | the combination of a binding and an actual network address - an endpoint |
| service | a collection of related ports (endpoints) |

WSDL defines a common binding mechanism and then defines specific binding extensions for SOAP, HTTP GET/POST, and MIME. Thus, binding does not necessarily mean binding to a transport protocol directly, but to a specific wire format. The most common binding for web services is SOAP, although actual SOAP message exchanges generally occur over HTTP on port 80 (via an http:// URI). However, an interface can be directly bound to HTTP; alternatively, for example, a binding for SOAP can use SMTP (via a mailto:// URI). An implementation can even define its own wire format and use a custom binding extension.

WSDL encourages maintainability and reusability by providing support for an <import> element. Using import, a WSDL document can be divided into separate pieces in ways that make sense to an organization. For a cohesive web services environment desiring some degree of separation between an interface definition and an implementation definition, the following separation into three documents is reasonable:

A schema (.xsd) document - the root node is <schema> and the namespace is "http://www.w3.org/2001/XMLSchema."
A service interface description containing what is considered the reusable portion
   <message>
   <portType>
   <binding>
A service implementation definition containing the specific service endpoint
   <service>

WSDL interfaces are not exactly like Java (or IDL, or some other programming language) interfaces. For example, a Java interface declaration specifies a set of methods that must match at least a subset of the methods of a class claiming to implement that interface. More than one class can implement an interface, and each implementation can be different; but the method signatures (method name and any input or output types) generally must be identical. This is mandated by the language and enforced at compile time, runtime, or both.

A WSDL interface is different, and more like an actual abstract class that alone is not fully useful. Various WSDL interfaces, or portTypes, of a single web service are logically related in the sense that the set of operation names should be identical—as if the portType did, in fact, implement a specific contract defined somewhere else—but no such element actually exists and there is no mechanism for enforcing portType symmetry. Each portType is generally named to identify the type of binding it supports—even though a portType alone does not create a binding. The portType operations for related portTypes are named the same, but the input, output, and fault messages (if present) are mapped to specific messages that contain named parts also necessary for supporting a specific binding. This raises the point that messages themselves are not completely abstract. A web service may and often does need to define similar but distinct messages for the various bindings required.

As will be illustrated below, by leveraging emerging web service and related standards, a system architecture can be developed that facilitates the creation of networked interoperable media-related services that utilize a variety of different protocols and interfaces across a wide range of hardware and software platforms and operating environments.

1.2. Roles

Preferred embodiments of the present invention seek to enable, promote, and/or actively support a peer-to-peer environment in which peers can spontaneously offer a variety of functionality by exposing services. One embodiment of the framework discourages viewing peers as having a fixed set of capabilities; and instead encourages a model where a peer at any point in time is a participant in one or more roles.

A role can be defined by a set of services that a given peer exposes in combination with a specific behavior pattern. At any given moment a NEMO-enabled node may act in multiple roles based on a variety of factors: its actual implementation footprint providing the functionality for supporting a given set of services, administrative configuration, information declaring the service(s) the peer is capable of exposing, and load and runtime policy on service interfaces.

An explicit set of roles could be defined based on various different types of services. Over time, as common patterns of participation are determined and as new services are introduced, a more formal role categorization scheme could be defined. A preliminary set of roles that may be formalized over time could include the following:

Client—a relatively simple role in which no services are exposed, and the peer simply uses services of other peers.

Authorizer—this role denotes a peer acting as a Policy Decision Point (PDP), determining if a requesting principal has access to a specified resource with a given set of pre-conditions and post-conditions.

Gateway—in certain situations a peer may not be able to directly discover or interact with other service providers, for reasons including: transport protocol incompatibility, inability to negotiate a trusted context, or lack of the processing capability to create and process the necessary messages associated with a given service. A gateway is a peer acting as a bridge to another peer in order to allow the peer to interact with a service provider. From the perspective of identity and establishing an authorized and trusted context for operation, the requesting peer may actually delegate to the gateway peer its identity and allow that peer to negotiate and make decisions on its behalf. Alternatively, the gateway peer may act as a simple relay point, forwarding or routing requests and responses.

Orchestrator—in situations where interaction with a set of service providers involves nontrivial coordination of services (possibly including transactions, distributed state management, etc.), it may be beyond a peer's capability to participate. An orchestrator is a specialization of the gateway role. A peer may request an orchestrator to act on its behalf, intervening to provide one or more services. The orchestrating peer may use certain additional NEMO components, such as an appropriately configured Workflow Collator in order to satisfy the orchestration requirements.

Given the goal of "providing instant gratification by satisfying a request for any media, in any format, from any source, at any place, at any time, on any device complying with any agreeable set of usage rules," the following informal model illustrates how this goal can be achieved using embodiments of the NEMO framework. It will become apparent from the highest level of the model (without enumerating every aspect of how NEMO enables all of the media services that one can imagine) how NEMO enables lower-level services from different tiers in the model to be assembled into richer end-to-end media services.

In one embodiment of this model there are four tiers of service components: 1) Content Authoring, Assembly, and Packaging services, 2) Web-based Content Aggregation and Distribution services, 3) Home Gateway services, and 4) Consumer Electronics devices.

Each of these four tiers typically has different requirements for security, rights management, service discovery, service orchestration, user interface complexity, and other service attributes. The first two tiers fit very roughly into the models that we see for "traditional" web services, while the last two tiers fit more into what we might call a personal logical network model, with certain services of the home gateway being at the nexus between the two types of models. However, services for CE devices could occasionally appear in any of the tiers.

One dilemma lies in the desire to specialize parts of the framework for efficiency of implementation, while being general enough to encompass an end-to-end solution. For example, a UDDI directory and discovery approach may work well for relatively static and centralized web services, but for a more dynamic transient merging of personal networks, discovery models such as those found in UPnP and Rendezvous may be more appropriate. Thus, in some embodiments multiple discovery standards are accommodated within the framework Similarly, when rights management is applied to media distribution through wholesale, aggregator, and retail distribution sub-tiers, there can be many different types of complex rights and obligations that need to be expressed and tracked, suggesting the need for a highly expressive and complex rights language, sophisticated content governance and clearing services, and a global trust model. However, rights management and content governance for the home gateway and CE device tiers may entail a different trust model that emphasizes fair use rights that are relatively straightforward from the consumer's point of view. Peer devices in a personal logical network may want to interact using the relatively simple trust model of that network, and with the ability to interact with peers across a wide area network using a global trust model, perhaps through proxy gateway services. At the consumer end, complexity arises from automated management of content availability across devices, some of which are mobile and intermittently intersect multiple networks. Thus, an effective approach to rights management, while enabling end-to-end distribution, might also be heterogeneous, supporting a variety of rights management services, including services that interpret expressions of distribution rights and translate them, in context, to individual consumer use rights in a transaction that is orchestrated with a sales transaction, or perhaps another event where a subscription right is exercised.

1.3. Logical Model

In one embodiment, the system framework consists of a logically connected set of nodes that interact in a peer-to-peer (P2P) fashion. Peer-to-peer computing is often defined as the sharing of resources (such as hard drives and processing cycles) among computers and other intelligent devices. See http://www.intel.com/cure/peer.htm. Here, P2P may be viewed as a communication model allowing network nodes to symmetrically consume and provide services of all sorts. P2P messaging and workflow collation allow rich services to be dynamically created from a heterogeneous set of more primitive services. This enables examination of the possibilities of P2P computing when the shared resources are services of many different types, even using different service bindings.

Different embodiments can provide a media services framework enabling stakeholders (e.g., consumers, content providers, device manufacturers, and service providers) to find one another, to interact, exchange value, and to cooperate in rich and dynamic ways. These different types of services range from the basic (discovery, notification, search, and file sharing) to more complex higher level services (such as lockers, licensing, matching, authorization, payment transaction, and update), and combinations of any or all of these.

Services can be distributed across peer-to-peer communicating nodes, each providing message routing and orchestration using a message pump and workflow collator (described in greater detail below) designed for this framework.

Nodes interact by making service invocation requests and receiving responses. The format and payload of the request and response messages are preferably defined in a standard XML schema-based web service description language (e.g., WSDL) that embodies an extensible set of data types enabling the description and composition of services and their associated interface bindings. Many of the object types in WSDL are polymorphic and can be extended to support new functionality. The system framework supports the construction of diverse communication patterns, ranging from direct interaction with a single service provider to a complex aggregation of a choreographed set of services from multiple service providers. In one embodiment, the framework supports the basic mechanisms for using existing service choreography standards (WSCI, BPEL, etc.), and also allows service providers to use their own conventions.

The syntax of messages associated with service invocation are preferably described in a relatively flexible and portable manner, as are the core data types used within the system framework. In one embodiment, this is accomplished using WSDL to provide relatively simple ways for referencing semantic descriptions associated with described services.

A service interface may have one or more service bindings. In such an embodiment, a node may invoke the interface of another node as long as that node's interface binding can be expressed in, e.g., WSDL, and as long as the requesting node can support the conventions and protocols associated with the binding. For example, if a node supports a web service interface, a requesting node may be required to support SOAP, HTTP, WS-Security, etc.

Any service interface may be controlled (e.g., rights managed) in a standardized fashion directly providing aspects of rights management. Interactions between nodes can be viewed as governed operations.

Virtually any type of device (physical or virtual) can be viewed as potentially NEMO-enabled, and able to implement key aspects of the NEMO framework. Device types include, for example, consumer electronics equipment, networked services, and software clients. In a preferred embodiment, a NEMO-enabled device (node) typically includes some or all of the following logical modules (discussed in greater detail below):

Native Services API—the set of one or more services that the device implements. There is no requirement that a NEMO node expose any service directly or indirectly in the NEMO framework.

Native Service Implementation—the corresponding set of implementations for the native services API.

Service Adaptation Layer—the logical layer through which an exposed subset of an entity's native services is accessed using one or more discoverable bindings described in, e.g., WSDL.

Framework Support Library—components that provide support functionality for working with the NEMO Framework including support for invoking service interfaces, message processing, service orchestration, etc.

1.4. Terminology

In one embodiment, a basic WSDL profile defines a minimum "core" set of data types and messages for supporting interaction patterns and infrastructural functionality. Users may either directly, in an ad-hoc manner, or through some form of standardization process, define other profiles built on top of this core, adding new data and service types and extending existing ones. In one embodiment, this core profile includes definitions for some or all of the following major basic data types:

Node—a representation of a participant in the system framework. A node may act in multiple roles including that of a service consumer and/or a service provider. Nodes may be implemented in a variety of forms including consumer electronic devices, software agents such as media players, or virtual service providers such as content search engines, DRM license providers, or content lockers.

Device—encapsulates the representation of a virtual or physical device.

User—encapsulates the representation of a client user.

Request—encapsulates a request for a service to a set of targeted Nodes.

Request Input—encapsulates the input for a Request.

Response—encapsulates a Response associated with a Request.

Request Result—encapsulates the Results within a Response associated with some Request.

Service—encapsulates the representation of a set of well-defined functionality exposed or offered by a provider Node. This could be, for example, low-level functionality offered within a device such as a cell phone (e.g. a voice recognition service), or multi-faceted functionality offered over the world-wide web (e.g. a shopping service). Services could cover a wide variety of applications, including DRM-related services such as client personalization and license acquisition.

Service Provider—an entity (e.g., a Node or Device) that exposes some set of Services. Potential Service Providers include consumer electronics devices, such as cell phones, PDAs, portable media players and home gateways, as well as network operators (such as cable head-ends), cellular network providers, web-based retailers and content license providers.

Service Interface—a well-defined way of interacting with one or more Services.

Service Binding—encapsulates a specific way to communicate with a Service, including the conventions and protocols used to invoke a Service Interface. These may be represented in a variety of well-defined ways, such as the WS-I standard XML protocol, RPC based on the WSDL definition, or a function invocation from a DLL.

Service Access Point (SAP)—encapsulates the functionality necessary for allowing a Node to make a Service Invocation Request to a targeted set of Service Providing Nodes, and receive a set of Responses.

Workflow Collator (WFC)—a Service Orchestration mechanism that provides a common interface allowing a Node to manage and process collections of Requests and Responses related to Service invocations. This interface provides the basic building blocks to orchestrate Services through management of the Messages associated with the Services.

In the context of a particular application, such as digital rights management (DRM), a typical profile might include various DRM-related services (described below) for the following set of content protection and governance objects, which represent entities in the system, protect content, associate usage rules with the content, and determine if access can be granted when requested:

Content Reference—encapsulates the representation of a reference or pointer to a content item. Such a reference will typically leverage other standardized ways of describing content format, location, etc.

DRM Reference—encapsulates the representation of a reference or pointer to a description of a digital rights management format.

Link—links between entities (e.g., Nodes).

Content—represents media or other content.

Content Key—represents encryption keys used to encrypt Content.

Control—represents usage or other rules that govern interaction with Content.

Controller—represent associations between Control and ContentKey objects

Projector—represent associations between Content and ContentKey objects

In one embodiment, a core profile includes definitions for some or all of the following basic Services:

Authorization—a request or response to authorize some participant to access a Service.

Governance—The process of exercising authoritative or dominating influence over some item (e.g., a music file, a document, or a Service operation), such as the ability to download and install a software upgrade. Governance typically interacts with Services providing functionality such as trust management, policy management, and content protection.

Message Routing—a Request or Response to provide message routing functionality, including the ability to have the Service Providing Node forward the message or collect and assemble messages.

Node Registration—a Request or Response to perform registration operations for a Node, thereby allowing the Node to be discovered through an Intermediate Node.

Node Discovery (Query)—a Request or Response related to the discovery of Nodes.

Notification—a Request or Response to send or deliver targeted Notification messages to a given set of Nodes.

Security Credential Exchange—a Request or Response related to allowing Nodes to exchange security related information, such as key pairs, certificates, or the like.

Service Discovery (Query)—a Request or Response related to the discovery of Services provided by some set of one or more Nodes.

Service Orchestration—The assembly and coordination of Services into manageable, coarser-grained Services, reusable components, or full applications that adhere to rules specified by a service provider. Examples include rules based on provider identity, type of Service, method by which Services are accessed, order in which Services are composed, etc.

Trust Management—provides a common set of conventions and protocols for creating authorized and trusted contexts for interactions between Nodes. In some embodiments, NEMO Trust Management may leverage and/or extend existing security specifications and mechanisms, including WS-Security and WS-Policy in the web services domain.

Upgrade—represents a Request or Response related to receiving a functionality upgrade. In one embodiment, this service is purely abstract, with other profiles providing concrete representations.

1.5. Illustrative Interaction Between Nodes

As will be discussed in greater detail below, the basic logical interaction between two system nodes, a service requester and a service provider, typically includes the following sequence of events. From the perspective of the service requesting node:

The service requesting node makes a service discovery request to locate any NEMO-enabled nodes that can provide the necessary service using the specified service bindings. A node may choose to cache information about discovered services. The interface/mechanism for service discovery between nodes can be just another service that a NEMO node chooses to implement.

Once candidate service providing nodes are found, the requesting node may choose to dispatch a request to one or more of the service providing nodes based on a specific service binding.

In one embodiment, two nodes that wish to communicate securely with each other will establish a trusted relationship for the purpose of exchanging WSDL messages. For example, they may negotiate a set of compatible trust credentials (e.g., X.500 certificates, device keys, etc.) that may be used in determining identity, verifying authorization, establishing a secure channel, etc. In some cases, the negotiation of these credentials may be an implicit property of the service interface binding (e.g., WS-Security if WS-I XML Protocol is used, or an SSL request between two well-known nodes). In other cases, the negotiation of trust credentials may be an explicitly separate step. In one embodiment, it is up to a given node to determine which credentials are sufficient for interacting with another node, and to make the decision that it can trust a given node.

The requesting node creates the appropriate WSDL request message(s) that correspond to the requested service.

Once the messages are created, they are dispatched to the targeted service providing node(s). The communication style of the request may, for example, be synchronous or asynchronous RPC style, or message-oriented based on the service binding. Dispatching of service requests and receiving of responses may be done directly by the device or through the NEMO Service Proxy. The service proxy (described below) provides an abstraction and interface for sending messages to other participants, and may hide certain service binding issues, such as compatible message formats, transport mechanisms, message routing issues, etc.

After dispatching a request, the requesting node will typically receive one or more responses. Depending on the specifics of the service interface binding and the requesting node's preferences, the response(s) may be returned in a variety of ways, including, for example, an RPC-style response or a notification message. The response, en-route to the targeted node(s), may pass through other intermediate nodes that may provide a number of relevant services, including, e.g., routing, trust negotiation, collation and correlation functions, etc.

The requesting node validates the response(s) to ensure it adheres to the negotiated trust semantics between it and the service providing node.

Appropriate processing is then applied based on the message payload type and contents.

From the perspective of the service providing node, the sequence of events typically would include the following:

Determine if the requested service is supported. In one embodiment, the NEMO framework does not mandate the style or granularity of how a service interface maps as an entry point to a service. In the simplest case, a service interface may map unambiguously to a given service and the act of binding to and invoking it may constitute support for the service. However, in some embodiments a single service interface may handle multiple types of requests; and a given service type may contain additional attributes that need to be examined before a determination can be made that the node supports the specifically desired functionality.

In some cases it may be necessary for the service provider to determine if it trusts the requesting node and to negotiate a set of compatible trust credentials. In one embodiment, regardless of whether the service provider determines trust, any policy associated with the service interface will still apply.

The service provider determines and dispatches authorization request(s) to those node(s) responsible for authorizing access to the interface in order to determine if the requesting node has access. In many situations, the authorizing node and the service providing node will be the same entity, and the dispatching and processing of the authorization request will be local operations invoked through a lightweight service interface binding such as a C function entry point.

Upon receiving the authorization response, if the requesting node is authorized, the service provider will fulfill the request. If not, an appropriate response message might be generated.

The response message is returned based on the service interface binding and requesting node's preferences. En route to the requesting node, the message may pass through other intermediate nodes that may provide necessary or "value added" services. For example an intermediate node might provide routing, trust negotiation, or delivery to a notification processing node that can deliver the message in a way acceptable to the requesting node. An example of a "value added" service is a coupon service that appends coupons to the message if it knows of the requesting node's interests.

2. System Architecture

Consider a sample embodiment of the NEMO system framework, as illustrated in FIG. 1, implementing a DRM application.

As noted above, NEMO nodes may interact by making service invocation requests and receiving responses. The NEMO framework supports the construction of diverse and rich communication patterns ranging from a simple point to point interaction with a single service provider to a complex aggregation of a choreographed set of services from multiple service providers.

In the context of FIG. 1, the NEMO nodes interact with one another to provide a variety of services that, in the aggregate, implement a music licensing system. Music stored in Consumer Music Locker 110 can be extracted by Web Music Retailer 120 and provided to end users at their homes via their Entertainment Home Gateway 130. Music from Consumer Music Locker 110 may include rules that govern the conditions under which such music may be provided to Web Music Retailer 120, and subsequently to others for further use and distribution. Entertainment Home Gateway 130 is the vehicle by which such music (as well as video and other content) can be played, for example, on a user's home PC (e.g., via PC Software Video Player 140) or on a user's portable playback device (e.g., Portable Music Player 150). A user might travel, for example, with Portable Music Player 150 and obtain, via a wireless Internet connection (e.g., to Digital Rights License Service 160), a license to purchase additional songs or replay existing songs additional times, or even add new features to Portable Music Player 150 via Software Upgrade Service 170.

Figure 2A:
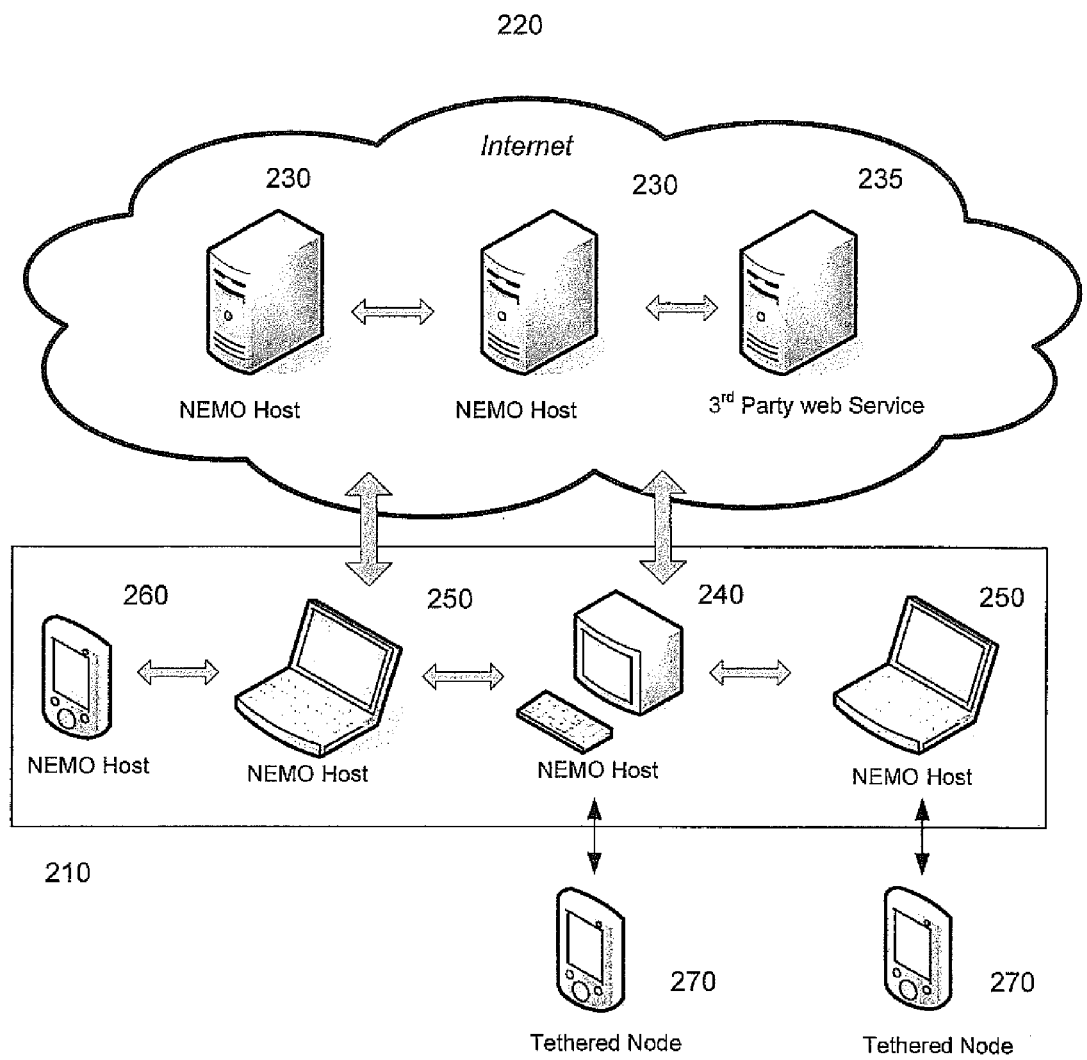
FIG. 2a illustrates a conceptual network of system nodes.

NEMO nodes can interact with one another, and with other devices, in a variety of different ways. A NEMO host, as illustrated in FIG. 2a, is some type of machine or device hosting at least one NEMO node. A host may reside within a personal area network 210 or at a remote location 220 accessible via the Internet. A host could, for example, be a server 230, a desktop PC 240, a laptop 250, or a personal digital assistant 260.

A NEMO node is a software agent that can provide services to other nodes (such as host 235 providing a $3^{rd}$ party web service) as well as invoke other nodes' services within the NEMO-managed framework. Some nodes 270 are tethered to another host via a dedicated communication channel, such as Bluetooth. These hosts 240 and 250 are equipped with network connectivity and sufficient processing power to present a virtual node to other participating NEMO nodes.

Figure 2B:
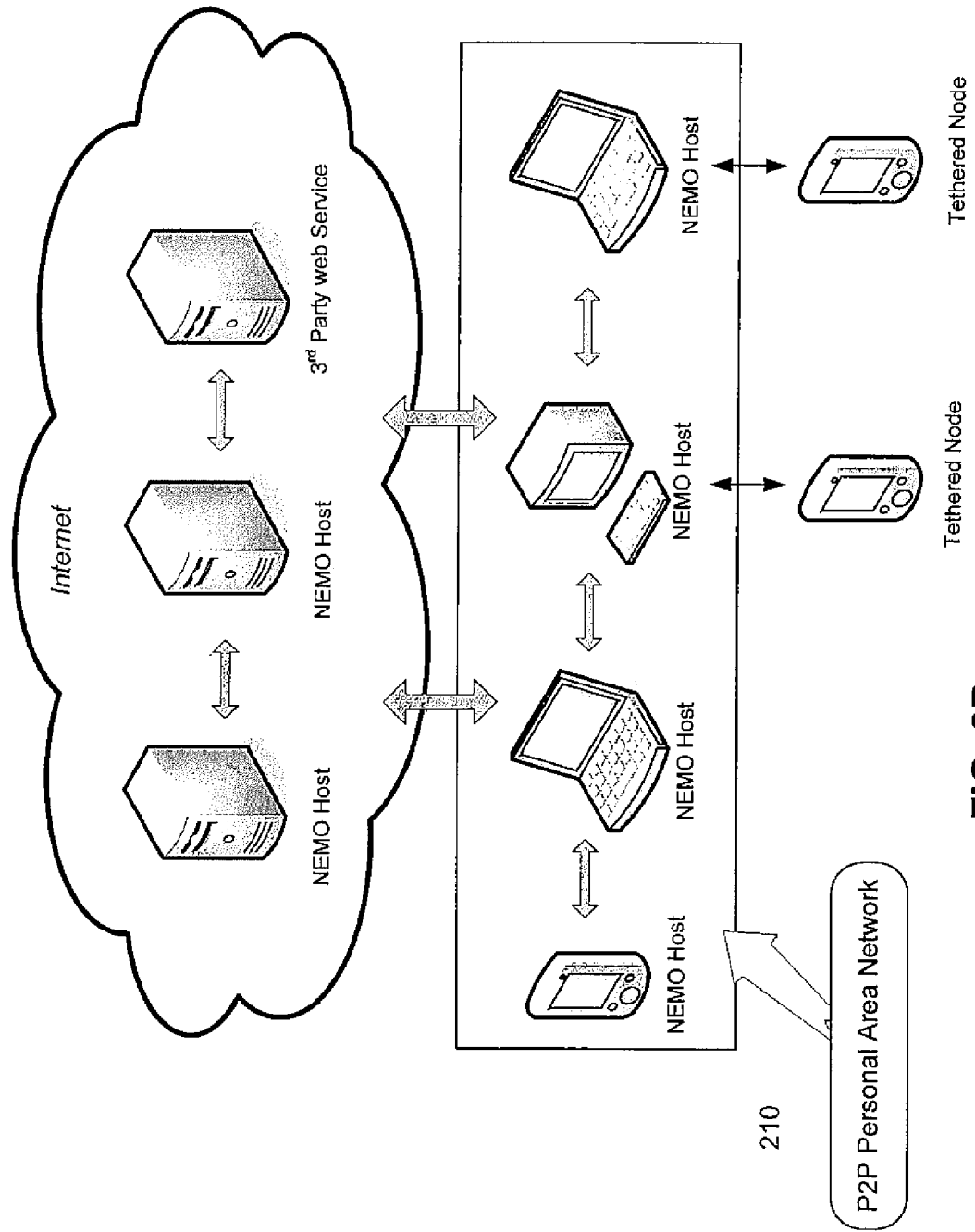
FIG. 2b illustrates system nodes in a P2P network.

As illustrated in FIG. 2b, a NEMO node can be a full peer within the local or personal area network 210. Nodes share the symmetric capability of exposing and invoking services; however, each node generally does not offer identical sets of services. Nodes may advertise and/or be specifically queried about the services they perform.

Figure 2C:
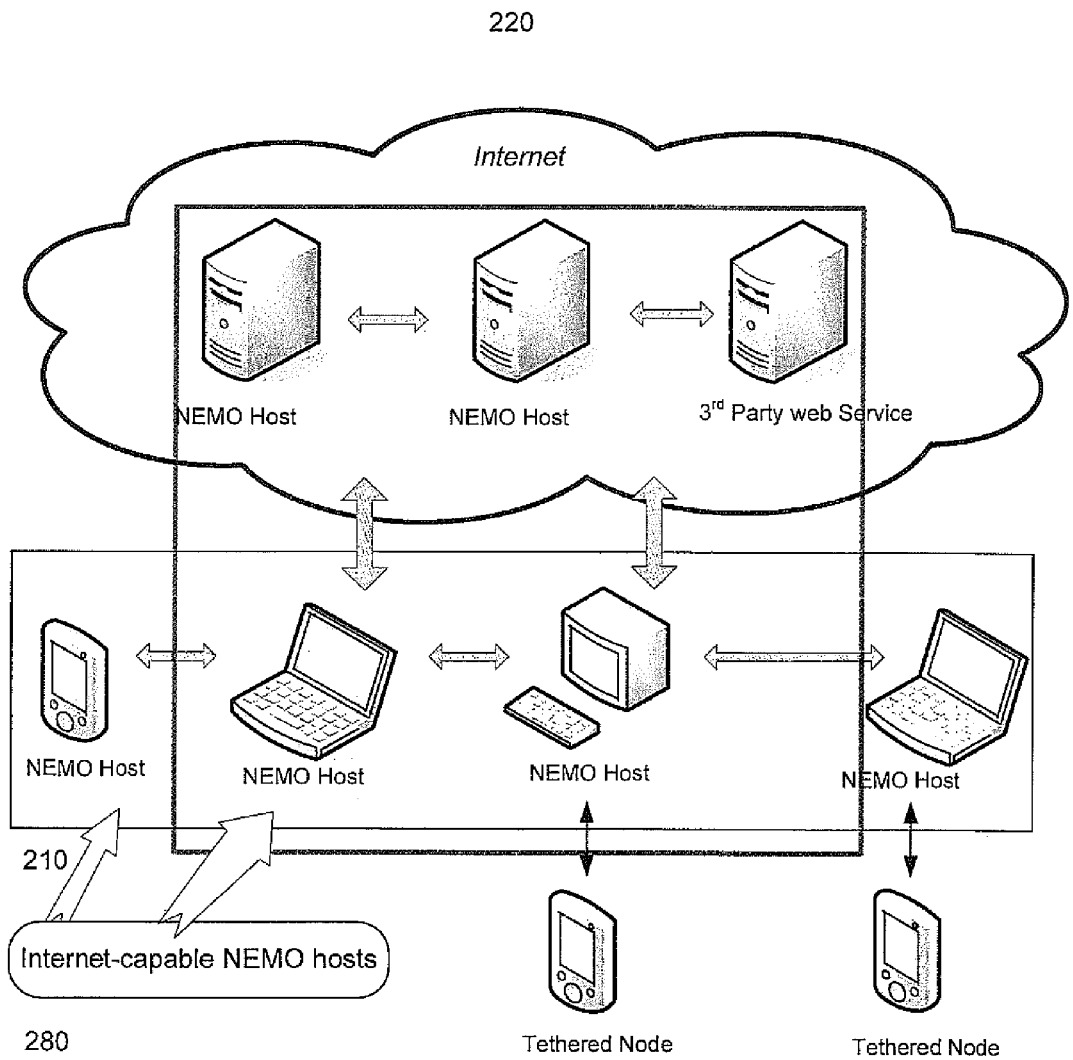
FIG. 2c illustrates system nodes operating across the Internet.

If an Internet connection is present, as shown in FIG. 2c, then local NEMO nodes (e.g., within personal area network 210) can also access the services of remote nodes 220. Depending on local network configuration and policy, it is also possible for local and remote nodes (e.g., Internet-capable NEMO hosts 280) to interoperate as NEMO peers.

Figure 2D:
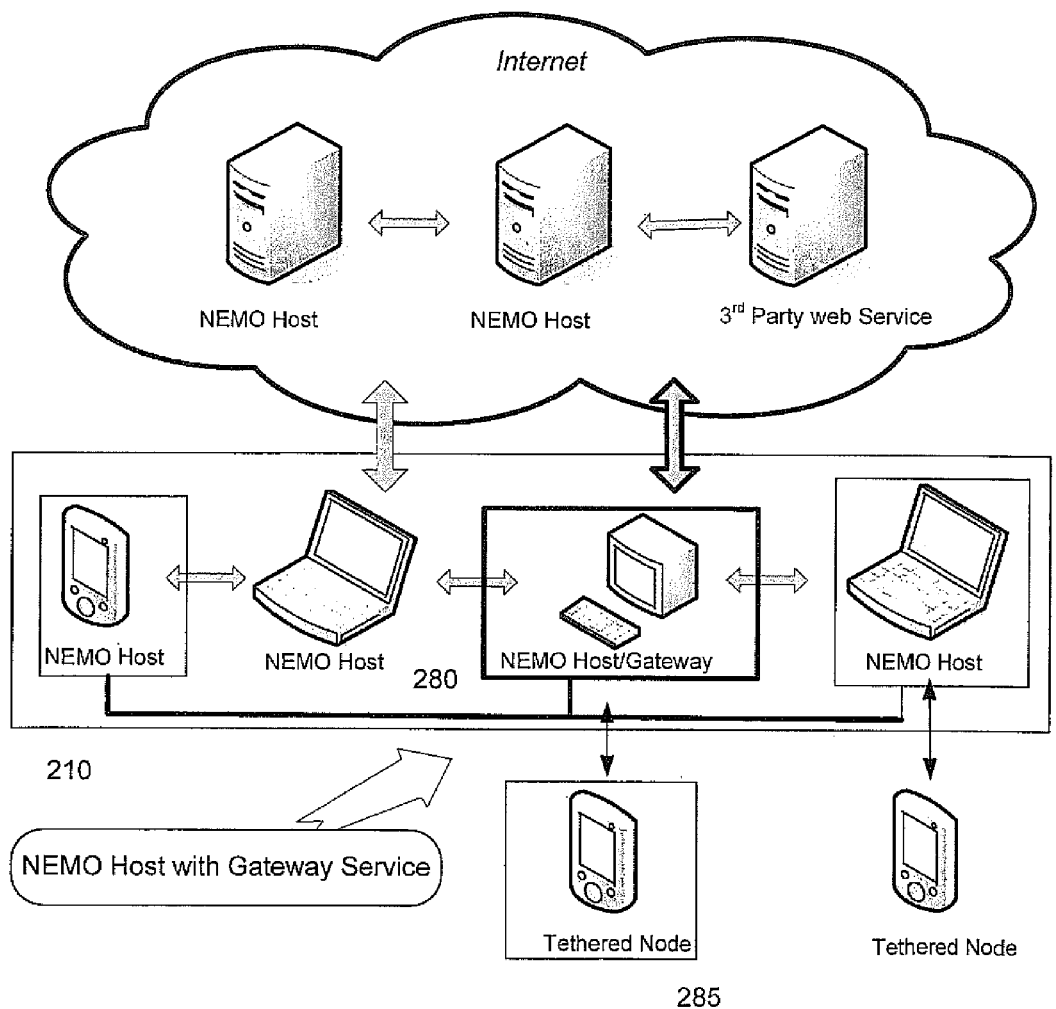
FIG. 2d illustrates a system gateway node.

As illustrated in FIG. 2d, not all NEMO nodes may be on hosts capable of communicating with other hosts, whether local or remote. A NEMO host 280 can provide a gateway service through which one node can invoke the services of another, such as tethered node 285 or nodes in personal area network 210.

Figure 2E:
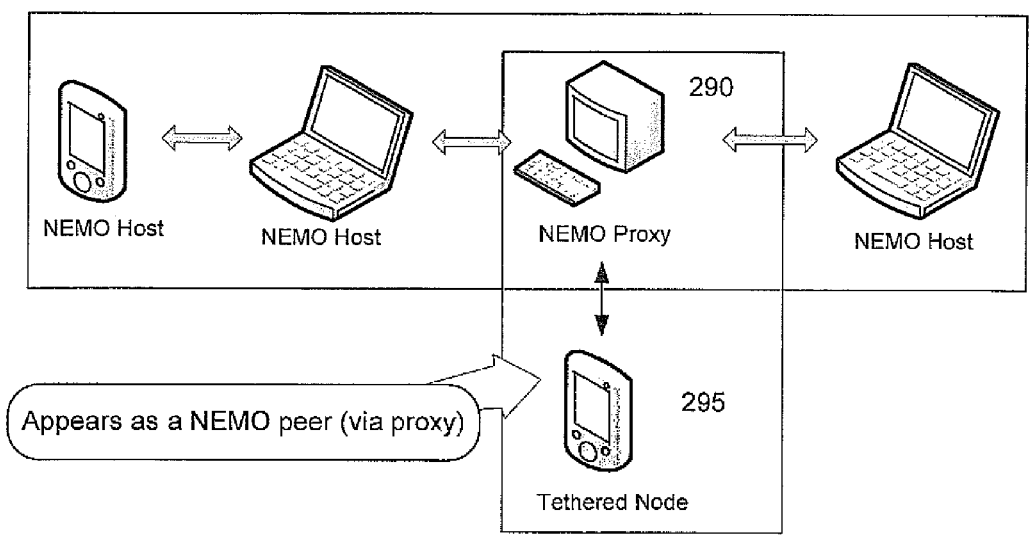
FIG. 2e illustrates a system proxy node.

As illustrated in FIG. 2e, a node 295 on a tethered device may access the services of other nodes via a gateway, as discussed above. It may also be accessed by other nodes via a proxy service on another host 290. The proxy service creates a virtual node running on the NEMO host. These proxy nodes can be full NEMO peers.

Figure 2F:
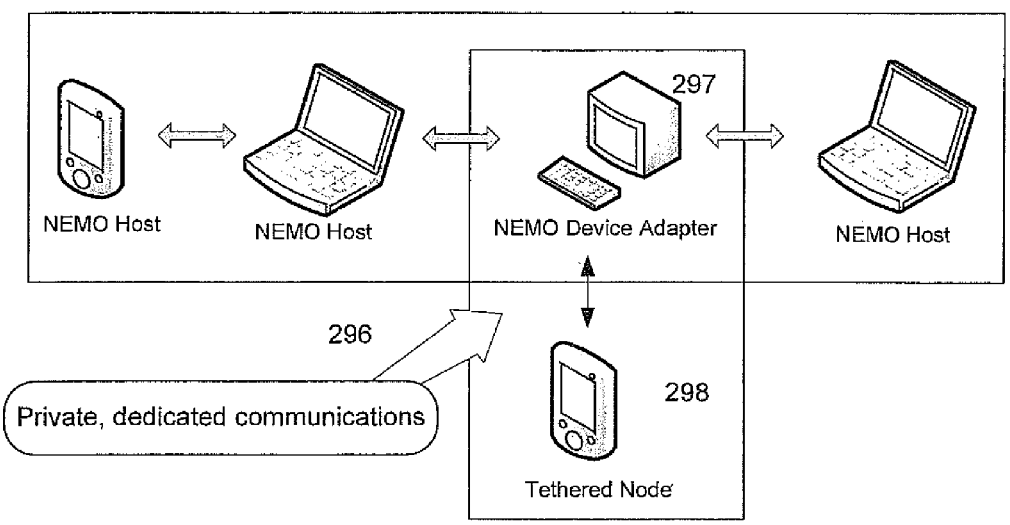
FIG. 2f illustrates a system device adapter node.

As illustrated in FIG. 2f, a NEMO host may provide dedicated support for tethered devices via NEMO node adapters. A private communication channel 296 is used between host/NEMO device adapter 297 and tethered node 298 using any suitable protocol. Tethered node 298 does not see, nor is it visible to, other NEMO peer nodes.

We next consider exemplary digital rights management (DRM) functionality that can be provided by NEMO-enabled devices in certain embodiments, or that can be used outside the NEMO context. As previously described, one of the primary goals of a preferred embodiment of the NEMO system framework is to support the development of secure, interoperable interconnections between media-related services spanning both commercial and consumer-oriented network tiers. In addition to service connectivity, interoperability between media-related services will often require coordinated management of usage rights as applied to the content available through those services. NEMO services and the exemplary DRM engine described herein can be used in combination to achieve interoperability that allows devices based on the NEMO framework to provide consumers with the perception of a seamless rendering and usage experience, even in the face of a heterogeneous DRM and media format infrastructure.

Figure 3:
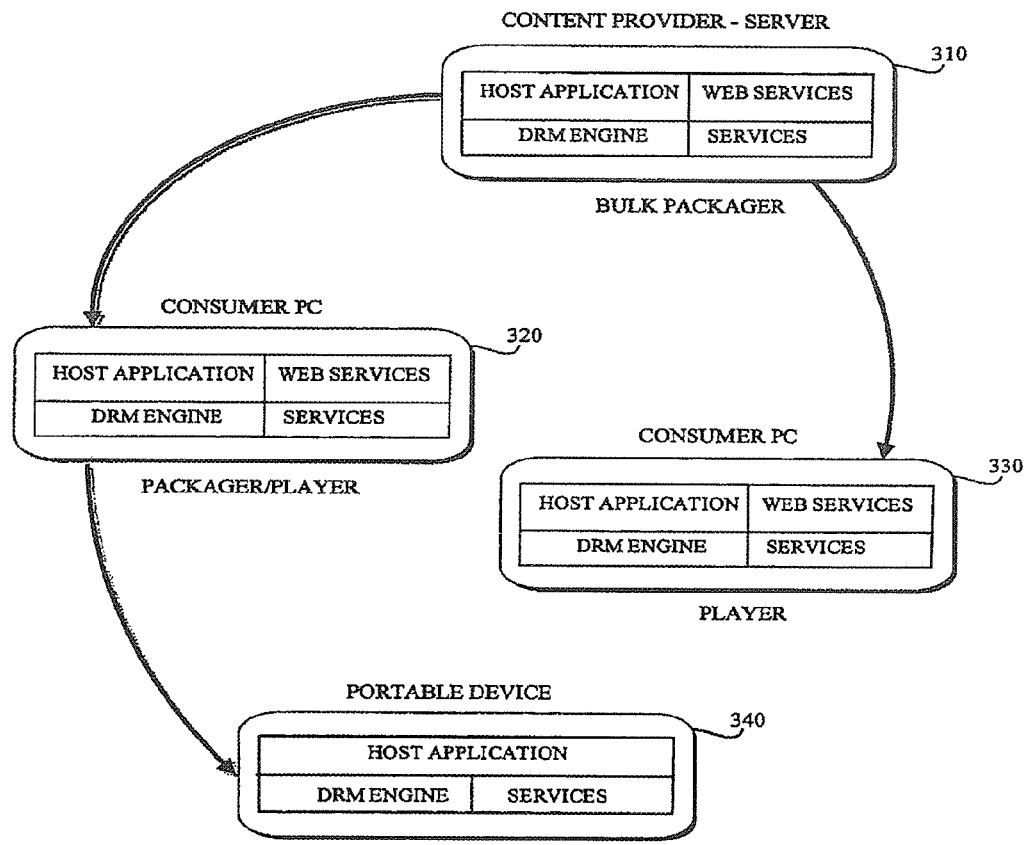
FIG. 3 illustrates a conceptual network of DRM devices.

In the context of a DRM application, as illustrated in FIG. 3, a network of NEMO-enabled DRM devices may include content provider/server 310, which packages content for other DRM devices, as well as consumer PC player 330 and consumer PC packager/player 320, which can not only play protected content, but can also package content for delivery to portable device 340.

Within each DRM device, the DRM engine performs specific DRM functions (e.g., enforcing license terms, delivering keys to the host application, etc.), and relies on the host application for those services which can be most effectively provided by the host, such as encryption, decryption, and file management.

As will be discussed in greater detail below, in one embodiment the DRM engine includes a virtual machine (VM) designed to determine whether certain actions on protected content are permissible. This Control VM can be implemented as a simple stack-based machine with a minimal set of instructions. In one embodiment, it is capable of performing logical and arithmetic calculations, as well as querying state information from the host environment to check parameters such as system time, counter state, and so forth.

Figure 4:
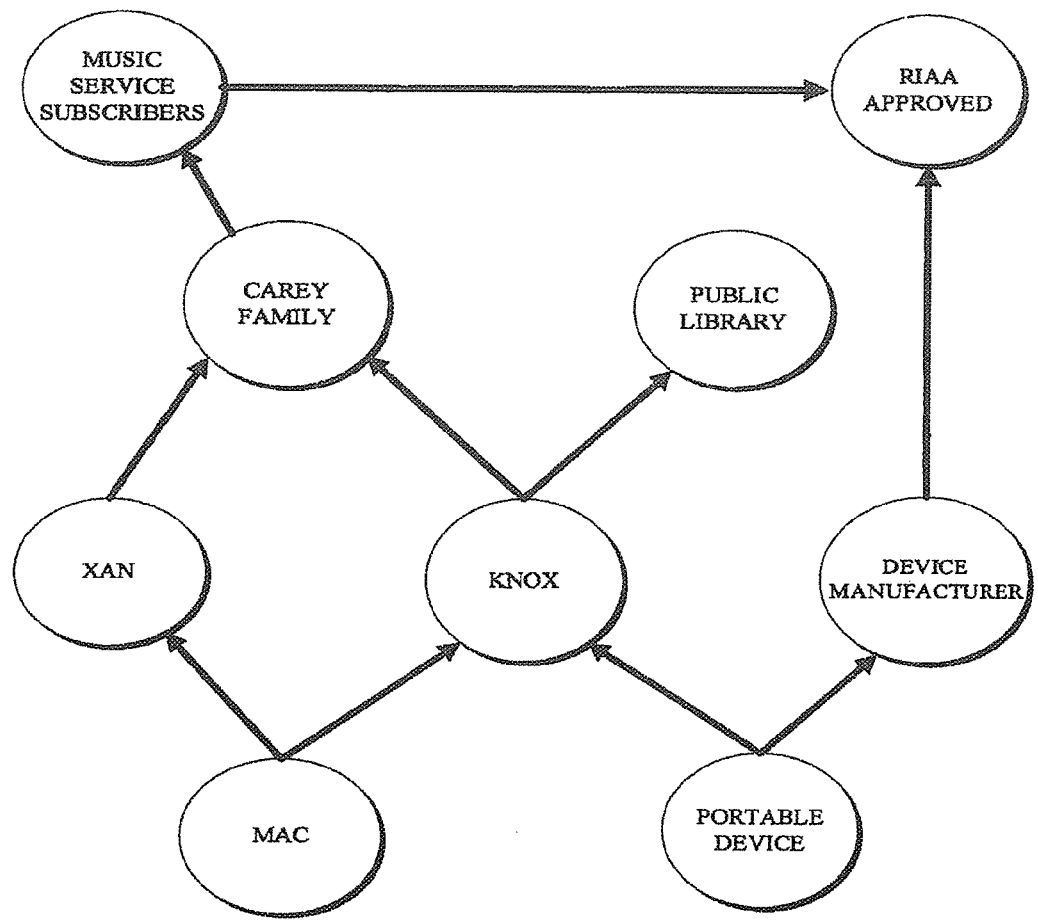
FIG. 4 illustrates a conceptual DRM node authorization graph.

In one embodiment, the DRM engine utilizes a graph-based algorithm to verify relationships between entities in a DRM value chain. FIG. 4 illustrates a conceptual embodiment of such a graph. The graph comprises a collection of nodes or vertices, connected by links. Each entity in the system can be represented by a vertex object. Only entities that need to be referenced by link objects, or be the recipient of cryptographically targeted information, need to have corresponding vertex objects. In one embodiment, a vertex typically represents a user, a device, or a group. Vertex objects also have associated attributes that represent certain properties of the entity associated with the vertex.

For example, FIG. 4 shows two users (Xan and Knox), two devices (the Mac and a portable device), and several entities representing groups (members of the Carey family, members of the public library, subscribers to a particular music service, RIAA-approved devices, and devices manufactured by a specific company). Each of these has a vertex object associated with it.

The semantics of the links may vary in an application-specific manner. For example, the directed edge from the Mac vertex to the Knox vertex may mean that Knox is the owner of the Mac. The edge from Knox to Public Library may indicate that Knox is a member of the Public Library. In one embodiment the DRM engine does not impose or interpret these semantics—it simply ascertains the existence or non-existence of paths within the graph. This graph of vertices can be considered an "authorization" graph in that the existence of a path or relationship (direct or indirect) between two vertices may be interpreted as an authorization for one vertex to access another vertex.

For example, because Knox is linked to the Carey family and the Carey family is linked to the Music Service, there is a path between Knox and the Music Service. The Music Service vertex is considered reachable from another vertex when there is a path from that vertex to the Music Service. This allows a control to be written that allows permission to access protected content based on the condition that the Music Service be reachable from the portable device in which the application that requests access (e.g., a DRM client host application) is executing.

For example, a content owner may create a control program to be interpreted by the Control VM that allows a particular piece of music to be played if the consuming device is owned by a member of the Public Library and is RIAA-approved. When the Control VM running on the device evaluates this control program, the DRM engine determines whether links exist between Portable Device and Public Library, and between Portable Device and RIAA Approved. The edges and vertices of the graph may be static and built into devices, or may be dynamic and discovered through services communicating with the host application.

By not imposing semantics on the vertices and links, the DRM engine can enable great flexibility. The system can be adapted to many usage models, from traditional delegation-based policy systems to authorized domains and personal area networks.

In one embodiment, the DRM client can also reuse the authorization graph for content protection key derivation. System designers may chose to allow the existence of a link to also indicate the sharing of certain cryptographic information. In such cases, the authorization graph can be used to derive content keys without explicit cryptographic retargeting to consuming devices.

3. Node Architecture 3.1. Overview

Figure 5A:
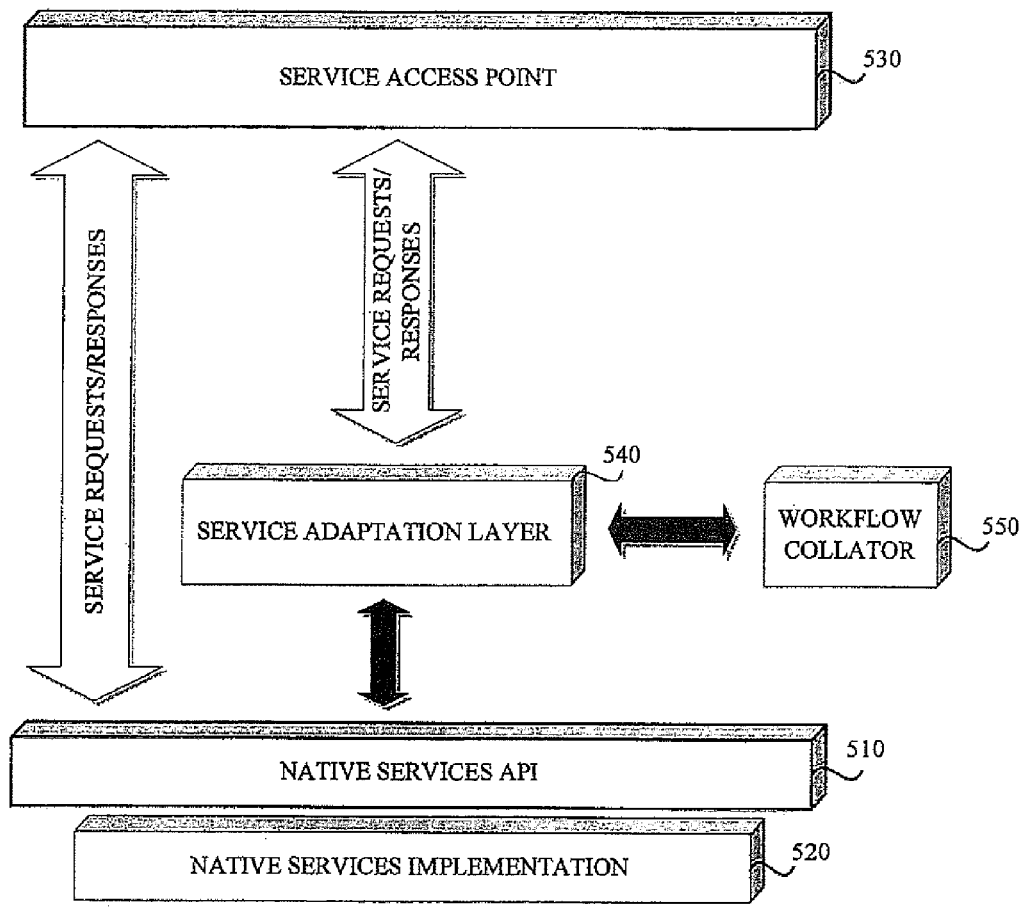
FIG. 5a illustrates a conceptual view of the architecture of a system node.

Any type of device (physical or virtual), including consumer electronics equipment, networked services, or software clients, can potentially be NEMO-enabled, which means that the device's functionality may be extended in such a way as to enable participation in the NEMO system. In one embodiment, a NEMO-enabled device (node) is conceptually comprised of certain standard modules, as illustrated in FIG. 5a.

Native Services API 510 represents the logical set of one or more services that the device implements. There is no requirement that a NEMO node expose any service directly or indirectly. Native Service Implementation 520 represents the corresponding set of implementations for the native services API.

Service Access Point 530 provides support for invoking exposed service interfaces. It encapsulates the functionality necessary for allowing a NEMO node to make a service invocation request to a targeted set of service-providing NEMO nodes and to receive a set of responses. NEMO-enabled nodes may use diverse discovery, name resolution, and transport protocols, necessitating the creation of a flexible and extensible communication API. The Service Access Point can be realized in a variety of ways tailored to a particular execution environment and application framework style. One common generic model for its interface will be an interface capable of receiving XML messages in some form and returning XML messages. Other models with more native interfaces can also be supported.

NEMO Service Adaptation Layer 540 represents an optional layer through which an exposed subset of an entity's native services are accessed using one or more discoverable bindings. It provides a level of abstraction above the native services API, enabling a service provider to more easily support multiple types of service interface bindings. In situations where a service adaptation layer is not present, it may still be possible to interact with the service directly through the Service Access Point 530 if it supports the necessary communication protocols.

The Service Adaptation Layer 540 provides a common way for service providers to expose services, process requests and responses, and orchestrate services in the NEMO framework. It is the logical point at which services are published, and provides a foundation on which to implement other specific service interface bindings.

Figure 5B:
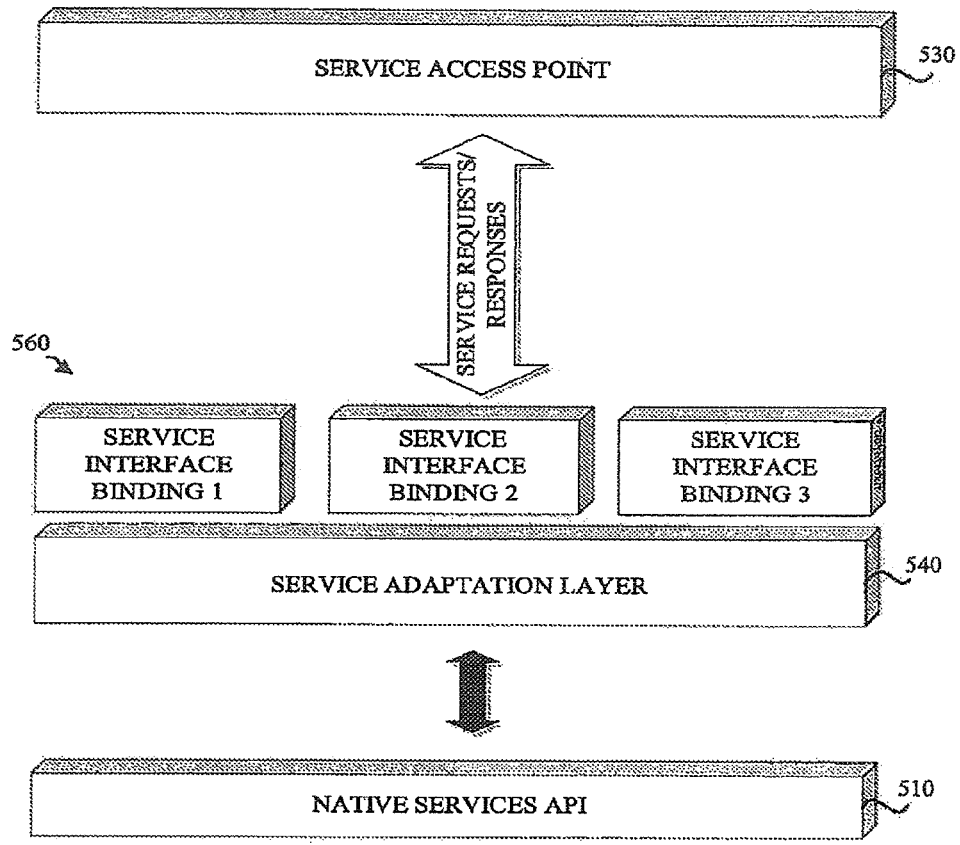
FIG. 5b illustrates multiple service interface bindings supported by the service adaptation layer of a system node.

In addition to providing a common way of exposing a service provider's native services to other NEMO-enabled nodes, Service Adaptation Layer 540 also provides a natural place on which to layer components for supporting additional service interface bindings 560, as illustrated in FIG. 5b. By supporting additional service interface bindings, a service provider increases the likelihood that a compatible binding will be able to be negotiated and used either by a Service Access Point or through some other native API.

Referring back to FIG. 5a, Workflow Collator 550 provides supporting management of service messages and service orchestration. It provides a common interface allowing a node to manage and process collections of request and response messages. This interface in turn provides the basic building blocks to orchestrate services through management of the messages associated with those services. This interface typically is implemented by a node that supports message routing functionality as well as the intermediate queuing and collating of messages.

In some embodiments, the NEMO framework includes a collection of optional support services that facilitate an entity's participation in the network. Such services can be classified according to various types of functionality, as well as the types of entities requiring such services (e.g., services supporting client applications, as opposed to those needed by service providers). Typical supporting services include the following:

WSDL Formatting and Manipulation Routines—provide functionality for the creation and manipulation of WSDL-based service messages.

Service Cache—provides a common interface allowing a node to manage a collection of mappings between discovered nodes and the services they support.

Notification Processor Interface—provides a common service provider interface for extending a NEMO node that supports notification processing to some well-defined notification processing engine.

Miscellaneous Support Functionality—including routines for generating message IDs, timestamps, etc.

3.2. Basic Node Interaction

Before examining the individual architectural elements of NEMO nodes in greater detail, it is helpful to understand the manner by which such nodes interact and communicate with one another. Diverse communication styles are supported, ranging from synchronous and asynchronous RPC-style communication, to one-way interface invocations and client callbacks.

Asynchronous RPC Delivery Style—this model is particularly appropriate if there is an expectation that fulfilling the request will take an extended period of time and the client does not want to wait. The client submits a request with the expectation that it will be processed in an asynchronous manner by any service-providing nodes. In this case, the service-providing endpoint may respond indicating that it does not support this model, or, if the service-providing node does support this model, it will return a response that will carry a ticket that can be submitted to the given service-providing node in subsequent requests to determine if it has a response to the client's request.

In one embodiment, any service-providing endpoint that does support this model is obligated to cache responses to pending client requests based on an internal policy. If a client attempts to redeem a ticket associated with such a request and no response is available, or the response has been thrown away by the service-providing node, then an appropriate error response is returned. In this embodiment, it is up to the client to determine when it will make such follow-on requests in attempting to redeem the ticket for responses.

Synchronous RPC Delivery Style—the client submits a request and then waits for one or more responses to be returned. A service-providing NEMO-enabled endpoint may respond indicating that it does not support this model.

Message-Based Delivery Style—the client submits a request indicating that it wants to receive any responses via a message notification associated with one or more of its notification handling service interfaces. A service-providing NEMO-enabled endpoint may respond indicating that it does not support this model.

From the client application's perspective, none of the interaction patterns above necessitates an architecture that must block and wait for responses, or must explicitly poll. It is possible to use threading or other platform-specific mechanisms to model both blocking and non-blocking semantics with the above delivery style mechanisms. Also, none of the above styles is intended to directly address issues associated with the latency of a given communication channel—only potential latency associated with the actual fulfillment of a request. Mechanisms to deal with the issues associated with communication channel latency should be addressed in the specific implementation of a component such as the Service Access Point, or within the client's implementation directly.

3.3. Service Access Point

As noted above, a Service Access Point (SAP) can be used as a common, reusable API for service invocation. It can encapsulate the negotiation and use of a transport channel. For example, some transport channels may require SSL session setup over TCP/IP, while some channels may only support relatively unreliable communication over UDP/IP, and still others may not be IP-based at all.

A SAP can encapsulate the discovery of an initial set of NEMO nodes for message routing. For example, a cable set-top box may have a dedicated connection to the network and mandate that all messages flow through a specific route and intermediary. A portable media player in a home network may use UPnP discovery to find multiple nodes that are directly accessible. Clients may not be able, or may choose not, to converse directly with other NEMO nodes by exchanging XML messages. In this case, a version of the SAP may be used that exposes and uses whatever native interface is supported.

In a preferred embodiment, the SAP pattern supports the following two common communication models (although combinations of the two, as well as others, may be supported): (i) Message Based (as discussed above)—where the SAP forms XML request messages and directly exchanges NEMO messages with the service provider via some interface binding; or (ii) Native—where the SAP may interact with the service provider through some native communication protocol. The SAP may internally translate to/from XML messages defined elsewhere within the framework.

Figure 6A:
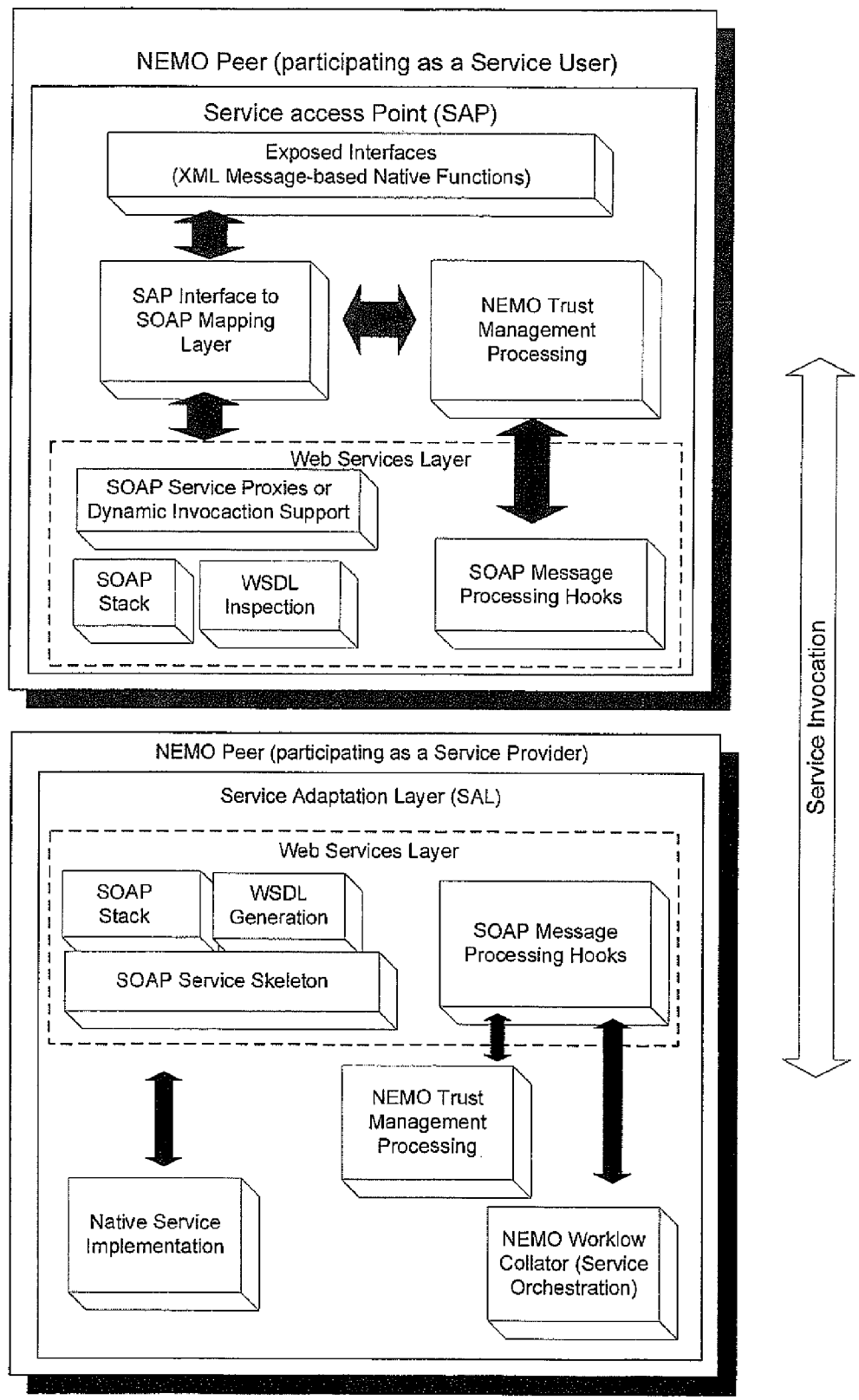
FIG. 6a illustrates basic interaction between a service-providing system node and a service-consuming system node.

A sample interaction between two NEMO peer nodes is illustrated in FIG. 6a. Client node 610 interacts with service-providing node 660 using NEMO service access point (SAP)

620. In this example, web service protocols and standards are used both for exposing services and for transport. Service-providing node 660 uses its web services layer 670 (using, e.g., WSDL and SOAP-based messaging) to expose its services to clients such as node 610. Web services layer 630 of client node 610 creates and interprets SOAP messages, with help from mapping layer 640 (which maps SOAP messages to and from SAP interface 620) and trust management processing layer 650 (which could, for example, leverage WS-Security using credentials conveyed within SOAP headers).

Figure 6B:
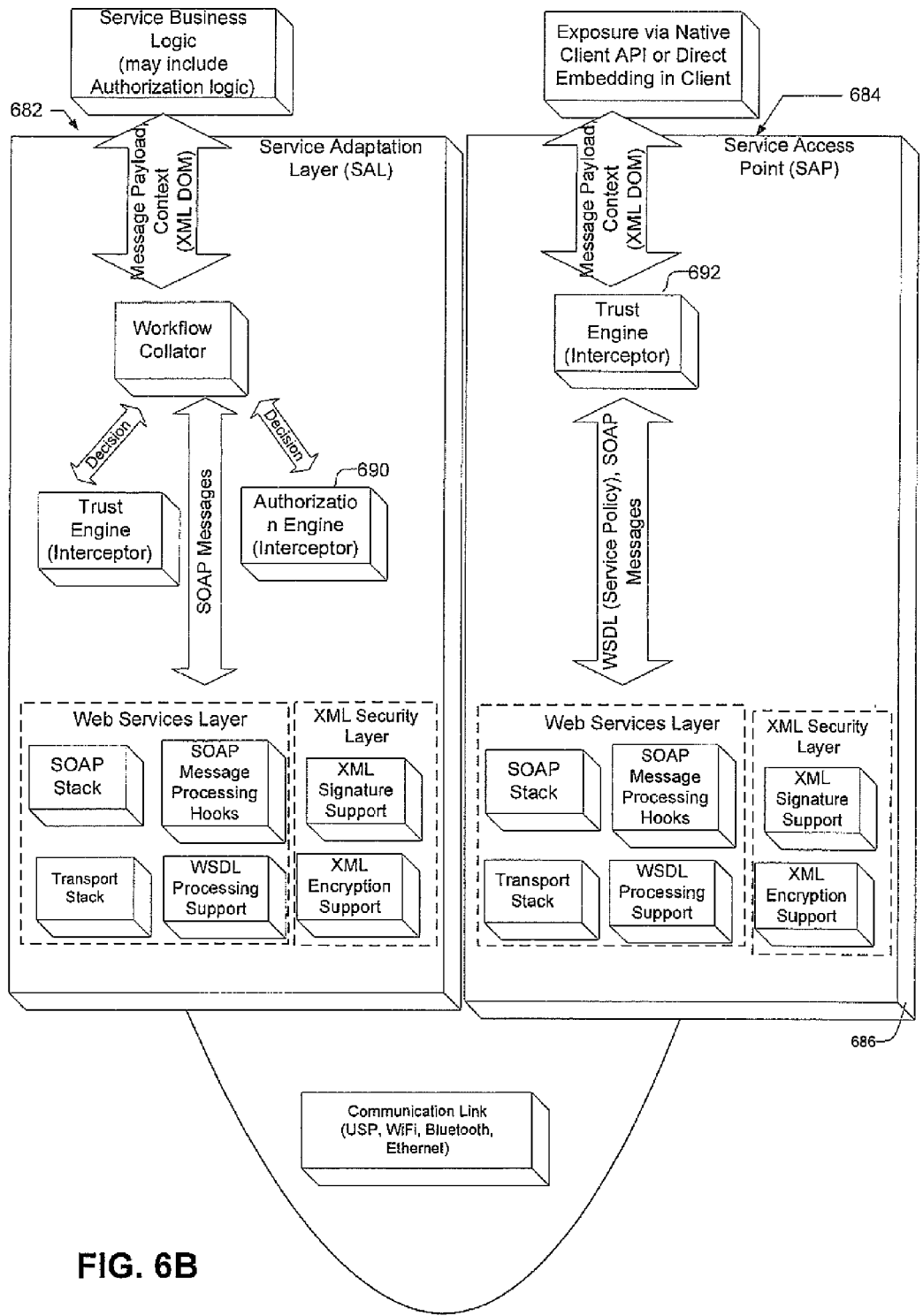
FIG. 6b is another example of an interaction between a service-providing system node and a service-consuming system node.

Another example interaction between NEMO nodes is illustrated in FIG. 6b. Service-providing node 682 interacts with client node 684 using SAP 686. In this example, service-providing node 682 includes a different but interoperable trust management layer than client 684. In particular, service-providing node 682 includes both a trust engine 688 and an authorization engine 690. In this example, trust engine 688 might be generally responsible for performing encryption and decryption of SOAP messages, for verifying digital certificates, and for performing other basic cryptographic operations, while authorization engine 690 might be responsible for making higher-level policy decisions. In the example shown in FIG. 6b, client node 684 includes a trust engine 692, but not an authorization engine. Thus, in this example, client node 684 might be capable of performing basic cryptographic operations and enforcing relatively simple policies (e.g., policies related to the level of message authenticity, confidentiality, or the like), but might rely on service providing node 682 to evaluate and enforce higher order policies governing the client's use of, and interaction with, the services and/or content provided by service providing node 682. It should be appreciated that FIG. 6b is provided for purposes of illustration and not limitation, and that in other embodiments client node 684 might also include an authorization engine, as might be the case if the client needed to adhere to a set of obligations related to a specified policy. Thus, it can be seen that different NEMO peers can contain different parts of the trust management framework depending on their requirements. FIG. 6b also illustrates that the communication link between nodes can be transport agnostic. Even in the context of a SOAP processing model, any suitable encoding of data and/or processing rules can be used. For example, the XML security model could be replaced with another security model that supported a different encoding scheme.

A Service Access Point may be implemented in a variety of forms, such as within the boundaries of a client (in the form of a shared library) or outside the boundaries of the client (in the form of an agent running in a different process). The exact form of the Service Access Point implementation can be tailored to the needs of a specific type of platform or client. From a client's perspective, use of the Service Access Point may be optional, although in general it provides significant utility, as illustrated below.

The Service Access Point may be implemented as a static component supporting only a fixed set of service protocol bindings, or it may be able to support new bindings dynamically.

Interactions involving the Service Access Point can be characterized from at least two perspectives—a client-side which the requesting participant uses, and a service-side which interacts with other NEMO-enabled endpoints (nodes).

Figure 7A:
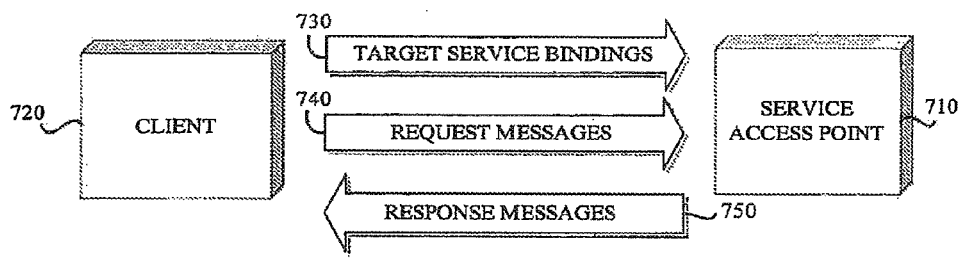
FIG. 7a illustrates a service access point involved in a client-side WSDL interaction.

In one client-side embodiment, illustrated in FIG. 7a, Service Access Point 710 directly exchanges XML messages with client 720. Client 720 forms request messages 740 directly and submits them to Service Access Point 710, which generates and sends one or more response messages 750 to client 720, where they are collected, parsed and processed. Client 720 may also submit (when making requests) explicit set(s) of service bindings 730 to use in targeting the delivery of the request. These service bindings may have been obtained in a variety of ways. For example, client 720 can perform service-discovery operations and then select which service bindings are applicable, or it can use information obtained from previous responses.

Figure 7B:
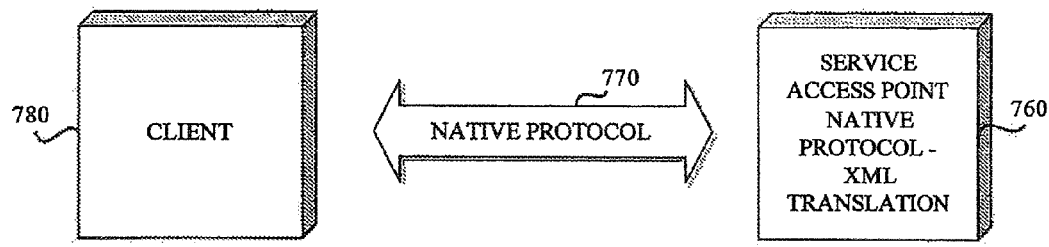
FIG. 7b illustrates a service access point involved in a client-side native interaction.

In another client-side embodiment, illustrated in FIG. 7b, Service Access Point 760 directly supports a native protocol 770 of client 780. Service Access Point 760 will translate messages internally between XML and that native protocol 770, thereby enabling client 780 to participate within the NEMO system. To effect such support, native protocol 770 (or a combination of native protocol 770 and the execution environment) must provide any needed information in some form to Service Access Point 760, which generates an appropriate request and, if necessary, determines a suitable target service binding.

On the service-side, multiple patterns of interaction between a client's Service Access Point and service-providing NEMO-enabled endpoints can be supported. As with the client-side, the interaction patterns can be tailored and may vary based on a variety of criteria, including the nature of the request, the underlying communication network, and the nature of the application and/or transport protocols associated with any targeted service bindings.

Figure 7C:
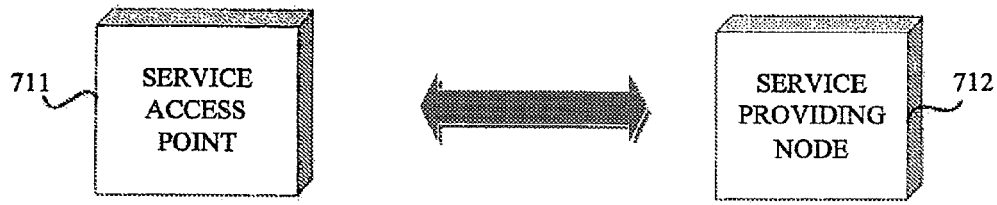
FIG. 7c illustrates a service access point involved in a service-side point-to-point interaction pattern.

A relatively simple type of service-side interaction pattern is illustrated in FIG. 7c, in which Service Access Point 711 communicates directly with the desired service-providing node 712 in a point-to-point manner.

Figure 7D:
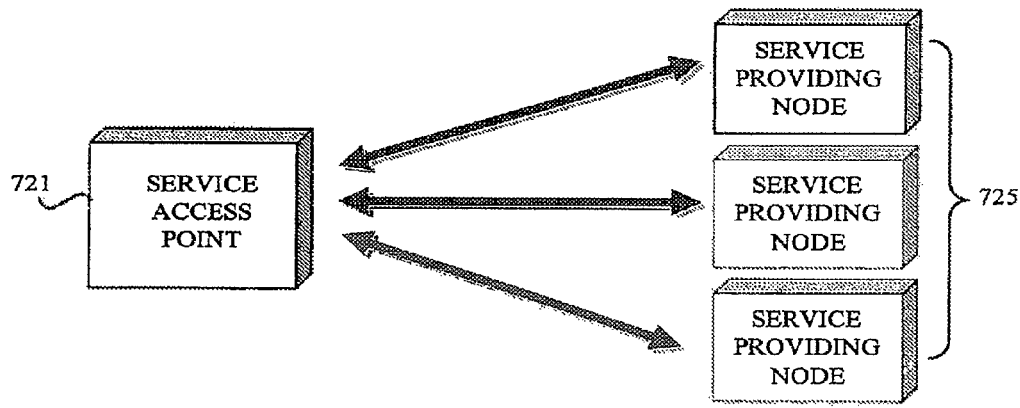
FIG. 7d illustrates a service access point involved in a service-side point-to-multiple point interaction pattern.

Turning to FIG. 7d, Service Access Point 721 may initiate communication directly with (and may receive responses directly from) multiple potential service providers 725. This type of interaction pattern may be implemented by relaying multiple service bindings from the client for use by Service Access Point 721; or a broadcast or multicast network could be utilized by Service Access Point 721 to relay messages. Based on preferences specified in the request, Service Access Point 721 may choose to collect and collate responses, or simply return the first acceptable response.

Figure 7E:
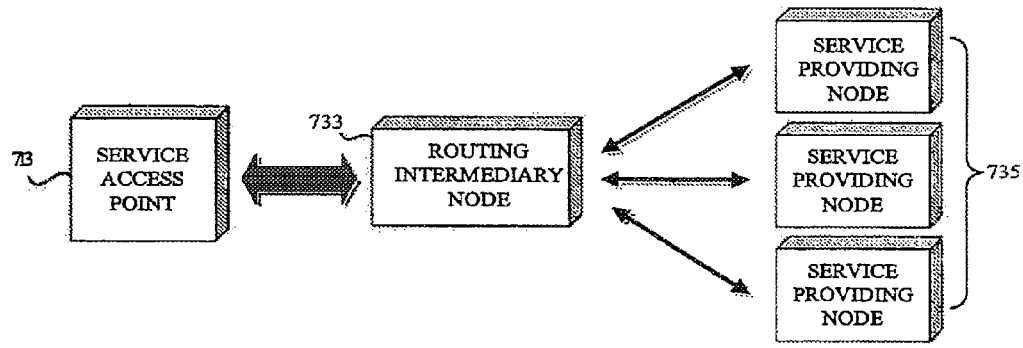
FIG. 7e illustrates a service access point involved in a service-side point-to-intermediary interaction pattern.

In FIG. 7e, Service Access Point 731 doesn't directly communicate with any targeted service-providing endpoints 735. Instead, requests are routed through an intermediate node 733 which relays the request, receives any responses, and relays them back to Service Access Point 731.

Such a pattern of interaction may be desirable if Service Access Point 731 is unable or unwilling to support directly any of the service bindings associated with service-providing endpoints 735, but can establish a relationship with intermediate node 733, which is willing to act as a gateway. Alternatively, the client may not be able to discover or otherwise determine the service bindings for any suitable service-providing nodes, but may be willing to allow intermediate node 733 to attempt to discover any suitable service providers. Finally, Service Access Point 731 may want to take advantage of intermediate node 733 because it supports more robust collection and collating functionality, which in turn permits more flexible communication patterns between Service Access Point 731 and service providers such as endpoint nodes 735.

In addition to the above basic service-side interaction patterns, combinations of such patterns or new patterns can be implemented within the Service Access Point. Although the Service Access Point is intended to provide a common interface, its implementation will typically be strongly tied to the characteristics of the communication models and associated protocols employed by given NEMO-enabled endpoints.

In practice, the Service Access Point can be used to encapsulate the logic for handling the marshalling and un-marshaling of I/O related data, such as serializing objects to appropriate representations, such as an XML representation (with a format expressed in WSDL), or one that envelopes XML-encoded objects in the proper format.

In a preferred embodiment, the SAP also encapsulates logic for communication via one or more supported application, session, and/or transport protocols, such as service invocation over HTTP using SOAP enveloping.

Finally, in some embodiments, the SAP may encapsulate logic for providing message integrity and confidentiality, such as support for establishing SSL/TLS sessions and/or signing/verifying data via standards such as XML-Signature and XML-Encryption. When the specific address of a service interface is unknown or unspecified (for example, when invoking a service across multiple nodes based on some search criteria), the SAP may encapsulate the logic for establishing an initial connection to a default/initial set of NEMO nodes where services can be discovered or resolved.

The following is an example, non-limiting embodiment of a high-level API description exported by one SAP embodiment:

ServiceAccessPoint::Create(Environment[ ])→ServiceAccessPoint—this is a singleton interface that returns an initialized instance of a SAP. The SAP can be initialized based on an optional set of environmental parameters.

ServiceAccessPoint::InvokeService(Service Request Message, Boolean)→Service Response Message—a synchronous service invocation API is supported where the client (using WSDL) forms an XML service request message, and receives an XML message in response. The API also accept a Boolean flag indicating whether or not the client should wait for a response. Normally, the flag will be true, except in the case of messages with no associated response, or messages to which responses will be delivered back asynchronously via another channel (such as via notification). The resulting message may also convey some resulting error condition.

ServiceAccessPoint::ApplyIntegrityProtection(Boolean, Desc[ ])→Boolean—This API allows the caller to specify whether integrity protection should be applied, and to which elements in a message it should be applied.

ServiceAccessPoint::ApplyConfidentiality(Boolean, Desc[ ])→Boolean—This API allows the caller to specify whether confidentiality should be applied and to which objects in a message it should be applied.

ServiceAccessPoint::SetKeyCallbacks(SigningKeyCallback, SignatureVerificationKeyCallback, EncryptionKeyCallback, DecryptionKeyCallback)→Boolean As indicated in the previous APIs, when a message is sent or received it may contain objects which require integrity protection or confidentiality. This API allows the client to set up any necessary hooks between itself and the SAP to allow the SAP to obtain keys associated with a particular type of trust management operation. In one embodiment, the interface is based on callbacks supporting integrity protection through digital signing and verification, and confidentiality through encryption and decryption. In one embodiment, each of the callbacks is of the form:

KeyCallback(KeyDesc)→Key[ ]

where KeyDesc is an optional object describing the key(s) required and a list of appropriate keys is returned. Signatures are validated as part of receiving response services messages when using the InvokeService( . . . ) API. If a message element fails verification, an XML message can be returned from InvokeService( . . . ) indicating this state and the elements that failed verification.

3.4. Service Adaptation Layer

As noted above, the Service Adaptation Layer provides a common way for service providers to expose their services, process requests and generate responses for services, and orchestrate services in the NEMO framework. It also provides a foundation on which other specific service interface bindings can be implemented. In one embodiment, WSDL is used to describe a service's interface within the system.

Such a service description might, in addition to defining how to bind to a service on a particular interface, also include a list of one or more authorization service providers that will be responsible for authorizing access to the service, a pointer to a semantic description of the purpose and usage of the service, and a description of the necessary orchestration for composite services resulting from the choreographed execution of one or more other services.

In addition to serving as the logical point at which services are exposed, the Service Adaptation Layer also preferably encapsulates the concrete representations of the NEMO data types and objects specified in NEMO service profiles for platforms that are supported by a given participant. It also contains a mechanism for mapping service-related messages to the appropriate native service implementation.

In one embodiment, the NEMO framework does not mandate how the Service Adaptation Layer for a given platform or participant is realized. In situations where a service-providing node does not require translation of its native service protocols—i.e., exposing its services only to client nodes that can communicate via that native protocol—then that service-providing node need not contain a Service Adaptation Layer.

Figure 8:
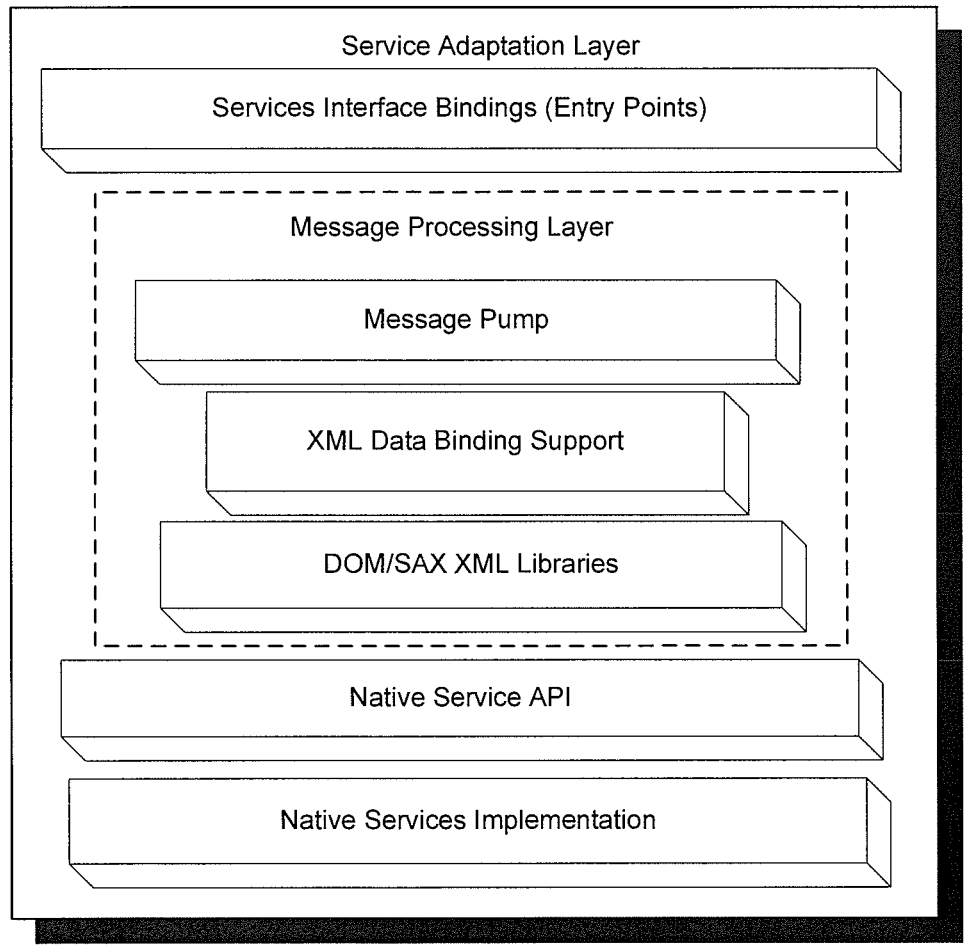
FIG. 8 illustrates an embodiment of the architecture of the service adaptation layer.

Otherwise, its Service Adaptation Layer will typically contain the following elements, as illustrated in FIG. 8:

Entry Points—a layer encapsulating the service interface entry points 810 and associated WSDL bindings. Through these access points, other nodes invoke services, pass parameter data, and collect results.

Message Processing Logic—a layer 820 that corresponds to the logic for message processing, typically containing a message pump 825 that drives the processing of messages, some type of XML data binding support 826, and low level XML parser and data representation support 827.

Native Services—a layer representing the native services available (onto which the corresponding service messages are mapped), including a native services API 830 and corresponding implementation 840.

3.5. Workflow Collator

In a preferred embodiment, a Workflow Collator (WFC) helps fulfill most nontrivial NEMO service requests by coordinating the flow of events of a request, managing any associated data including transient and intermediate results, and enforcing the rules associated with fulfillment. Examples of this type of functionality can be seen in the form of transaction coordinators ranging from simple transaction monitors in relational databases to more generalized monitors as seen in Microsoft MTS/COM+.

In one embodiment, the Workflow Collator is a programmable mechanism through which NEMO nodes orchestrate the processing and fulfillment of service invocations. The WFC can be tailored toward a specific NEMO node's characteristics and requirements, and can be designed to support a variety of functionality ranging from traditional message queues to more sophisticated distributed transaction coordinators. A relatively simple WFC might provide an interface for storage and retrieval of arbitrary service-related messages. By building on this, it is possible to support a wide variety of functionality including (i) collection of service requests for more effective processing; (ii) simple aggregation of service responses into a composite response; (iii) manual orchestration of multiple service requests and service responses in order to create a composite service; and (iv) automated orchestration of multiple service requests and service responses in order to create a composite service.

A basic service interaction pattern begins with a service request arriving at some NEMO node via the node's Service Adaptation Layer. The message is handed off to the WSDL Message Pump that initially will drive and in turn be driven by the WFC to fulfill the request and return a response. In even more complex scenarios, the fulfillment of a service request might require multiple messages and responses and the participation of multiple nodes in a coordinated fashion. The rules for processing requests may be expressed in the system's service description language or using other service orchestration description standards such as BPEL.

When a message is given to the WFC, the WFC determines the correct rules for processing this request. Depending upon the implementation of the WFC, the service description logic may be represented in the form of a fixed state machine for a set of services that the node exposes or it may be represented in ways that support the processing of a more free form expression of the service processing logic.

In a preferred embodiment the WFC architecture is modular and extensible, supporting plug-ins. In addition to interpreting service composition and processing rules, the WFC may need to determine whether to use NEMO messages in the context of initiating a service fulfillment processing lifecycle, or as input in the chain of an ongoing transaction. In one embodiment, NEMO messages include IDs and metadata that are used to make these types of determinations. NEMO messages also can be extended to include additional information that may be service transaction specific, facilitating the processing of messages.

As discussed in greater detail below, notification services are directly supported by various embodiments of the NEMO system. A notification represents a message targeted at interested NEMO-enabled nodes received on a designated service interface for processing. Notifications may carry a diverse set of payload types for conveying information and the criteria used to determine if a node is interested in a notification is extensible, including identity-based as well as event-based criteria.

Figure 9A:
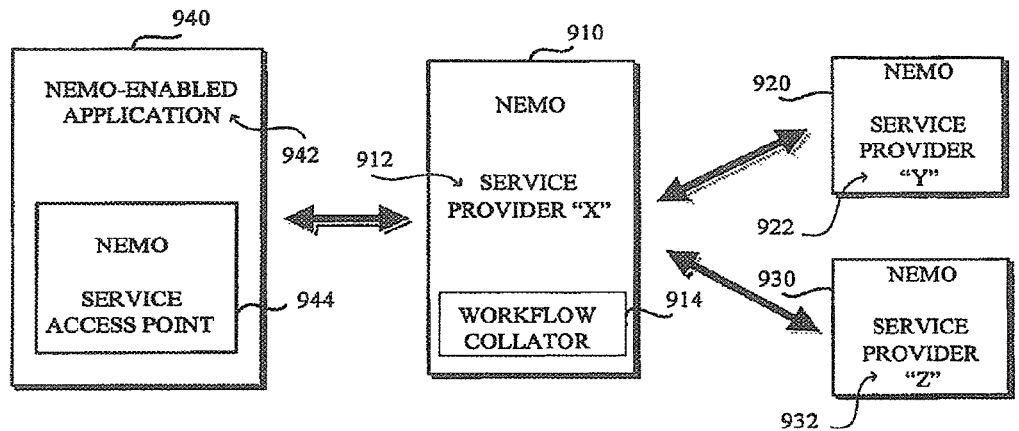
FIG. 9a illustrates an interaction pattern of a workflow collator relying upon external service providers.

In one embodiment, illustrated in FIG. 9a, a service-providing NEMO node 910 provides a service that requires an orchestration process by its Workflow Collator 914 (e.g., the collection and processing of results from two other service providers) to fulfill a request for that service from client node 940.

When NEMO-enabled application 942 on client node 940 initiates a request to invoke the service provided by service provider 910, Workflow Collator 914 in turn generates messages to initiate its own requests (on behalf of application 942), respectively, to Service Provider "Y" 922 on node 920 and Service Provider "Z" 932 on node 930. Workflow Collator 914 then collates and processes the results from these two other service-providing nodes in order to fulfill the original request from client node 940.

Figure 9B:
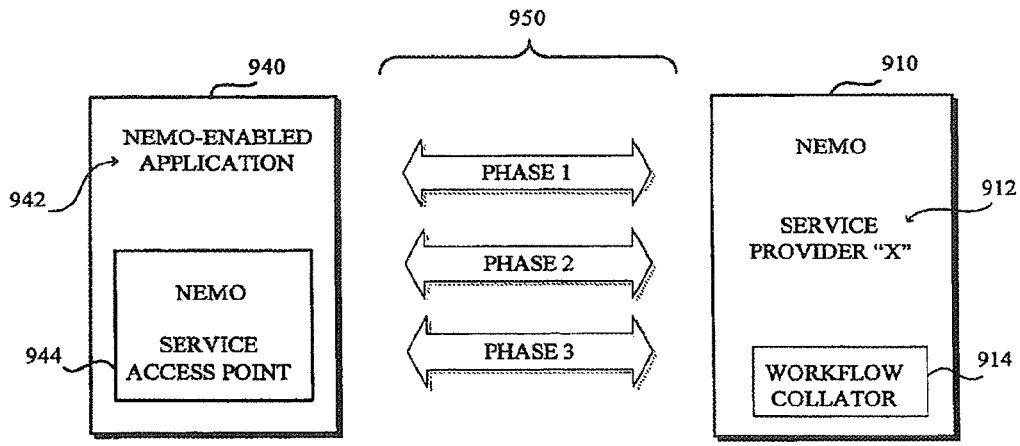
FIG. 9b illustrates an interaction pattern of a workflow collator involved in direct multi-phase communications with a client node.

Alternatively, a requested service might not require the services of multiple service-providing nodes; but might instead require multiple rounds or phases of communication between the service-providing node and the requesting client node. As illustrated in FIG. 9b, when NEMO-enabled application 942 on client node 940 initiates a request to invoke the service provided by service provider 910, Workflow Collator 914 in turn engages in multiple phases of communication 950 with client node 940 in order to fulfill the original request. For example, Workflow Collator 914 may generate and send messages to client node 940 (via Access Point 944), receive and process the responses, and then generate additional messages (and receive additional responses) during subsequent phases of communication, ultimately fulfilling the original request from client node 940.

In this scenario, Workflow Collator 914 is used by service provider 910 to keep track (perhaps based on a service-specific session ID or transaction ID as part of the service request) of which phase of the operation it is in with the client for correct processing. As noted above, a state machine or similar mechanism or technique could be employed to process these multiple phases of communication 950.

Figure 9C:
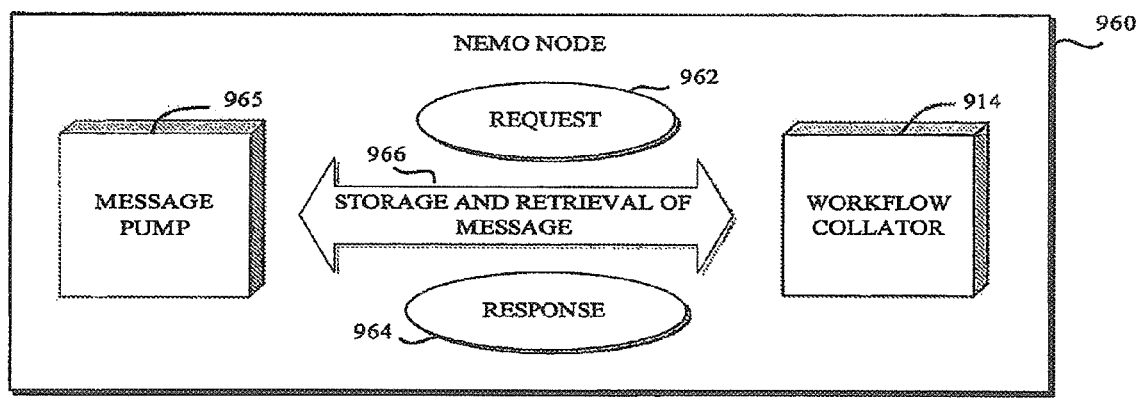
FIG. 9c illustrates a basic intra-node interaction pattern of a workflow collator.

FIG. 9c illustrates one embodiment of a relatively basic interaction, within service-providing node 960, between Workflow Collator 914 and Message Pump 965 (within the node's Service Adaptation Layer, not shown). As noted above, Workflow Collator 914 processes one or more service requests 962 and generates responses 964, employing a storage and retrieval mechanism 966 to maintain the state of this orchestration process. In this simple example, Workflow Collator 914 is able to process multiple service requests and responses, which could be implemented with a fairly simple state machine.

Figure 9D:
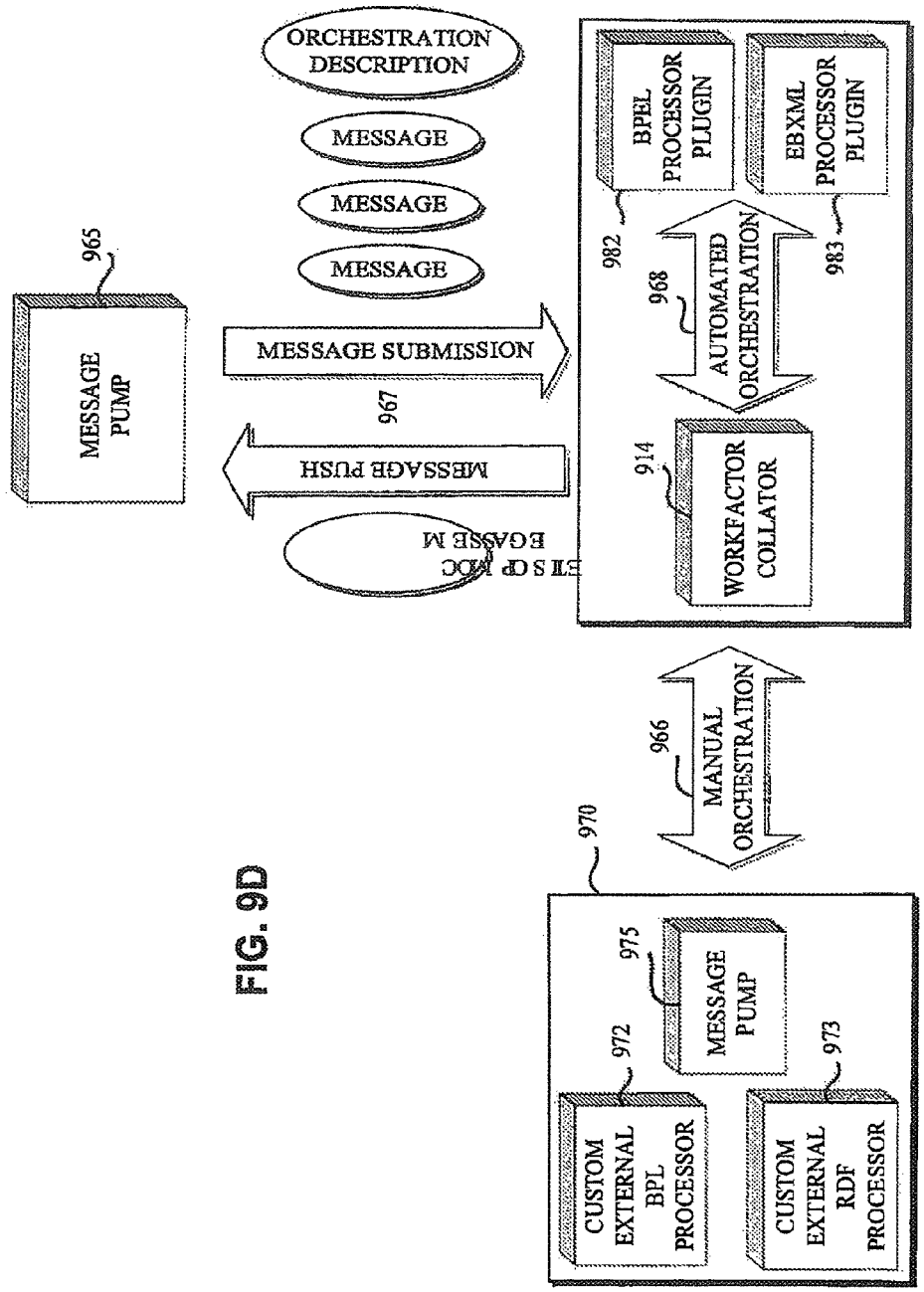
FIG. 9d illustrates a relatively complex interaction pattern of a workflow collator.

For more complex processing, however, FIG. 9d illustrates a node architecture that can both drive or be driven in performing service orchestration. Such functionality includes the collection of multiple service requests, aggregation of responses into a composite response, and either manual or automated orchestration of multiple service requests and responses in order to create a composite service.

A variety of scenarios can be supported by the architecture surrounding Workflow Collator 914 in FIG. 9d. For example, by having a NEMO node combine its functionality with that of an external coordinator 970 that understands the semantics of process orchestration (such as a Business Process Language engine driven by a high level description of the business processes associated with services) or resource usage semantics (such as a Resource Description Framework engine which can be driven by the semantic meaning of resources in relationship to each other), it is possible to create more powerful services on top of simpler ones. Custom External BPL 972 and/or RDF 973 processors may leverage external message pump 975 to execute process descriptions via a manual orchestration process 966, i.e., one involving human intervention.

In addition to relying on a manually driven process that relies on an external coordinator working in conjunction with a NEMO node's message pump, it is also possible to create an architecture where modules may be integrated directly with Workflow Collator 914 to support an automated form of service coordination and orchestration 968. For example, for regular types of service orchestration patterns, such as those represented in BPEL and EBXML and communicated in the web service bindings associated with a service interface, Workflow Collator 914 can be driven directly by a description and collection of request and response messages 967 that arrive over time. In this scenario, a composite response message is pushed to Message Pump 965 only when the state machine associated with the given orchestration processor plug-in (e.g., BPEL 982 or EBXML 983) has determined that it is appropriate.

Following is an embodiment of a relatively high-level API description exported by an embodiment of a NEMO Workflow Collator:

WorkflowCollator::Create(Environment[ ])→WorkflowCollator—this is a singleton interface that returns an initialized instance of a WFC. The WFC can be initialized based on an optional set of environmental parameters.

WorkflowCollator::Store(Key[ ], XML Message)→Boolean—this API allows the caller to store a service message within the WFC via a set of specified keys.

WorkflowCollator::RetrieveByKey(Key[ ], XML Message)→XML Message[ ]—this API allows the caller to retrieve a set of messages via a set of specified keys. The returned messages are no longer contained within the WFC.

WorkflowCollator::PeekByKey(Key[ ], XML Message)→XML Message[ ]—this API allows the caller to retrieve a set of messages via a set of specified keys. The returned messages are still contained within the WFC.

WorkflowCollator::Clear( )→Boolean—this API allows the caller to clear any messages stored within the WFC.

As an alternative to the relatively rigid BPEL orchestration standard, another embodiment could permit a more ad hoc XML-based orchestration description—e.g., for a more dynamic application, such as a distributed search. Consider the following description that could be interpreted by a NEMO Workflow Collator (and could possibly even replace an entire service given a sufficiently rich language):

```
<WSDL>
    <NEMO Orchestration Descriptor>
        <Control Flow>         e.g., EXECUTE Service A;
                               If result = Yes then Service B;
                               Else Service C
        <Shared State/Context> e.g., Device State
        <Transactions>         e.g., State, Rollback, etc
        <Trust/Authorization>  Note that Trust not necessarily
                               transitive
```

3.6. Exemplary DRM Engine Architecture

In the context of the various embodiments of the NEMO node architecture described above, FIG. 10 illustrates the integration of a modular embodiment of a DRM Engine 1000 into a NEMO content consumption device, thereby facilitating its integration into many different devices and software environments.

Host application 1002 typically receives a request to access a particular piece of content through its user interface 1004. Host application 1002 then sends the request, along with relevant DRM engine objects (preferably opaque to the host application), to DRM engine 1000. DRM engine 1000 may make requests for additional information and cryptographic services to host services module 1008 through well-defined interfaces. For example, DRM engine 1000 may ask host services 1008 whether a particular link is trusted, or may ask that certain objects be decrypted. Some of the requisite information may be remote, in which case host services 1008 can request the information from networked services through a service access point 1014.

Once DRM engine 1000 has determined that a particular operation is permitted, it indicates this and returns any required cryptographic keys to host services 1008 which, under the direction of host application 1002, relies on content services 1016 to obtain the desired content and manage its use. Host services 1008 might then initiate the process of media rendering 1010 (e.g., playing the content through speakers, displaying the content on a screen, etc.), coordinated with cryptography services 1012 as needed.

Figure 10:
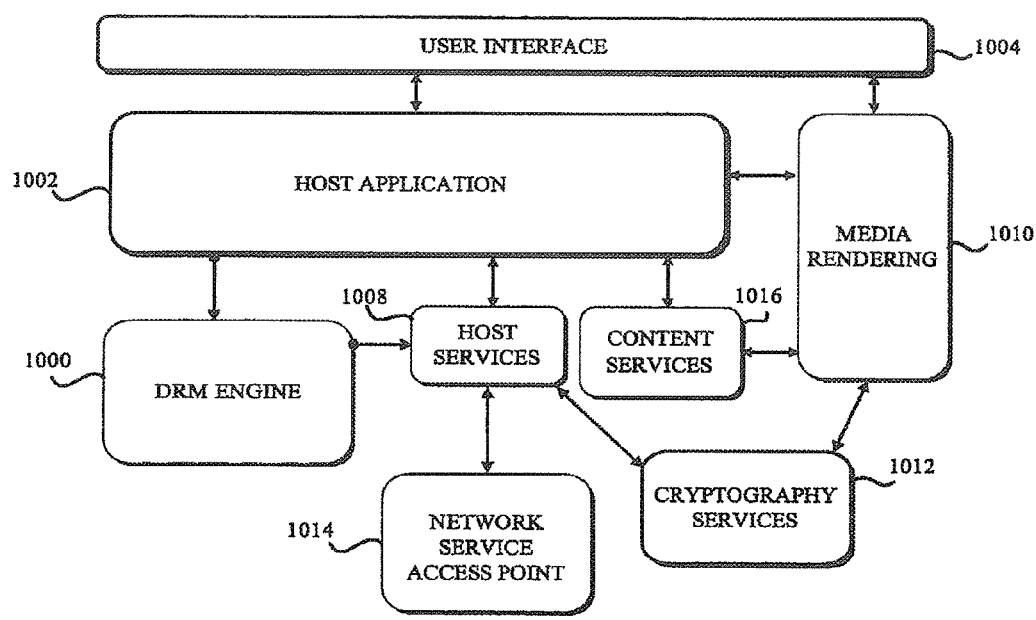
FIG. 10 illustrates the system integration of a DRM engine.

The system architecture illustrated in FIG. 10 is a relatively simple example of how the DRM engine can be used in applications, but it is only one of many possibilities. For example, in other embodiments, the DRM engine can be integrated into packaging applications under the governance of relatively sophisticated policy management systems. Both client (content consumption) and server (content packaging) applications of the DRM engine, including descriptions of the different types of DRM-related objects relied upon by such applications, will be discussed below, following a description of one embodiment of the internal architecture of the DRM engine itself.

Figure 11:
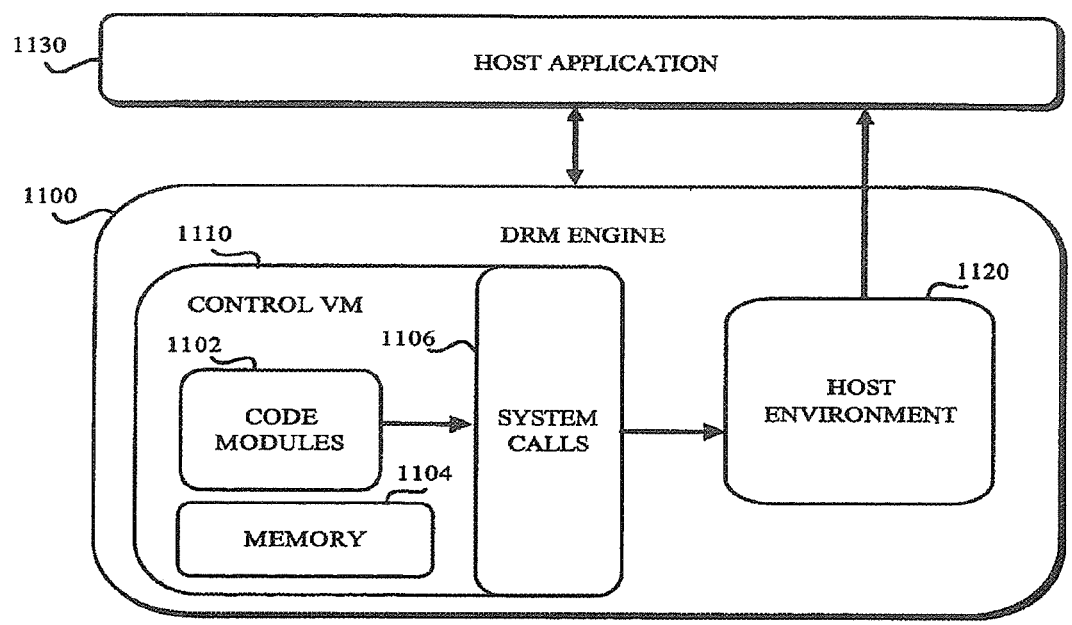
FIG. 11 illustrates an embodiment of the architecture of a DRM engine.

DRM Engine 1100, illustrated in FIG. 11, relies on a virtual machine, control VM 1110, for internal DRM processing (e.g., executing control programs that govern access to content) within a broad range of host platforms, utilizing host environment 1120 (described above, and in greater detail below) to interact with the node's host application 1130 and, ultimately, other nodes within, e.g., the NEMO or other system.

In one embodiment, control VM 1110 is a virtual machine used by an embodiment of DRM Engine 1100 to execute control programs that govern access to content. Following is a description of the integration of control VM 1110 into the architecture of DRM engine 1100, as well as some of the basic elements of the control VM, including details about its instruction set, memory model, code modules, and interaction with host environment 1120 via system calls 1106.

In one embodiment, control VM 1110 is a relatively small-footprint virtual machine that is designed to be easy to implement using various programming languages. It is based on a stack-oriented instruction set that is designed to be minimalist in nature, without much concern for execution speed or code density. However, it will be appreciated that, if execution speed and/or code density were issues in a given application, conventional techniques (e.g., data compression) could be used to improve performance.

Control VM 1100 is suitable as a target for low or high level programming languages, and supports languages such as assembler, C, and FORTH. Compilers for other languages, such as Java or custom languages, could also be implemented with relative ease.

Control VM 1110 is designed to be hosted within DRM Engine 1100, including host environment 1120, as opposed to being run directly on a processor or in silicon. Control VM 1110 runs programs by executing instructions stored in Code Modules 1102. Some of these instructions can make calls to functions implemented outside of the program itself by making one or more System Calls 1106, which are either implemented by Control VM 1110 itself, or delegated to Host Environment 1120.

Execution Model

Control VM 1110 executes instructions stored in code modules 1102 as a stream of byte code loaded in memory 1104. Control VM 1110 maintains a virtual register called the program counter (PC) that is incremented as instructions are executed. The VM executes each instruction, in sequence, until the OP_STOP instruction is encountered, an OP_RET instruction is encountered with an empty call stack, or an exception occurs. Jumps are specified either as a relative jump (specified as a byte offset from the current value of PC), or as an absolute address.

Memory Model

In one embodiment, control VM 1110 has a relatively simple memory model. VM memory 1104 is separated into a data segment (DS) and a code segment (CS). The data segment is a single, flat, contiguous memory space, starting at address 0. The data segment is typically an array of bytes allocated within the heap memory of host application 1130 or host environment 1120. For a given VM implementation, the size of the memory space is preferably fixed to a maximum; and attempts to access memory outside of that space will cause faults and terminate program execution. The data segment is potentially shared between several code modules 1102 concurrently loaded by the VM. The memory in the data segment can be accessed by memory-access instructions, which can be either 32-bit or 8-bit accesses. 32-bit memory accesses are accomplished using the big-endian byte order. No assumptions are made with regard to alignment between the VM-visible memory and the host-managed memory (host CPU virtual or physical memory).

In one embodiment, the code segment is a flat, contiguous memory space, starting at address 0. The code segment is typically an array of bytes allocated within the heap memory of host application 1130 or host environment 1120.

Control VM 1110 may load several code modules, and all of the code modules may share the same data segment (each module's data is preferably loaded at a different address), but each has its own code segment (e.g., it is preferably not possible for a jump instruction from one code module 1102 to cause a jump directly to code in another code module 1102).

Data Stack

In a preferred embodiment, the VM has a notion of a data stack, which represents 32-bit data cells stored in the data segment. The VM maintains a virtual register called the stack pointer (SP). After reset, SP points to the end of the data segment, and the stack grows downward (when data is pushed onto the data stack, the SP registers are decremented). The 32-bit values on the stack are interpreted either as 32-bit addressed, or 32-bit signed, integers, depending on the instruction referencing the stack data.

Call Stack

In one embodiment, control VM 1110 manages a call stack for making nested subroutine calls. The values pushed onto this stack cannot be read or written directly by the memory-access instructions, but are used indirectly by the VM when executing OP_JSR and OP_RET instructions. For a given VM profile, the size of this return address stack is preferably fixed to a maximum, which will allow a certain number of nested calls that cannot be exceeded.

Instruction Set

In one embodiment, control VM 1110 uses a relatively simple instruction set. Even with a limited number of instructions; however, it is still possible to express simple programs. The instruction set is stack-based: except for the OP_PUSH instruction, none of the instructions have direct operands. Operands are read from the data stack, and results are pushed onto the data stack. The VM is a 32-bit VM: all the instructions in this illustrative embodiment operate on 32-bit stack operands, representing either memory addresses or signed integers. Signed integers are represented using a 2s complement binary encoding.

An illustrative instruction set used in one embodiment is shown below:

| OP CODE | Name | Operands | Description |
| --- | --- | --- | --- |
| OP_PUSH | Push Constant | N (direct) | Push a constant on the stack |
| OP_DROP | Drop | | Remove top of stack |
| OP_DUP | Duplicate | | Duplicate top of stack |
| OP_SWAP | Swap | | Swap top two stack elements |

-continued

| OP CODE | Name | Operands | Description |
| --- | --- | --- | --- |
| OP_ADD | Add | A, B | Push the sum of A and B (A + B) |
| OP_MUL | Multiply | A, B | Push the product of A and B (A*B) |
| OP_SUB | Subtract | A, B | Push the difference between A and B (A − B) |
| OP_DIV | Divide | A, B | Push the division of A by B (A/B) |
| OP_MOD | Modulo | A, B | Push A modulo B (A % B) |
| OP_NEG | Negate | A | Push the 2s complement negation of A (−A) |
| OP_CMP | Compare | A | Push −1 if A negative, 0 if A is 0, and 1 is a positive |
| OP_AND | And | A, B | Push bit-wise AND of A and B (A & B) |
| OP_OR | Or | A, B | Push the bit-wise OR of A and B (A \| B) |
| OP_XOR | Exclusive Or | A, B | Push the bit-wise eXclusive OR of A and B (A ^ B) |
| OP_NOT | Logical Negate | A | Push the logical negation of A (1 if A is 0, and 0 if A is not 0) |
| OP_SHL | Shift Left | A, B | Push A logically shifted left by B bits (A << B) |
| OP_SHR | Shift Right | A, B | Push A logically shifted right by B bits (A >> B) |
| OP_JSR | Jump to Subroutine | A | Jump to subroutine at absolute address A |
| OP_JSRR | Jump to Subroutine (Relative) | A | Jump to subroutine at PC + A |
| OP_RET | Return from Subroutine | | Return from subroutine |
| OP_BRA | Branch Always | A | Jump to PC + A |
| OP_BRP | Branch If Positive | A, B | Jump to PC + A if B > 0 |
| OP_BRN | Branch if Negative | A, B | Jump to PC + A If B < 0 |
| OP_BRZ | Branch if Zero | A, B | Jump to PC + A if B is 0 |
| OP_JMP | Jump | A | Jump to A |
| OP_PEEK | Peek | A | Push the 32-bit value at address A |
| OP_POKE | Poke | A, B | Store the 32-bit value B at address A |
| OP_PEEKB | Peek Byte | A | Push the 8-bit value at address A |
| OP_POKEB | Poke Byte | A, B | Store the least significant bits of B at address A |
| OP_PUSHSP | Push Stack Pointer | | Push the value of SP |
| OP_POPSP | Pop Stack Pointer | A | Set the value of SP to A |
| OP_CALL | System Call | A | Perform System Call with index A |
| OP_STOP | Stop | | Terminate Execution |

Module Format

In one embodiment, code modules 1102 are stored in an atom-based format that is essentially equivalent to the atom structure used in the MPEG-4 file format. An atom consists of 32 bits, stored as 4-octets in big-endian byte order, followed by a 4-octet type (usually octets that correspond to ASCII values of letters of the alphabet), followed by the payload of the atom (size-8 octets).

3.7. DRM Client-Server Architecture: Content Consumption and Packaging

As noted above, DRM client-side consuming applications (e.g., media players) consume DRM content (e.g., play a song, display a movie, etc.). DRM service-side packaging applications (typically residing on a server) package content (e.g., associate with the content relevant usage and distribution rights, cryptographic keys, etc.) targeted to DRM clients.

Figure 12A:
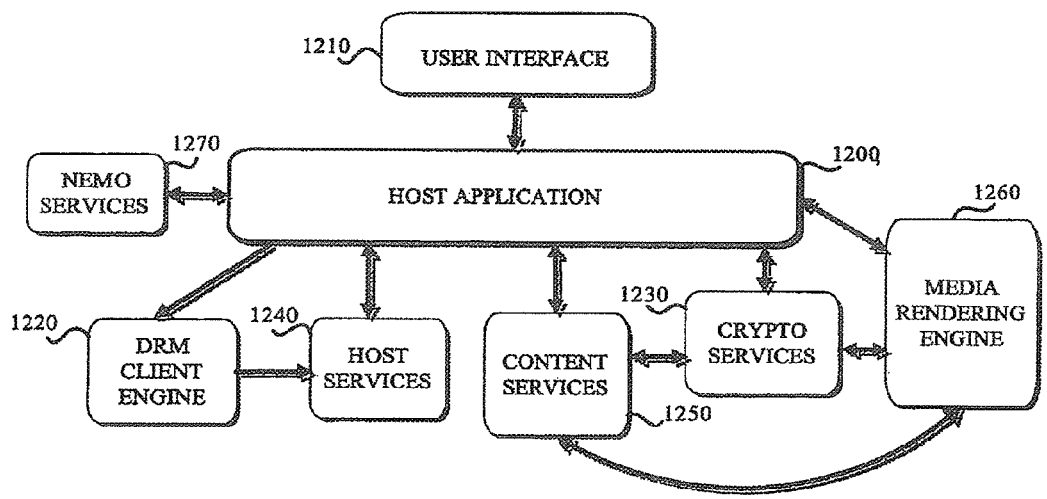
FIG. 12a illustrates a DRM engine and related elements within a client-side system node.

FIG. 12a illustrates one embodiment of the main architectural elements of a DRM client. Host application 1200 interfaces with a device user (e.g., the owner of a music player) through user interface 1210. The user might, for example, request access to protected content and receive metadata along with the content (e.g., text displaying the name of the artist and song title, along with the audio for the song itself).

Host application 1200, in addition to interacting with user interface 1210, also performs various functions necessary to implement the user's request, which may include managing interaction with the other DRM client modules to which it delegates certain functionality. For example, host application 1200 may manage interaction with the file system to extract the requested content. Host application also preferably recognizes the protected content object format and issues a request to the DRM engine 1220 to evaluate the DRM objects that make up the license (e.g., by running the relevant control program) to determine whether permission to access the protected content should be granted.

If permission is granted, Host Application 1200 might also need to verify required signatures and delegate to crypto services 1230 any other general purpose cryptographic functions required by DRM engine 1220. DRM Engine 1220 is responsible for evaluating the DRM objects, confirming or denying permission, and providing the keys to host application 1200 to decrypt the content.

Host services 1240 provides DRM Engine 1220 with access to data managed by (as well as certain library functions implemented by) host application 1200. Host application 1200 interacts with content services 1250 to access the protected content, passing to DRM engine 1220 only that portion of the content requiring processing. Content services 1250 acquires the content from external media servers and stores and manages the content, relying on the client's persistent storage mechanisms.

Once the content is cleared for access, host application 1200 interacts with media rendering engine 1260 (e.g., by delivering keys) to decrypt and render the content via the client's AV output facilities. Some of the information needed by DRM Engine 1220 may be available in-band with the content, and can be acquired and managed via content services 1250, while other information may need to be obtained through external NEMO DRM services or some other source.

In a preferred embodiment, all of the cryptographic operations (encryption, signature verification, etc.) are handled by crypto services 1230, which interacts indirectly with DRM engine 1220 via host services 1240, which forwards requests. Crypto services 1230 can also be used by media rendering engine 1260 to perform content decryption.

Figure 12B:
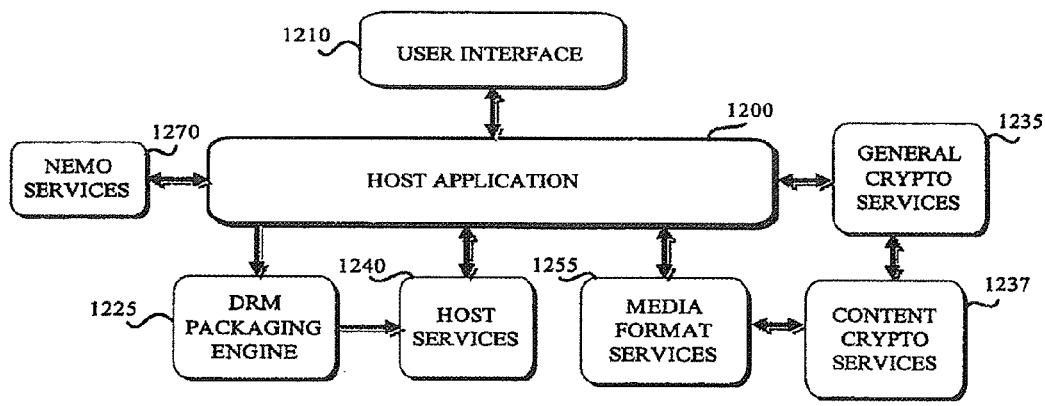
FIG. 12b illustrates a DRM engine and related elements within a service-side system node.

Turning to the service side, FIG. 12b illustrates an embodiment of the main architectural elements of an exemplary DRM service-side packaging node. Host application 1200 interfaces with a content packager (e.g., an owner or distributor of music content) through user interface 1210. The packager might, for example, provide content and licensing information to host application 1200 so that the content can be protected (e.g., encrypted and associated with limited access rights) and distributed to various end user and intermediate content providing nodes.

Host application 1200, in addition to interacting with user interface 1210, can also perform various functions necessary to implement the packager's request, including, for example, managing interaction with the other DRM packaging modules to which it delegates certain functionality. For example, it may manage interaction with general crypto services 1235 to encrypt the content. It may also create a content object that contains or references the content and contains or references a license (e.g., after DRM packaging engine 1225 creates the DRM objects that make up the license). Metadata can be associated with the license that explains what the license is about in a human-readable way (e.g., for potential client users to view).

As noted above, host application 1200 interacts with the user via user interface 1210. It is responsible for getting information such as a content reference and the action(s) the packager wants to perform (e.g., who to bind the content to). It can also display information about the packaging process such as the text of the license issued and, if a failure occurs, the reason for this failure. Some information needed by host application 1200 may require the use of NEMO Services 1270 (e.g., to leverage services such as authentication or authorization as well as membership).

In one embodiment, host application 1200 delegates to media format services 1255 responsibility for managing all media format operations, such as transcoding and packaging. General crypto services 1235 is responsible for issuing and verifying signatures, as well as encrypting and decrypting certain data. The request for such operations could be issued externally or from DRM packaging engine 1225 via host services 1240.

In one embodiment, content crypto services 1237 is logically separated from general crypto services 1235 because it is unaware of host application 1200. It is driven by media format services 1255 at content packaging time with a set of keys previously issued by DRM packaging engine 1225 (all of which is coordinated by host application 1200).

3.8. DRM Content Protection and Governance Objects

In an illustrative scenario, a content provider uses a host application that relies on a DRM packager engine to create a set of objects that protect the content and govern its use, including conveying the information necessary for obtaining the content encryption keys. The term, license, is used to encompass this set of objects.

In a preferred embodiment, the content and its license are logically separate, but are bound together by internal references using object IDs. The content and license are usually stored together, but could be stored separately if necessary or desirable. A license can apply to more than one item of content, and more than one license can apply to any single item of content.

Figure 13:
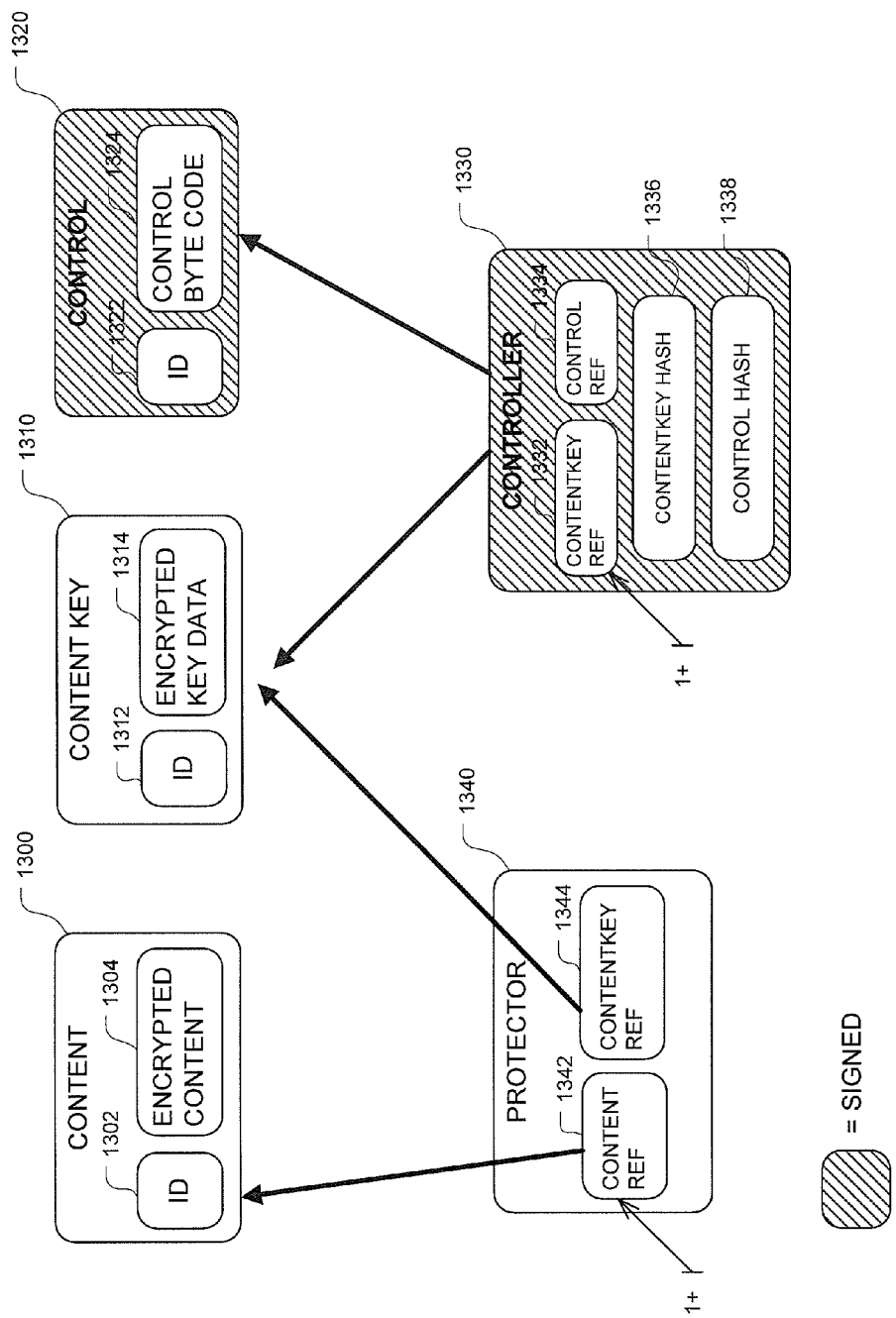
FIG. 13 illustrates an embodiment of content protection and governance DRM objects.

FIG. 13 illustrates an embodiment of such a license, including the relationships among the set of objects discussed below. Note that control object 1320 and controller object 1330 are both signed objects in this embodiment, so that the DRM client engine can verify that the control information comes from a trusted source prior to providing the host application with permission to access the protected content. In this embodiment, all of these objects, with the exception of content object 1300, are created by the DRM client engine.

Content object. Content object 1300 represents the encrypted content 1304, using a unique ID 1302 to facilitate the binding between the content and its associated key. Content object 1300 is an "external" object. The format and storage of encrypted content 1304 (e.g., MP4 movie file, MP3 music track, etc.) is determined by the host application (or delegated to a service), based in part upon the type of content. The format of the content also provides support for associating ID 1302 with encrypted content 1304. The packager's host application encrypts the content in a format-dependent manner, and manages content object 1300, using any available cryptosystem (e.g., using a symmetric cipher, such as AES).

ContentKey object—ContentKey object 1310 represents the encrypted key data 1314 (including a unique encryption key(s), optionally stored internally within the object), and also has a corresponding unique ID 1312. Preferably, this key data, if contained within ContentKey object 1310, is itself encrypted so that it can only be identified by those authorized to decrypt the content. ContentKey object 1310 also specifies which cryptosystem was used to encrypt this key data. This cryptosystem, an embodiment of which is discussed in greater detail below, is referred to as the "key distribution system."

Control object—Control object 1320 includes and protects the control program (e.g., control byte code 1324) that represents the rules that govern the use of the keys used to encrypt and decrypt the content. It also includes ID 1322 so that it can be bound to the corresponding ContentKey object. As noted above, control object 1320 is signed so that the DRM client engine can verify the validity of the binding between the ContentKey 1310 and control 1320, as well as the binding between the ContentKey ID 1312 and the encrypted key data 1314. The validity of control byte code 1324 can optionally be derived by verifying a secure hash (e.g., control hash 1338, if available) contained in controller object 1330.

Controller object—Controller object 1330 represents the binding between the keys and the rules governing their control, using IDs 1312 and 1322, respectively, to bind the ContentKey 1310 and control 1320 objects. Controller object 1330 governs the use of protected content by controlling application of the rules to that content—i.e., by determining which control governs the use of which ContentKey object 1310. Controller object 1330 also contains a hash 1336 value for each of the ContentKey objects 1310 that it references, in order to prevent tampering with the binding between each ContentKey object 1310 and its corresponding encrypted key data 1314. As noted above, controller objects 1330 are preferably signed (e.g., by a packager application that has a certificate allowing it to sign controller objects, using public key or symmetric key signatures, as discussed below) to enable verification of the validity of the binding between the ContentKey 1310 and control 1320 objects, as well as the binding between the ContentKey ID 1312 and the encrypted key data 1314. As also noted above, controller object 1330 also optionally contains control hash 1338, which allows the validity of control object 1320 to be derived without having to separately verify its signature.

Symmetric Key Signature—In a preferred embodiment, a symmetric key signature is the most common type of signature for controller objects 1330. In one embodiment, this type of signature is implemented by computing a MAC (Message Authentication Code) of the controller object 1330, keyed with the same key as the key represented by the ContentKey object 1310.

Public Key Signature—In a preferred embodiment, this type of signature is used when the identity of the signer of the controller object 1330 needs to be asserted uniquely. This type of signature is implemented with a public key signature algorithm, signing with the private key of the principal who is asserting the validity of this object. When using this type of signature, the ContentKey binding information carried in the controller object 1330 preferably contains a hash 1336 of the key contained in the ContentKey object 1310, concatenated with a fingerprint of the signing private key (typically a hash of the private key). This binding ensures that the signer of the object has knowledge of the key used to protect the content.

Protector object—Protector object 1340 provides protected access to content by controlling the use of keys used to encrypt and decrypt that content. Protector object 1340 binds content object 1300 to ContentKey object 1310 in order to associate protected content with its corresponding key(s). To accomplish this binding, it includes references 1342 and 1344, respectively, to the IDs 1302 and 1312 of content 1300 and ContentKey 1310. In one embodiment, protector object 1340 contains information not only as to which key was used to encrypt one or more content items, but also as to which encryption algorithm was employed. In one embodiment, if content reference 1342 references more than one content object 1300, ContentKey reference 1344 may still reference only one ContentKey object 1310, indicating that all of those content items were encrypted using the same encryption algorithm and the same key.

3.9. DRM Node and Link Objects

Figure 14:
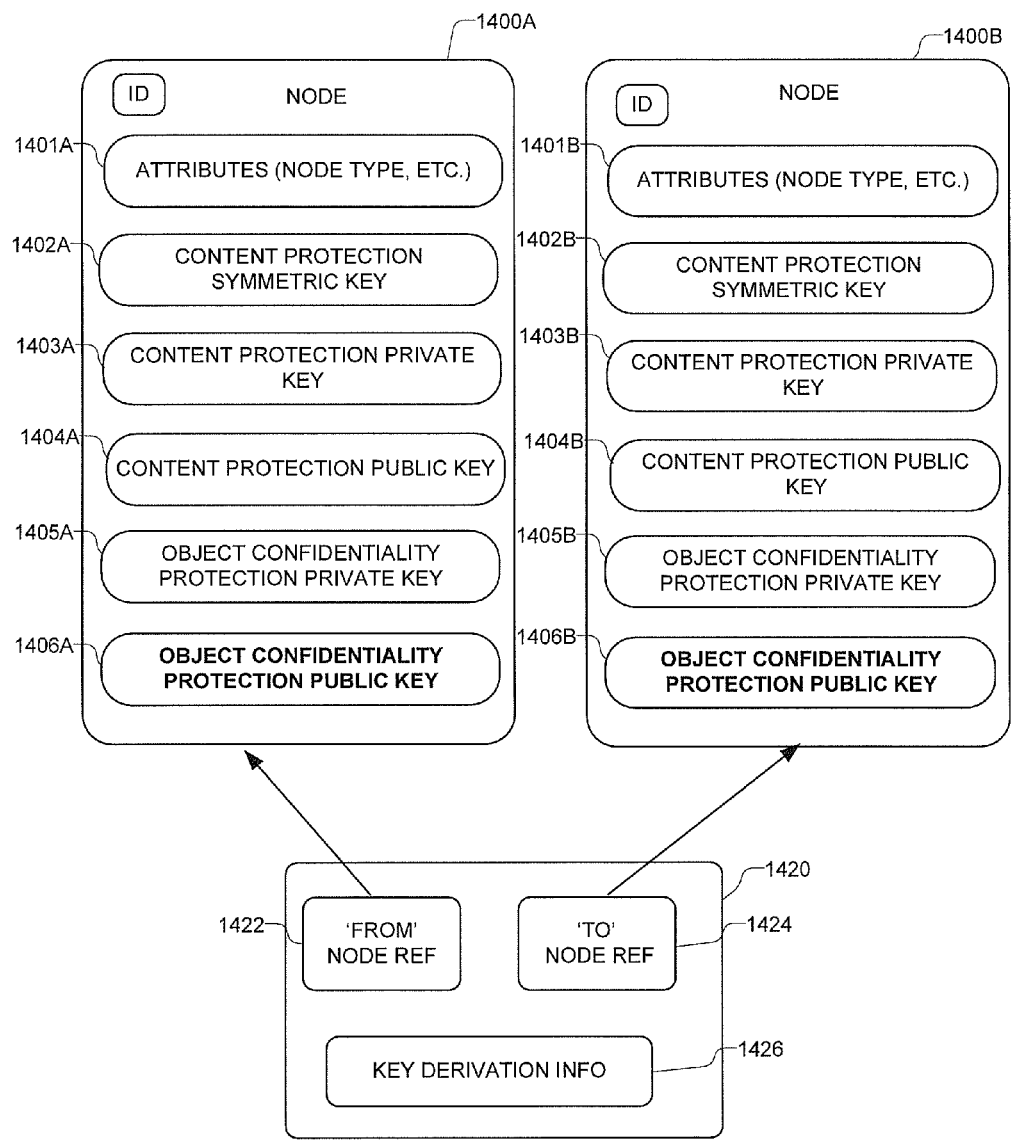
FIG. 14 illustrates an embodiment of node and link DRM objects.

While FIG. 13 illustrates the content protection and governance objects created by DRM engines to control access to protected content, FIG. 14 illustrates the DRM objects that represent entities in the system (e.g., users, devices or groups), as well as the relationships among those entities.

While FIG. 4, discussed above, illustrates a conceptual embodiment of a node or authorization graph depicting these entities and their relationships, FIG. 14 illustrates two types of objects that implement an embodiment of this conceptual graph: vertex (or "node") objects (1400*a* and 1400*b*), which represent entities and their attributes, and link objects (1420), which represent the relationships among node objects. In one embodiment, the DRM engine, by executing control programs, instigates one or more usage patterns involving these objects—e.g., encrypting a song and associating it with a license that restricts its distribution to particular individuals. Yet, the DRM engine in this embodiment does not specify, implicitly or explicitly, the semantics attached to these objects (e.g., to which individuals the song may be distributed).

In one embodiment this semantic context, referred to as a DRM profile, is defined within the attributes of the node objects themselves. A DRM profile may include descriptions of these entities and the various roles and identities they represent, typically expressed using node attributes (1401*a* and 1401*b*). As discussed above, a link 1420 between two nodes 1400*a* and 1400*b* could represent various types of semantic relationships. For example, if one node was a "user" and the other was a "device," then link 1420 might represent "ownership." If the other node was a "user group" instead of a "device," then link 1420 might represent "membership." Link 1420 might be unidirectional in one scenario and bidirectional in another (e.g., representing two links between the same two nodes).

Node objects 1400*a* and 1400*b* also typically have object confidentiality protection asymmetric key pairs (e.g., private key 1405*a* and public key 1406*a* of node 1400*a*, and private key 1405*b* and public key 1406*b* of node 1400*b*) to limit confidential information to authorized portions of the node. Confidential information targeted at a node will be encrypted with that node's confidentiality protection public key. Optionally, a content protection asymmetric key pair (e.g., private key 1403*a* and public key 1403*b* of node 1400*a*, and private key 1403*b* and public key 1403*b* of node 1400*b*) can be used in conjunction with link objects when the system uses a ContentKey derivation system for ContentKey distribution, as discussed in greater detail below. Content items themselves may be protected with content protection symmetric keys, such as symmetric key 1402*a* of node 1400*a* and key 1402*b* of node 1400*b*.

As noted above, in one embodiment link objects (e.g., link 1420) represent relationships between nodes. The semantics of these relationships can be stored in node attributes (e.g., 1401*a* of node 1400*a* and 1401*b* of node 1400*b*), referenced from within the link objects (e.g., node reference 1422 to node 1400*a* and node reference 1424 to node 1400*b*). Link objects can also optionally contain cryptographic data (e.g., key derivation info 1426) that enables the link object to be used for ContentKey derivations, as discussed below.

In one embodiment the link object itself is a signed object, represented by a directed edge in a graph, such as in FIG. 4 above. When there exists such a directed edge from one node (e.g., node X) to another (e.g., node Y), this "path" from node X to node Y indicates that node Y is "reachable" from node X. The existence of a path can be used by other DRM objects, e.g., as a condition of performing a particular function. A control object might check to determine whether a target node is reachable before it allows a certain action to be performed on its associated content object.

For example, if node D represents a device that wants to perform the "play" action on a content object, a control that governs this content object might test whether a certain node U representing a certain user is reachable from node D (e.g., whether that user is the "owner" of that device), and only allow the "play" action to be performed if that condition is satisfied. To determine if node U is reachable, the DRM engine can run a control program to determine whether there exists a set of link objects that can establish a path (e.g., a direct or indirect relationship) between node D and node U. As noted above, in one embodiment the DRM engine is unaware of the semantics of the relationship; it simply determines the existence of a path, enabling the host application, for example, to interpret this path as a conditional authorization, permitting access to protected content.

In one embodiment the DRM engine verifies link objects before allowing them to be used to determine the existence of paths in the system node graph. The validity of a link object at any given time may depend upon the particular features of the certificate system (discussed below) used to sign link objects. For example, they may have limited "lifetimes" or be revoked or revalidated from time to time based on various conditions.

Also, in one embodiment the policies that govern which entities can sign link objects, which link objects can be created, and the lifetime of link objects are not directly handled by the DRM engine. Instead, they may leverage the node attributes information. To facilitate the task of enforcing certain policies, the system may provide a way to extend standard certificate formats with additional constraint checking. These extensions make it possible to express validity constraints on certificates for keys that sign links, such that constraints (e.g., the type of nodes connected by the link, as well as other attributes), can be checked before a link is considered valid.

Finally, in one embodiment the link object may contain cryptographic data that provides the user with the nodes' content protection keys for key distribution. That cryptographic data may, for example, contain, in addition to metadata, the private and/or symmetric content protection keys of the "from" node, encrypted with the content protection public key and/or the content protection symmetric key of the "to" node. For example, an entity that has been granted the ability to create link objects that link device nodes and user nodes under a certain policy may check to ensure that it only creates links between node objects that have attributes indicating they are indeed representing a device, and nodes that have attributes indicating that they represent a user.

3.10. DRM Cryptographic Keys

Figure 15:
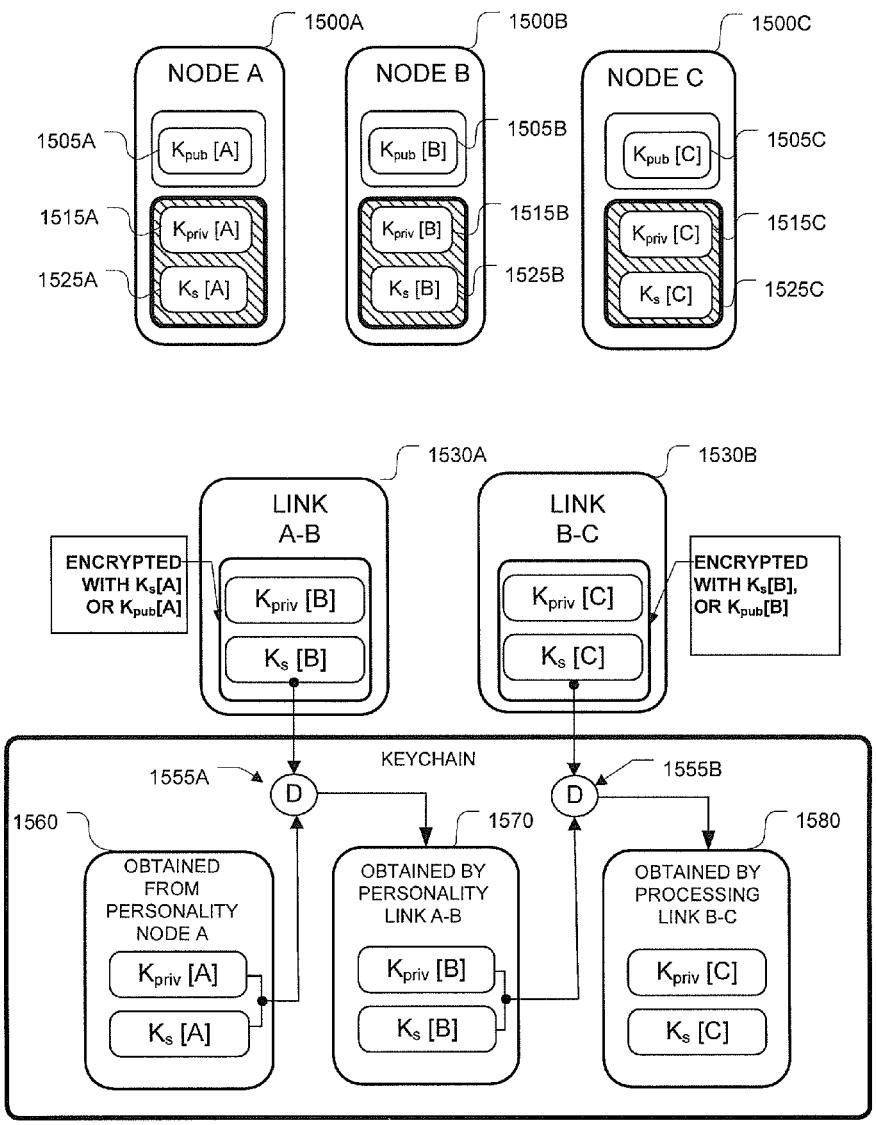
FIG. 15 illustrates an embodiment of DRM cryptographic key elements.

An example embodiment of a DRM key distribution system is illustrated in FIG. 15. The basic principle behind the key distribution system shown in FIG. 15 is to use link objects to distribute keys in addition to their primary purpose of establishing relationships between node objects.

As noted above, a control object may contain a control program that determines whether a requested operation should be permitted. That control program may check to determine whether a specific node is reachable via a collection of link objects. The key distribution system shown in FIG. 15 leverages that search through a collection of link objects to facilitate the distribution of a key such that it is available to the DRM engine that is executing the control program.

In one embodiment, each node object that uses the key distribution system has one or more keys. These keys are used to encrypt content keys and other nodes' key distribution keys. Link objects created for use in the same deployment contain some cryptographic data payload that allows key information to be derived when chains of links are processed by the DRM engine.

With nodes and links carrying keys this way, given a collection of links (e.g., from a node A to a node B . . . to a node Z), any entity that has access to the private keys of node A also has access to the private keys of node Z. Having access to node Z's private keys gives the entity access to any content key encrypted with those keys.

Node objects that participate in a key distribution system contain keys as part of their data. As illustrated in FIG. 15, in one embodiment each node (1500*a*, 1500*b*, and 1500*c*) has three keys:

Public Key Kpub[N]—This is the public part of a pair of public/private keys for the public key cipher. In one embodiment this key (1505*a*, 1505*b* and 1505*c*, respectively, in nodes 1500*a*, 1500*b* and 1500*c*) comes with a certificate (discussed below) so that its credentials can be verified by entities that want to bind confidential information to it cryptographically.

Private Key Kpriv[N]—This is the private part of the public/private key pair. The entity that manages the node is responsible for ensuring that this private key (keys 1515*a*, 1515*b* and 1515*c*, respectively, in nodes 1500*a*, 1500*b* and 1500*c*) is kept secret. For that reason, in one embodiment this private key is stored and transported separately from the rest of the node information.

Symmetric Key Ks[N]—This key is used with a symmetric cipher (discussed below). Because this private key (keys 1525*a*, 1525*b* and 1525*c*, respectively, in nodes 1500*a*, 1500*b* and 1500*c*) is confidential, the entity that manages the node is responsible for keeping it secret.

The key distribution system illustrated in FIG. 15 can be implemented using different cryptographic algorithms, though the participating entities will generally need to agree on a set of supported algorithms. In one embodiment, at least one public key cipher (such as RSA) and one symmetric key cipher (such as AES) are supported.

The following notation refers to cryptographic functions:

Ep(Kpub[N], M) means "the message M encrypted with the public key Kpub of node N, using a public key cipher"

Dp(Kpriv[N], M) means "the message M decrypted with the private key Kpriv of node N using a public key cipher"

Es(Ks[N], M) means "the message M encrypted with the symmetric key Ks of node N using a symmetric key cipher"

Ds(Ks[N], M) means "the message M decrypted with the symmetric key Ks of node N using a symmetric key cipher"

Targeting a "ContentKey" to a node means making that key available to the entities that have access to the private keys of that node. In one embodiment binding is done by encrypting the key using one or both of the following methods:

Public Binding Create a ContentKey object that contains Ep(Kpub[N], CK)

Symmetric Binding Create a ContentKey object that contains Es(Ks[N], CK)

In this embodiment, symmetric binding is preferably used whenever possible, as it uses a less computationally intensive algorithm that is less onerous on the receiving entity. However, the entity (e.g., a content packager) that creates the ContentKey object may not always have access to Ks[N]. In that case, public binding can be used, as Kpub[N] should be available, as it is not confidential information. Kpub[N] will usually be made available to entities that need to target ContentKeys, accompanied by a certificate that can be inspected by the entity to decide whether Kpub[N] is indeed the key of a node that can be trusted to handle the ContentKey in accordance with some agreed-upon policy.

To allow entities to have access to the distribution keys of all reachable nodes, in one embodiment link objects contain a "payload." That payload allows any entity that has access to the private keys of the link's "from node" to also have access to the private keys of the link's "to node." In this manner, an entity can decrypt any ContentKey targeted to a node that is reachable from its node.

Thus, returning to FIG. 15, link 1530a, which links node 1500a to node 1500b, contains a payload that is created by encrypting the private keys 1515b and 1525b of node 1500b with either the symmetric key 1515a of node 1500a or, if unavailable (e.g., due to its confidentiality), with the public key 1525a of node 1500a. Similarly, link 1530b, which links node 1500b to node 1500c, contains a payload that is created by encrypting the private keys 1515c and 1525c of node 1500c with either the symmetric key 1515b of node 1500b or, if unavailable, with the public key 1525b of node 1500b.

When a DRM engine processes link objects, it processes the payload of each link to update an internal chain 1550 of keys to which it has access. In one embodiment the payload of a link from node A to node B consists of either:
Public derivation information
Ep(Kpub[A], {Ks[B],Kpriv[B]})
or
Symmetric derivation information
Es(Ks[A], {Ks[B],Kpriv[B]})
Where {Ks[B],Kpriv[B] is a data structure containing Ks[B] and Kpriv[B].

The public derivation information is used to convey the private keys of node B, Ks[B] and Kpriv[B], to any entity that has access to the private key of node A, Kpriv[A]. The symmetric derivation information is used to convey the private keys of node B, Ks[B] and Kpriv[B], to any entity that has access to the symmetric key of node A, Kpriv[A].

Thus, with reference to key chain 1550, an entity that has access to the private keys of node 1500a (private key 1515a and symmetric key 1525a) enables the DRM engine to utilize these private keys 1560 as a "first link" in (and starting point in generating the rest of) key chain 1550. Scuba keys 1560 are used to decrypt 1555a the ContentKey object within link 1530a (using private key 1515a for public derivation if public binding via public key 1505a was used, or symmetric key 1525a for symmetric derivation if symmetric binding via symmetric key 1525a was used), resulting in the next link 1570 in key chain 1550—i.e., the confidential keys of node 1500b (private key 1515b and symmetric key 1525b). The DRM engine uses these keys 1570 in turn to decrypt 1555b the ContentKey object within link 1530b (using private key 1515b for public derivation if public binding via public key 1505b was used, or symmetric key 1525b for symmetric derivation if symmetric binding via symmetric key 1525b was used), resulting in the final link 1580 in key chain 1550—i.e., the confidential keys of node 1500c (private key 1515c and symmetric key 1525c).

Since, in one embodiment, the DRM engine can process links in any order, it may not be able to perform a key derivation at the time a link is processed (e.g., because the keys of the "from" node of that link have not yet been derived). In that case, the link is remembered, and processed again when such information becomes available (e.g., when a link is processed in which that node is the "to" node).

3.11. DRM Certificates

As noted above, in one embodiment certificates are used to check the credentials associated with cryptographic keys before making decisions based on the digital signature created with those keys. In one embodiment, multiple certificate technologies can be supported, leveraging existing information typically available as standard elements of certificates, such as validity periods, names, etc. In addition to these standard elements, additional constraints can be encoded to limit potential usage of a certified key.

In one embodiment this is accomplished by using key-usage extensions as part of the certificate-encoding process. The information encoded in such extensions can be used to enable the DRM engine to determine whether the key that has signed a specific object was authorized to be used for that purpose. For example, a certain key may have a certificate that allows it to sign only those link objects in which the link is from a node with a specific attribute, and/or to a node with another specific attribute.

The base technology used to express the certificate typically is not capable of expressing such a constraint, as its semantics may be unaware of elements such as links and nodes. In one embodiment such specific constraints are therefore conveyed as key usage extensions of the basic certificate, including a "usage category" and a corresponding "constraint program."

The usage category specifies which type of objects a key is authorized to sign. The constraint program can express dynamic conditions based on context. In one embodiment a verifier that is being asked to verify the validity of such a certificate is required to understand the relevant semantics, though the evaluation of the key usage extension expression is delegated to the DRM engine. The certificate is considered valid only if the execution of that program generates a successful result.

In one embodiment, the role of a constraint program is to return a boolean value—e.g., "true" indicating that the constraint conditions are met, and "false" indicating that they are not met. The control program may also have access to some context information that can be used to reach a decision. The available context information may depend upon the type of decision being made by the DRM engine when it requests the verification of the certificate. For example, before using the information in a link object, a DRM engine may verify that the certificate of the key that signed the object allows that key to be used for that purpose. When executing the constraint program, the environment of the DRM engine is populated with information regarding the link's attributes, as well as the attributes of the nodes referenced by that link.

The constraint program embedded in the key usage extension is encoded, in one embodiment, as a code module (described above). This code module preferably exports at least one entry point named, for example, "EngineName.Certificate.<Category>.Check", where Category is a name indicating which category of certificates need to be checked. Parameters to the verification program will be pushed onto the stack before calling the entry point. The number and types of parameters passed onto the stack depends on the category of certificate extension being evaluated.

4. System Operation

4.1. Basic Node Interaction

Having examined various embodiments of the principal architectural elements of the NEMO system, including embodiments in the context of DRM applications, we now turn to the NEMO system in operation—i.e., the sequence of events within and among NEMO nodes that establish the foundation upon which application-specific functionality can be layered.

In one embodiment, before NEMO nodes invoke application-specific functionality, they go through a process of initialization and authorization. Nodes initially seek to discover desired services (via requests, registration, notification, etc.), and then obtain authorization to use those services (e.g., by establishing that they are trustworthy and that they satisfy any relevant service provider policies).

This process is illustrated in FIG. 16, which outlines a basic interaction between a Service Provider 1600 (in this embodiment, with functionality shared between a Service Providing Node 1610 and an Authorizing Node 1620) and a Service Requester 1630 (e.g., a client consumer of services). Note that this interaction need not be direct. Any number of Intermediary Nodes 1625 may lie in the path between the Service Requester 1630 and the Service Provider 1600. The basic steps in this process, which will be described in greater detail below, are discussed from the perspectives of both the client Service Requester 1630 and Service Provider 1600.

From the perspective of the Service Requester 1630, the logical flow of events shown in FIG. 16 is as follows:

Service Discovery—In one embodiment, Service Requester 1630 initiates a service discovery request to locate any NEMO-enabled nodes that provide the desired service, and obtain information regarding which service bindings are supported for accessing the relevant service interfaces. Service Requester 1630 may choose to cache information about discovered services. It should be noted that the interface/mechanism for Service Discovery between NEMO Nodes is just another service a NEMO Node chooses to implement and expose. The Service Discovery process is described in greater detail below, including other forms of communication, such as notification by Service Providers to registered Service Requesters.

Service Binding Selection—Once candidate service-providing Nodes are found, the requesting Node can choose to target (dispatch a request to) one or more of the service-providing Nodes based on a specific service binding.

Negotiation of Acceptable Trusted Relationship with Service Provider—In one embodiment, before two Nodes can communicate in a secure fashion, they must be able to establish a trusted relationship for this purpose. This may include an exchange of compatible trust credentials (e.g. X.500 certificates, tokens, etc.) in some integrity-protected envelope that may be used to determine identity; and/or it may include establishing a secure channel, such as an SSL channel, based on certificates both parties trust. In some cases, the exchange and negotiation of these credentials may be an implicit property of the service interface binding (e.g. WS-Security if the WS-I XML Protocol is used when the interface is exposed as a web service, or an SSL request between two well-known nodes). In other cases, the exchange and negotiation of trust credentials may be an explicitly separate step. NEMO provides a standard and flexible framework allowing Nodes to establish trusted channels for communication. It is up to a given Node, based on the characteristics of the Node and on the characteristics of the service involved in the interaction, to determine which credentials are sufficient for interacting with another NEMO Node, and to make the decision whether it trusts a given Node. In one embodiment the NEMO framework leverages existing and emerging standards, especially in the area of security-related data types and protocols. For example, in one embodiment the framework will support using SAML to describe both credentials (evidence) given by service requestors to service providers when they want to invoke a service, as well as using SAML as a way of expressing authorization queries and authorization responses.

Creation of Request Message—The next step is for Requesting Node 1630 to create the appropriate request message(s) corresponding to the desired service. This operation may be hidden by the Service Access Point. As noted above, the Service Access Point provides an abstraction and interface for interacting with service providers in the NEMO framework, and may hide certain service invocation issues, such as native interfaces to service message mappings, object serialization/de-serialization, negotiation of compatible message formats, transport mechanisms or message routing issues, etc.

Dispatching of Request—Once the request message is created, it is dispatched to the targeted service-providing Node(s)—e.g., Node 1610. The communication style of the request can be synchronous/asynchronous RPC style or message-oriented, based on the service binding and/or preferences of the requesting client. Interacting with a service can be done directly by the transmission and processing of service messages or done through more native interfaces through the NEMO Service Access Point.

Receiving Response Message(s)—After dispatching the request, Requesting Node 1610 receives one or more responses in reply. Depending on the specifics of the service interface binding and the preferences of Requesting Node 1610, the reply(s) can be returned in various ways, including an RPC-style response or notification message. As noted above, requests and replies can be routed to their targeted Node via other Intermediary Node(s) 1625, which may themselves provide a number of services, including: routing, trust negotiation, collation and correlation functions, etc. All services in this embodiment are "standard" NEMO services described, discovered, authorized, bound to, and interacted with in the same consistent framework. The Service Access Point may hide message-level abstractions from the Node. For example from the Node's perspective, invocation of a service may seem like a standard function invocation with a set of simple fixed parameters.

Validation of Response re Negotiated Trust Semantics—In one embodiment, Requesting Node 1630 validates the response message to ensure that it adheres to the negotiated trust semantics between it and the Service Providing Node 1610. This logic typically is completely encapsulated within the Service Access Point.

Processing of Message Payload—Finally, any appropriate processing is then applied based on the (application specific) message payload type and contents.

Following are the (somewhat similar) logical flow of events from the perspective of the Service Provider 1600:

Service Support Determination—A determination is first made as to whether the requested service is supported. In one embodiment, the NEMO framework doesn't mandate the style or granularity of how a service interface maps as an entry point to a service. In the simplest case, a service interface maps unambiguously to a given service, and the act of binding to and invoking that interface constitutes support for the service. However, it may be the case that a single service interface handles multiple types of requests, or that a given service type contains additional attributes which need to be sampled before a determination can be made as to whether the Node really supports the specifically desired functionality.

Negotiation of Acceptable Trusted Relationship with Service Requester—In some cases, it may be necessary for Service Provider 1600 to determine whether it trusts Requesting Node 1630, and establish a trusted communication channel. This process is explained in detail above.

Dispatch Authorization Request to Nodes Authorizing Access to Service Interface—Service Providing Node 1610 then determines whether Requesting Node 1630 is authorized or entitled to have access to the service, and, if so, under what conditions. This may be a decision based on local information, or on a natively supported authorization decision mechanism. If not supported locally, Service Providing Node 1610 may dispatch an authorization request(s) to a known NEMO authorization service provider (e.g., Authorizing Node 1620) that governs its services, in order to determine if the Requesting Node 1610 is authorized to have access to the requested services. In many situations, Authorizing Node 1620 and Service Providing Node 1610 will be the same entity, in which case the dispatching and processing of the authorizing request will be local operations invoked through a lightweight service interface binding such as a C function entry point. Once again, however, since this mechanism is itself just a NEMO service, it is possible to have a fully distributed implementation. Authorization requests can reference identification information and/or attributes associated with the NEMO Node itself, or information associated with users and/or devices associated with the Node.

Message Processing Upon Receipt of Authorization Response—Upon receiving the authorization response, if Requesting Node 1630 is authorized, Service Provider 1600 performs the necessary processing to fulfill the request. Otherwise, if Requesting Node 1630 is not authorized, an appropriate "authorization denied" response message can be generated.

Return Response Message—The response is then returned based on the service interface binding and the preferences of Requesting Node 1630, using one of several communication methods, including an RPC-style response or notification message. Once again, as noted above, requests and replies can be routed to their targeted Node via other Intermediary Node(s) 1625, which may themselves provide a number of services, including routing, trust negotiation, collation and correlation functions, etc. An example of a necessary service provided by an Intermediary Node 1625 might be delivery to a notification processing Node that can deliver the message in a manner known to Requesting Node 1630. An example of a "value added" service might be, for example, a coupon service which associates coupons to the response if it knows of the interests of Requesting Node 1630.

4.2. Notification

As noted above, in addition to both asynchronous and synchronous RPC-like communication patterns, where the client specifically initiates a request and then either waits for responses or periodically checks for responses through redemption of a ticket, some NEMO embodiments also support a pure messaging type of communication pattern based on the notion of notification. The following elements constitute data and message types supporting this concept of notification in one embodiment:

Notification—a message containing a specified type of payload targeted at interested endpoint Nodes.

Notification Interest—criteria used to determine whether a given Node will accept a given notification. Notification interests may include interests based on specific types of identity (e.g., Node ID, user ID, etc.), events (e.g., Node discovery, service discovery, etc.), affinity groups (e.g., new jazz club content), or general categories (e.g., advertisements).

Notification Payload—the typed contents of a notification. Payload types may range from simple text messages to more complex objects.

Notification Handler Service Interface—the type of service provider interface on which notifications may be received. The service provider also describes the notification interests associated with the interface, as well as the acceptable payload types. A Node supporting this interface may be the final destination for the notification or an intermediary processing endpoint.

Notification Processor Service—a service that is capable of matching notifications to interested Nodes, delivering the notifications based on some policy.

Notification Originator—a Node that sends out a notification targeted to a set of interested Nodes and/or an intermediary set of notification processing Nodes.

The notification, notification interest, and notification payload are preferably extensible. Additionally, the notification handler service interface is preferably subject to the same authorization process as any other NEMO service interface. Thus, even though a given notification may match in terms of interest and acceptable payload, a Node may refuse to accept a notification based on some associated interface policy related to the intermediary sender or originating source of the notification.

Figure 17A:
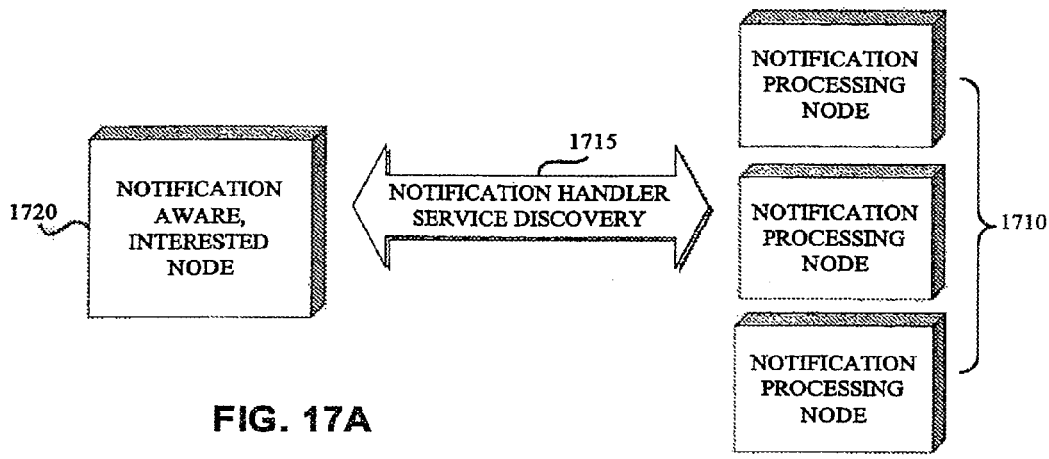
FIG. 17a illustrates a set of notification processing nodes discovering a node that supports a notification handler service.

FIG. 17*a* depicts a set of notification processing Nodes 1710 discovering 1715 a Node 1720 that supports the notification handler service. As part of its service description, node 1720 designates its notification interests, as well as which notification payload types are acceptable.

Figure 17B:
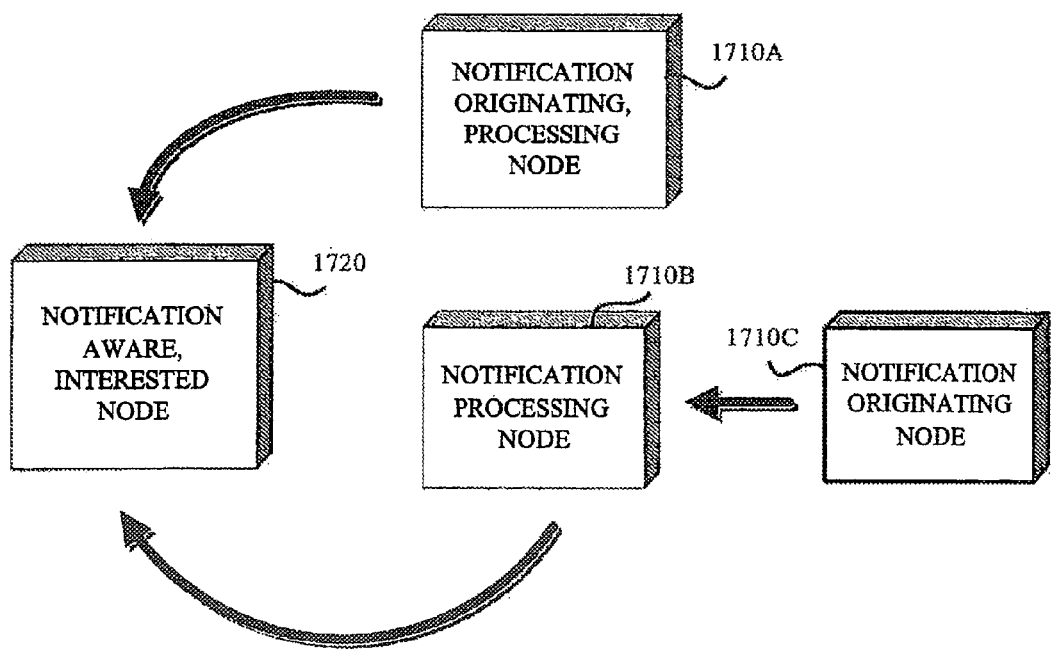
FIG. 17b illustrates the process of notification delivery.

FIG. 17*b* depicts how notifications can be delivered. Any Node could be the originating source as well as processor of the notification, and could be responsible for delivering the notification to Node 1720, which supports the notification handler service. Thus, Node 1710*a* could be the originating notification processing Node; or such functionality might be split between Node 1710*c* (originating source of notification) and Node 1710*b* (processor of notification). Still another Node (not shown) might be responsible for delivery of the notification. Notification processors that choose to handle notifications from foreign notification-originating Nodes may integrate with a commercial notification-processing engine such as Microsoft Notification Services in order to improve efficiency.

4.3. Service Discovery

Figure 18A:
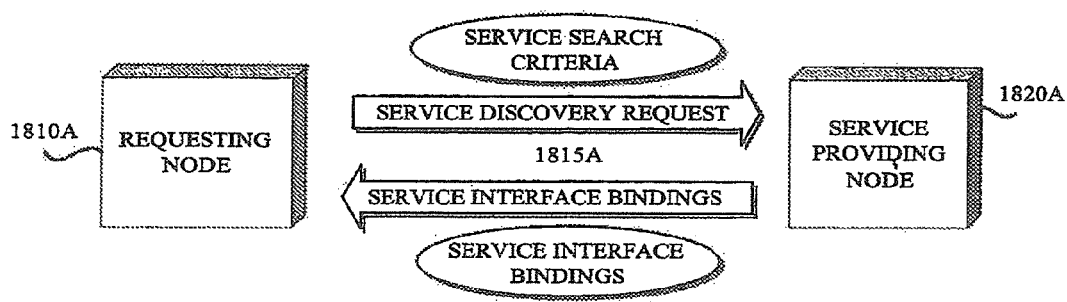
FIG. 18a illustrates a client-driven service discovery scenario in which a requesting node makes a service discovery request to a targeted service providing node.
Figure 18B:
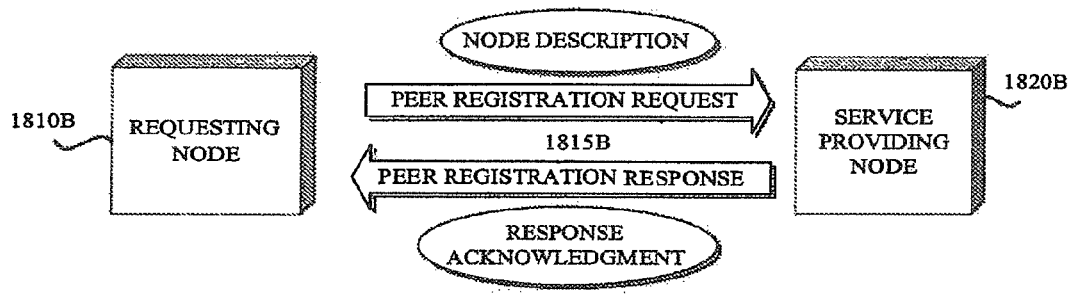
FIG. 18b illustrates a peer registration service discovery scenario in which a requesting node seeks to register its description with a service providing node.
Figure 18C:
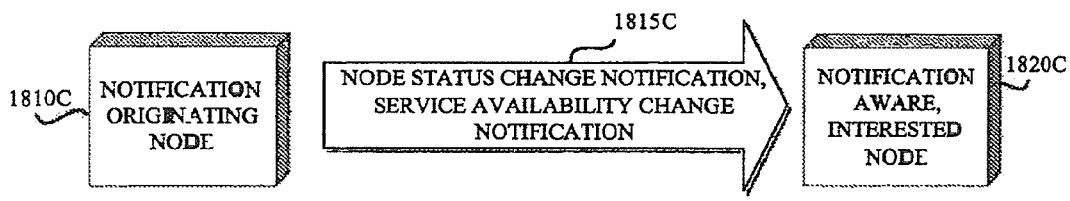
FIG. 18c illustrates an event-based service discovery scenario in which an interested node receives a notification of a change in service availability (e.g., the existence of a service within a service-providing node).

In order to use NEMO services, NEMO Nodes will need to first know about them. One embodiment of NEMO supports three dynamic discovery mechanisms, illustrated in FIGS. 18*a-c*:

Client Driven—a NEMO Node 1810*a* (in FIG. 18*a*) explicitly sends out a request to some set of targeted Nodes (e.g., 1820*a*) that support a "Service Query" service interface 1815*a*, the request asking whether the targeted Nodes support a specified set of services. If requesting Node 1810*a* is authorized, Service Providing Node 1820*a* will send a response indicating whether it supports the requested interfaces and the associated service interface bindings. This is one of the more common interfaces that Nodes will support if they expose any services.

Node Registration—a NEMO Node 1810b (in FIG. 18b) can register its description, including its supported services, with other Nodes, such as Service Providing Node 1820b. If a Node supports this interface 1815b, it is willing to accept requests from other Nodes and then cache those descriptions based on some policy. These Node descriptions are then available directly for use by the receiving Node or by other Nodes that perform service queries targeted to Nodes that have cached descriptions. As an alternative to P2P registration, a Node could also utilize a public registry, such as a UDDI (Universal Discovery, Description and Integration) standard registry for locating services.

Event-Based—Nodes (such as Node 1810c in FIG. 18c) send out notifications 1815c to Interested Nodes 1820c (that are "notification aware" and previously indicated their interest), indicating a change in state (e.g., Node active/available), or a Node advertises that it supports some specific service. The notification 1815c can contain a full description of the node and its services, or just the ID of the node associated with the event. Interested nodes may then choose to accept and process the notification.

4.4. Service Authorization and the Establishment of Trust

As noted above, in one embodiment, before a NEMO Node allows access to a requested service, it first determines whether, and under which conditions, the requesting Node is permitted access to that service. Access permission is based on a trust context for interactions between service requestor and service provider. As will be discussed below, even if a Node establishes that it can be trusted, a service providing Node may also require that it satisfy a specified policy before permitting access to a particular service or set of services.

Figure 19A:
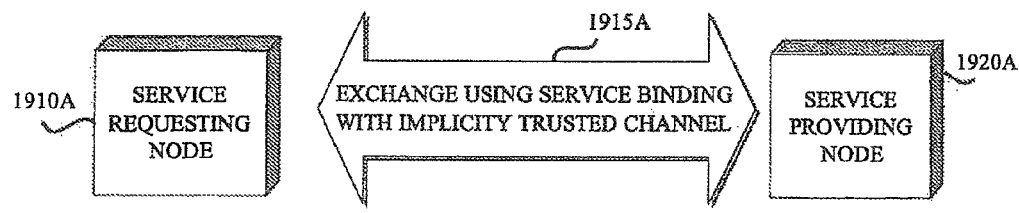
FIG. 19a illustrates the process of establishing trust using a service binding with an implicitly trusted channel.

In one embodiment NEMO does not mandate the specific requirements, criteria, or decision-making logic employed by an arbitrary set of Nodes in determining whether to trust each other. Trust semantics may vary radically from Node to Node. Instead, NEMO provides a standard set of facilities that allow Nodes to negotiate a mutually acceptable trusted relationship. In the determination and establishment of trust between Nodes, NEMO supports the exchange of credentials (and/or related information) between Nodes, which can be used for establishing a trusted context. Such trust-related credentials may be exchanged using a variety of different models, including the following:

Service-Binding Properties—a model where trust credentials are exchanged implicitly as part of the service interface binding. For example, if a Node 1920a (in FIG. 19a) exposes a service in the form of an HTTP Post over SSL, or as a Web Service that requires a WS-Security XML Signature, then the actual properties of this service binding may communicate all necessary trust-related credentials 1915a with a Requesting Node 1910a.

Figure 19B:
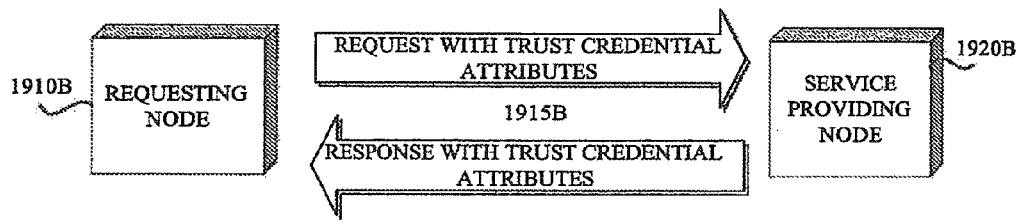
FIG. 19b illustrates the process of establishing trust based on a request/response model.

Request/Response Attributes—a model where trust credentials are exchanged through WSDL request and response messages (see FIG. 19b) between a Requesting Node 1910b and a Service Providing Node 1920b, optionally including the credentials as attributes of the messages 1915b. For example, digital certificates could be attached to, and flow along with, request and response messages, and could be used for forming a trusted relationship.

Figure 19C:
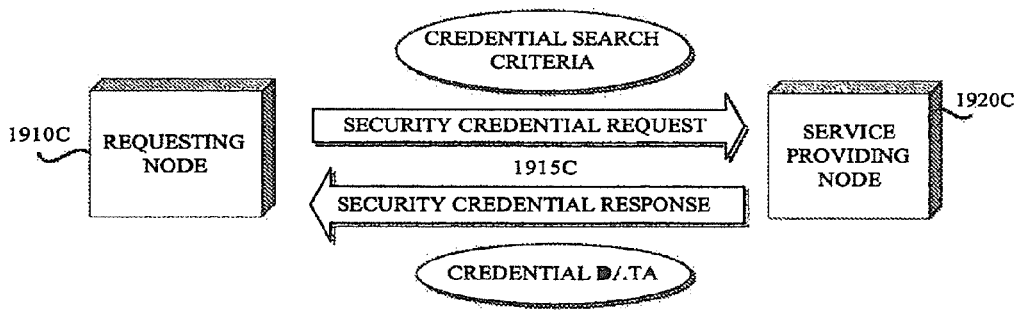
FIG. 19c illustrates the process of establishing trust based on an explicit exchange of security credentials.

Explicit Exchange—a model where trust credentials are exchanged explicitly through a service-provider interface (1915c in FIG. 19c) that allows querying of information related to the trust credentials that a given node contains. This is generally the most involved model, typically requiring a separate roundtrip session in order to exchange credentials between a Requesting Node 1910c and a Service Providing Node 1920c. The service interface binding itself provides a mutually acceptable trusted channel for explicit exchange of credentials.

In addition to these basic models, NEMO can also support combinations of these different approaches. For example, the communication channel associated with a semi-trusted service binding may be used to bootstrap the exchange of other security-related credentials more directly, or exchanging security-related credentials (which may have some type of inherent integrity) directly and using them to establish a secure communication channel associated with some service interface binding.

As noted above, trust model semantics and the processes of establishing trust may vary from entity to entity. In some situations, mutual trust between nodes may not be required. This type of dynamic heterogeneous environment calls for a flexible model that provides a common set of facilities that allow different entities to negotiate context-sensitive trust semantics.

4.5. Policy-Managed Access

In one embodiment (as noted above), a service providing Node, in addition to requiring the establishment of a trusted context before it allows a requesting Node to access a resource, may also require that the requesting Node satisfy a policy associated with that resource. The policy decision mechanism used for this purpose may be local and/or private. In one embodiment, NEMO provides a consistent, flexible mechanism for supporting this functionality.

As part of the service description, one can designate specific NEMO Nodes as "authorization" service providers. In one embodiment an authorization service providing Node implements a standard service for handling and responding to authorization query requests. Before access is allowed to a service interface, the targeted service provider dispatches an "Authorization" query request to any authorizing Nodes for its service, and access will be allowed only if one or more such Nodes (or a pre-specified combination thereof) respond indicating that access is permitted.

Figure 20:
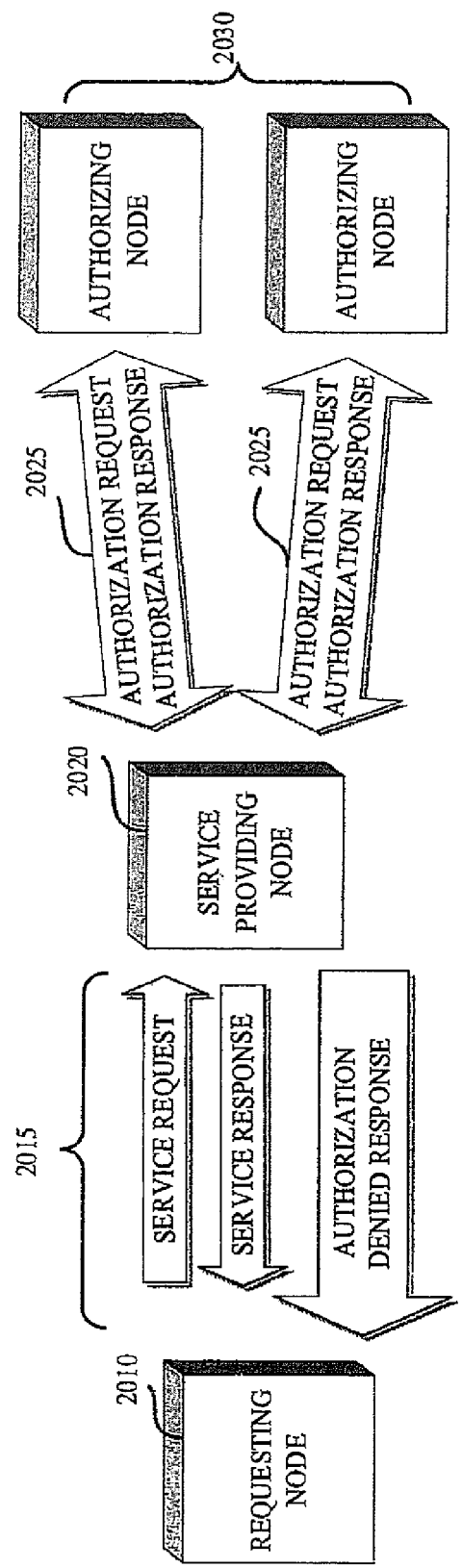
FIG. 20 illustrates policy-managed access to a service.

As illustrated in FIG. 20, a Requesting Node 2010 exchanges messages 2015 with a Service Providing Node 2020, including an initial request for a particular service. Service Providing Node 2020 then determines whether Requesting Node 2010 is authorized to invoke that service, and thus exchanges authorization messages 2025 with the authorizing Nodes 2025 that manage access to the requested service, including an initial authorization request to these Nodes 2030. Based on the responses it receives, Service Providing Node 2020 then either processes and returns the applicable service response, or returns a response indicating that access was denied.

Thus, the Authorization service allows a NEMO Node to participate in the role of policy decision point (PDP). In a preferred embodiment, NEMO is policy management system neutral; it does not mandate how an authorizing Node reaches decisions about authorizations based on an authorization query. Yet, for interoperability, it is preferable that authorization requests and responses adhere to some standard, and be sufficiently extensible to carry a flexible payload so that they can accommodate different types of authorization query requests in the context of different policy management systems. In one embodiment, support is provided for at least two authorization formats: (1) a simple format providing a very simple envelope using some least common denominator criteria, such as input, a simple requestor ID, resource ID, and/or action ID, and (2) the standard "Security Assertion Markup Language" (SAML) format to envelope an authorization query.

In one embodiment, an authorizing Node must recognize and support at least a predefined "simple" format and be able to map it to whatever native policy expression format exists on the authorizing Node. For other formats, the authorizing Node returns an appropriate error response if it does not handle or understand the payload of an "Authorization" query request. Extensions may include the ability for Nodes to negotiate over acceptable formats of an authorization query, and for Nodes to query to determine which formats are supported by a given authorizing service provider Node.

4.6. Basic DRM Node Interaction

Figure 21:
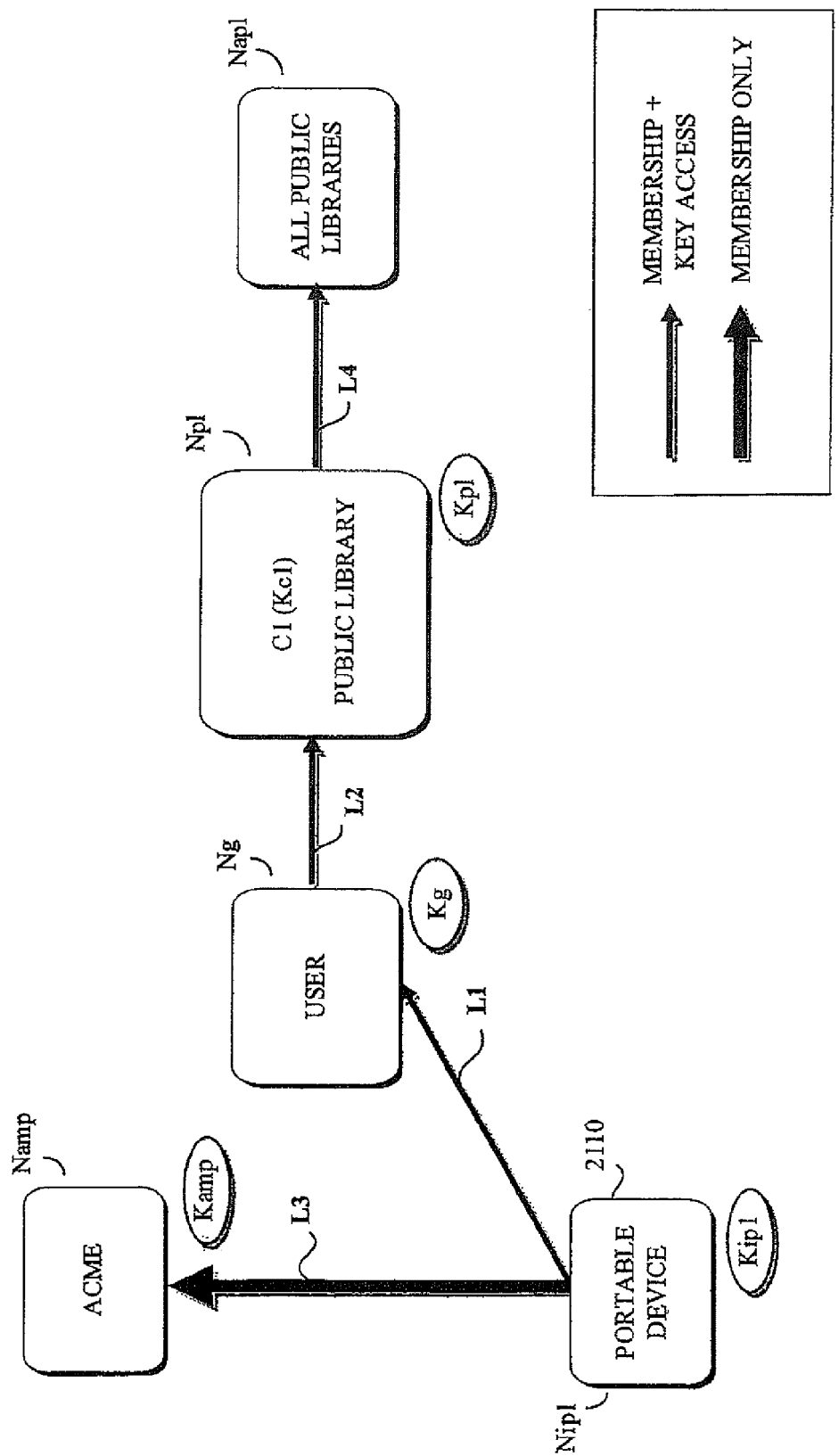
FIG. 21 illustrates a sample DRM node graph with membership and key access links.

Returning to the specific NEMO instance of a DRM application, FIG. 21 is a DRM Node (or Vertex) Graph that can serve to illustrate the interaction among DRM Nodes, as well as their relationships. Consider the following scenario in which portable device 2110 is a content playback device (e.g., an ipod1). Nip1 is the Node that represents this device. Kip1 is the content encryption key associated with Nip1. "User" is the owner of the portable device, and Ng is the Node that represents the user. Kg is the content encryption key associated with Ng.

PubLib is a Public Library. Npl represents the members of this library, and Kpl is the content encryption key associated with Npl. ACME represents all the ACME-manufactured Music Players. Namp represents that class of devices, and Kamp is the content encryption key associated with this group.

L1 is a link from Nip1 to Ng, which means that the portable device belongs to the user (and has access to the user's keys). L2 is a link from Ng to Npl, which means that the user is a member of the Public Library (and has access to its keys). L3 is a link from Nip1 to Namp, which means that the portable device is an ACME device (mere membership, as the company has no keys). L4 is a link from Npl to Napl, which is the Node representing all public libraries (and has access to the groupwide keys).

C1 is a movie file that the Public Library makes available to its members. Kc1 is a key used to encrypt C1. GB[C1] (not shown) is the governance information for C1 (e.g., rules and associated information used for governing access to the content). E(a,b) means 'b' encrypted with key 'a'.

For purposes of illustration, assume that it is desired to set a rule that a device can play the content C1 as long as (a) the device belongs to someone who is a member of the library and (b) the device is manufactured by ACME.

The content C1 is encrypted with Kc1. The rules program is created, as well as the encrypted content key RK[C1]=E (Kamp, E(Kpl, Kc1)). Both the rules program and RK[C1] can be included in the governance block for the content, GB[C1].

The portable device receives C1 and GB[C1]. For example, both might be packaged in the same file, or received separately. The portable device received L1 when the user first installed his device after buying it. The portable device received L2 when the user paid his subscription fee to the Public Library. The portable device received L3 when it was manufactured (e.g., L3 was built in).

From L1, L2 and L3, the portable device is able to check that Nip1 has a graph path to Ng (L1), Npl (L1+L2), and Namp (L3). The portable device wants to play C1. The portable device runs the rule found in GB[C1]. The rule can check that Nip1 is indeed an ACME device (path to Namp) and belongs to a member of the public library (path to Npl). Thus, the rule returns "yes", and the ordered list (Namp, Npl).

The portable device uses L1 to compute Kg, and then L2 to compute Kpl from Kg. The portable device also uses L3 to compute Kamp. The portable device applies Kpl and Kamp to RK[C1], found in GB[C1], and computes Kc1. It then uses Kc1 to decrypt and play C1.

When Node keys are symmetric keys, as in the previous examples, the content packager needs to have access to the keys of the Nodes to which it wishes to "bind" the content. This can be achieved by creating a Node that represents the packager, and a link between that Node and the Nodes to which it wishes to bind rules. This can also be achieved "out of band" through a service, for instance. But in some situations, it may not be possible, or practical to use symmetric keys. In that case, it is possible to assign a key pair to the Nodes to which a binding is needed without shared knowledge. In that case, the packager would bind a content key to a Node by encrypting the content key with the target Node's public key. To obtain the key for decryption, the client would have access to the Node's private key via a link to that Node.

In the most general case, the Nodes used for the rules and the Nodes used for computing content encryption keys need not be the same. It is natural to use the same Nodes, since there is a strong relationship between a rule that governs content and the key used to encrypt it, but it is not necessary. In some systems, some Nodes may be used for content protection keys that are not used for expressing membership conditions, and vice versa, and in some situations, two different graphs of Nodes can be used, one for the rules and one for content protection. For example, a rule could say that all members of group Npl can have access to content C1, but the content key Kc1 may not be protected by Kpl, but may instead by protected by the node key Kapl of node Napl, which represents all public libraries, not just Npl. Or a rule could say that you need to be a member of Namp, but the content encryption key could be bound only to Npl.

4.7. Operation of DRM Virtual Machine (VM)

Figure 22:
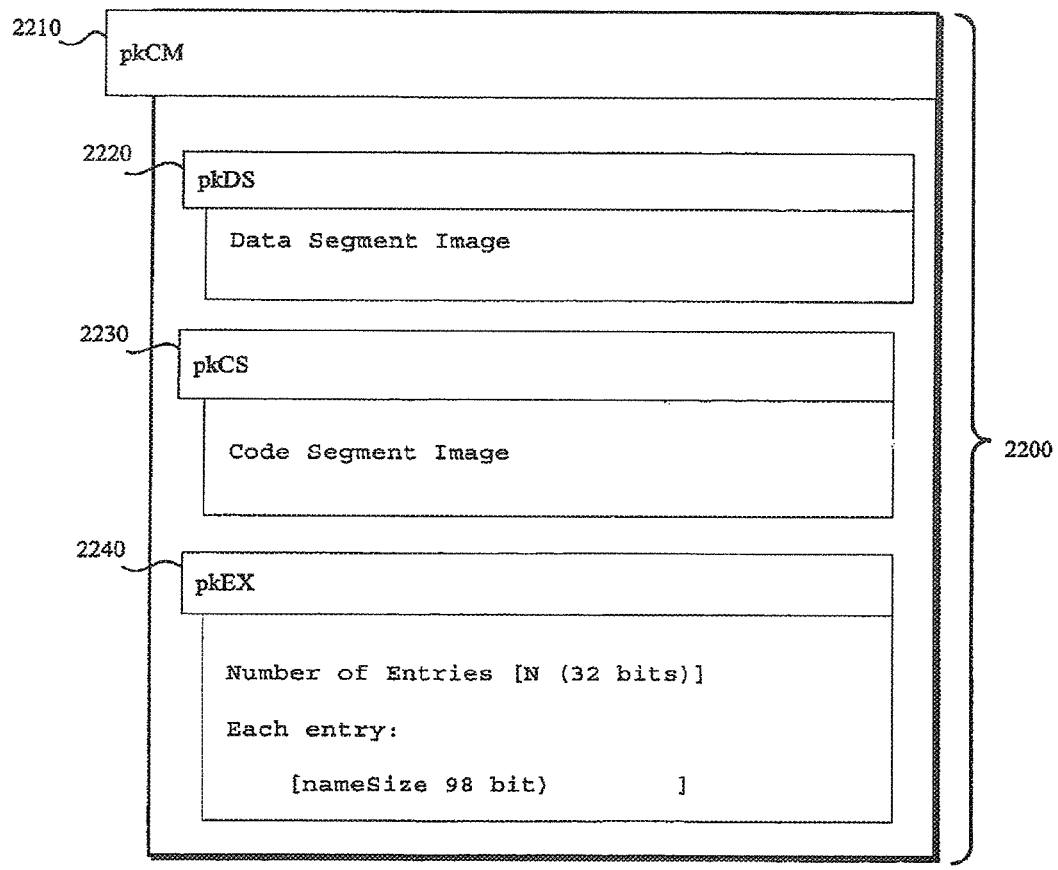
FIG. 22 illustrates an embodiment of the format of a DRM VM code module.

The discussion with respect to FIG. 21 above described the operation of a DRM system at a high (Node and Link) level, including the formation and enforcement of content governance policies. FIG. 22 depicts an exemplary code module 2200 of a DRM engine's VM that implements the formation and enforcement of such content governance policies.

Four main elements of illustrative Code Module 2200, shown in FIG. 22, include:

pkCM Atom: The pkCM Atom 2210 is the top-level Code Module Atom. It contains a sequence of sub-atoms.

pkDS Atom: The pkDS Atom 2220 contains a memory image that can be loaded into the Data Segment. The payload of the Atom is a raw sequence of octet values.

pkCS Atom: The pkCS Atom 2230 contains a memory image that can be loaded into the Code Segment. The payload of the Atom is a raw sequence of octet values.

pkEX Atom: The pkEX Atom 2240 contains a list of export entries. Each export entry consists of a name, encoded as an 8-bit name size, followed by the characters of the name, including a terminating 0, followed by a 32-bit integer representing the byte offset of the named entry point (this is an offset from the start of the data stored in the pkCS Atom).

4.7.1. Module Loader

In one embodiment, the Control VM is responsible for loading Code Modules. When a Code Module is loaded, the memory image encoded in pkDS Atom 2220 is loaded at a memory address in the Data Segment. That address is chosen by the VM Loader, and is stored in the DS pseudo-register. The memory image encoded in the pkCS Atom 2230 is loaded at a memory address in the Code Segment. That address is chosen by the VM Loader, and is stored in the CS pseudo-register.

4.7.2. System Calls

In one embodiment, Control VM Programs can call functions implemented outside of their Code Module's Code Segment. This is done through the use of the OP_CALL instruction, that takes an integer stack operand specifying the System Call Number to call. Depending on the System Call, the implementation can be a Control VM Byte Code routine in a different Code Module (for instance, a library of utility functions), directly by the VM in the VM's native implementation format, or delegated to an external software module, such as the VM's Host Environment.

In one embodiment, several System Call Numbers are specified:

SYS_NOP=0: This call is a no-operation call. It just returns (does nothing else). It is used primarily for testing the VM.

SYS_DEBUG_PRINT=1: Prints a string of text to a debug output. This call expects a single stack argument, specifying the address of the memory location containing the null-terminated string to print.

SYS_FIND_SYSCALL_BY_NAME=2: Determines whether the VM implements a named System Call. If it does, the System Call Number is returned on the stack; otherwise the value −1 is returned. This call expects a single stack argument, specifying the address of the memory location containing the null-terminated System Call name that is being requested.

4.7.3. System Call Numbers Allocation

In one embodiment, the Control VM reserves System Call Numbers 0 to 1023 for mandatory System Calls (System Calls that have to be implemented by all profiles of the VM).

System Call Numbers 16384 to 32767 are available for the VM to assign dynamically (for example, the System Call Numbers returned by SYS_FIND_SYSCALL_BY_NAME can be allocated dynamically by the VM, and do not have to be the same numbers on all VM implementations).

4.7.4. Standard System Calls

In one embodiment, several standard System Calls are provided to facilitate writing Control Programs. Such standard system calls may include a call to obtain a time stamp from the host, a call to determine if a node is Reachable, and/or the like. System calls preferably have dynamically determined numbers (e.g., their System Call Number can be retrieved by calling the SYS_FIND_SYSCALL_BY_NAME System Call with their name passed as the argument).

4.8. Interfaces Between DRM Engine Interface and Host Application

Following are some exemplary high level descriptions of the types of interfaces provided by an illustrative DRM (client consumption) engine to a Host Application:

SystemName::CreateSession(hostContextObject)→Session

Creates a session given a Host Application Context. The context object is used by the DRM engine to make callbacks into the application.

Session::ProcessObject(drmObject)

This function should be called by the Host Application when it encounters certain types of objects in the media files that can be identified as belonging to the DRM subsystem. Such objects include content control programs, membership tokens, etc. The syntax and semantics of those objects is opaque to the Host Application.

Session::OpenContent(contentReference)→Content

The host application calls this function when it needs to interact with a multimedia content file. The DRM engine returns a Content object that can be used subsequently for retrieving DRM information about the content, and interacting with such information.

Content::GetDrmInfo( )

Returns DRM metadata about the content that is otherwise not available in the regular metadata for the file.

Content::CreateAction(actionInfo)→Action

The Host Application calls this function when it wants to interact with a Content object. The actionInfo parameter specifies what type of action the application needs to perform (e.g., Play), as well as any associated parameters, if necessary. The function returns an Action object that can then be used to perform the action and retrieve the content key.

Action::GetKeyInfo( )

Returns information that is necessary for the decryption subsystem to decrypt the content.

Action::Check( )

Checks whether the DRM subsystem will authorize the performance of this action (i.e., whether Action::Perform( ) would succeed).

Action::Perform( )

Performs the action, and carries out any consequences (with their side effects) as specified by the rule(s) that governs this action.

Following are some exemplary high level descriptions of the type of interface provided by an illustrative Host Application to a DRM (client consumption) engine:

HostContext::GetFileSystem(type)→FileSystem

Returns a virtual FileSystem object to which the DRM subsystem has exclusive access. This virtual FileSystem will be used to store DRM state information. The data within this FileSystem is readable and writeable only by the DRM subsystem.

HostContext::GetCurrentTime( )

Returns the current date/time as maintained by the host system.

HostContext::GetIdentity( )

Returns the unique ID of this host.

HostContext::ProcessObject(dataObject)

Gives back to the host services a data object that may have been embedded inside a DRM object, but that the DRM subsystem has identified as being managed by the host (e.g., certificates).

HostContext::VerifySignature(signatureInfo)

Checks the validity of a digital signature to a data object. Preferably, the signatureInfo object contains information equivalent to the information found in an XMLSig element. The Host Services are responsible for managing the keys and key certificates necessary to validate the signature.

HostContext::CreateCipher(cipherType, keyInfo)→Cipher

Creates a Cipher object that the DRM subsystem can use to encrypt and decrypt data. A minimal set of cipher types will preferably be defined, and for each a format for describing the key info required by the cipher implementation.

Cipher::Encrypt(data)

The Cipher object referred to above, used to encrypt data.

Cipher::Decrypt(data)

The Cipher object referred to above, used to decrypt data.

HostContext::CreateDigester(digesterType)→Digester

Creates a Digester object that the DRM subsystem can use to compute a secure hash over some data. A minimal set of digest types will be defined.

Digester:: Update(data)

The Digester object referred to above, used to compute the secure hash.

Digester::GetDigest( )

The Digester object referred to above, used to obtain the secure hash computed by the DRM subsystem.

Following are some exemplary high level descriptions of the type of interface provided by an illustrative DRM (service-side packaging) engine to a Host Application:
SystemName::CreateSession(hostContextObject)→Session
Creates a session given a Host Application Context. The context object is used by the DRM Packaging engine to make callbacks into the application.
Session::CreateContent(contentReferences[ ])→Content
The Host Application will call this function in order to create a Content object that will be associated with license objects in subsequent steps. Having more than one content reference in the contentReferences array implies that these are bound together in a bundle (one audio and one video track for example), and that the license issued should be targeted to these as one indivisible group.
Content::SetDrmInfo(drmInfo)
The drmInfo parameter specifies the metadata of the license that will be issued. The structure will be read and will act as a guideline to compute the license into bytecode for the VM.
Content::GetDRMObjects(format)→drmObjects
This function is called when the Host Application is ready to get the drmObjects that the DRM Packaging engine created. The format parameter will indicate the format expected for these objects (e.g., XML or binary atoms).
Content::GetKeys( )→keys[ ]
This function is called by the Host Application when it needs the keys in order to encrypt the content. In one embodiment there will be one key per content reference.

Following are some exemplary high level descriptions of the type of interface provided by an illustrative Host Application to a DRM (service-side packaging) engine:
HostContext::GetFileSystem(type)→FileSystem
Returns a virtual FileSystem object to which the DRM subsystem has exclusive access. This virtual FileSystem would be used to store DRM state information. The data within this FileSystem should only be readable and writeable by the DRM subsystem.
HostContext::GetCurrentTime( )→Time
Returns the current date/time as maintained by the host system.
HostContext::GetIdentity( )→ID
Returns the unique ID of this host.
HostContext::PerformSignature(signatureInfo, data)
Some DRM objects created by the DRM Packaging engine will have to be trusted. This service, provided by the host, will be used to sign the specified object.
HostContext::CreateCipher(cipherType, keyInfo)→Cipher
Creates a Cipher object that the DRM Packaging engine can use to encrypt and decrypt data. This is used to encrypt the content key data in the ContentKey object.
Cipher::Encrypt(data)
The Cipher object referred to above, used to encrypt data.
Cipher::Decrypt(data)
The Cipher object referred to above, used to decrypt data.
HostContext::CreateDigester(digesterType)→Digester
Creates a Digester object that the DRM Packaging engine can use to compute a secure hash over some data.
Digester::Update(data)
The Digester object referred to above, used to comput the secure hash.
Digester::GetDigest( )
The Digester object referred to above, used to obtain the secure hash computed by the DRM subsystem.
HostContext::GenerateRandomNumber( )
Generates a random number that can be used for generating a key.

5. Services 5.1. Overview

Having described the NEMO/DRM system from both an architectural and operational perspective, we now turn our attention to an illustrative collection of services, data types, and related objects ("profiles") that can be used to implement the functionality of the system.

As noted above, a preferred embodiment of the NEMO architecture employs a flexible and portable way of describing the syntax of requests and responses associated with service invocation, data types used within the framework, message enveloping, and data values exposed by and used within the NEMO framework. WSDL 1.1 and above provides sufficient flexibility to describe and represent a variety of types of service interface and invocation patterns, and has sufficient abstraction to accommodate bindings to a variety of different endpoint Nodes via diverse communication protocols.

In one embodiment, we define a profile to be a set of thematically related data types and interfaces defined in WSDL. NEMO distinguishes a "Core" profile (which includes the foundational set of data types and service messages necessary to support fundamental NEMO Node interaction patterns and infrastructural functionality) from an application-specific profile, such as a DRM Profile (which describes the Digital Rights Management services that can be realized with NEMO), both of which are discussed below.

It will be appreciated that many of the data types and services defined in these profiles are abstract, and should be specialized before they are used. Other profiles are built on top of the Core profile.

5.2. NEMO Profile Hierarchy

In one embodiment, the definition of service interfaces and related data types is structured as a set of mandatory and optional profiles that build on one another and may be extended. The difference between a profile and a profile extension is a relatively subtle one. In general, profile extensions don't add new data types or service type definitions. They just extend existing abstract and concrete types.

Figure 23:
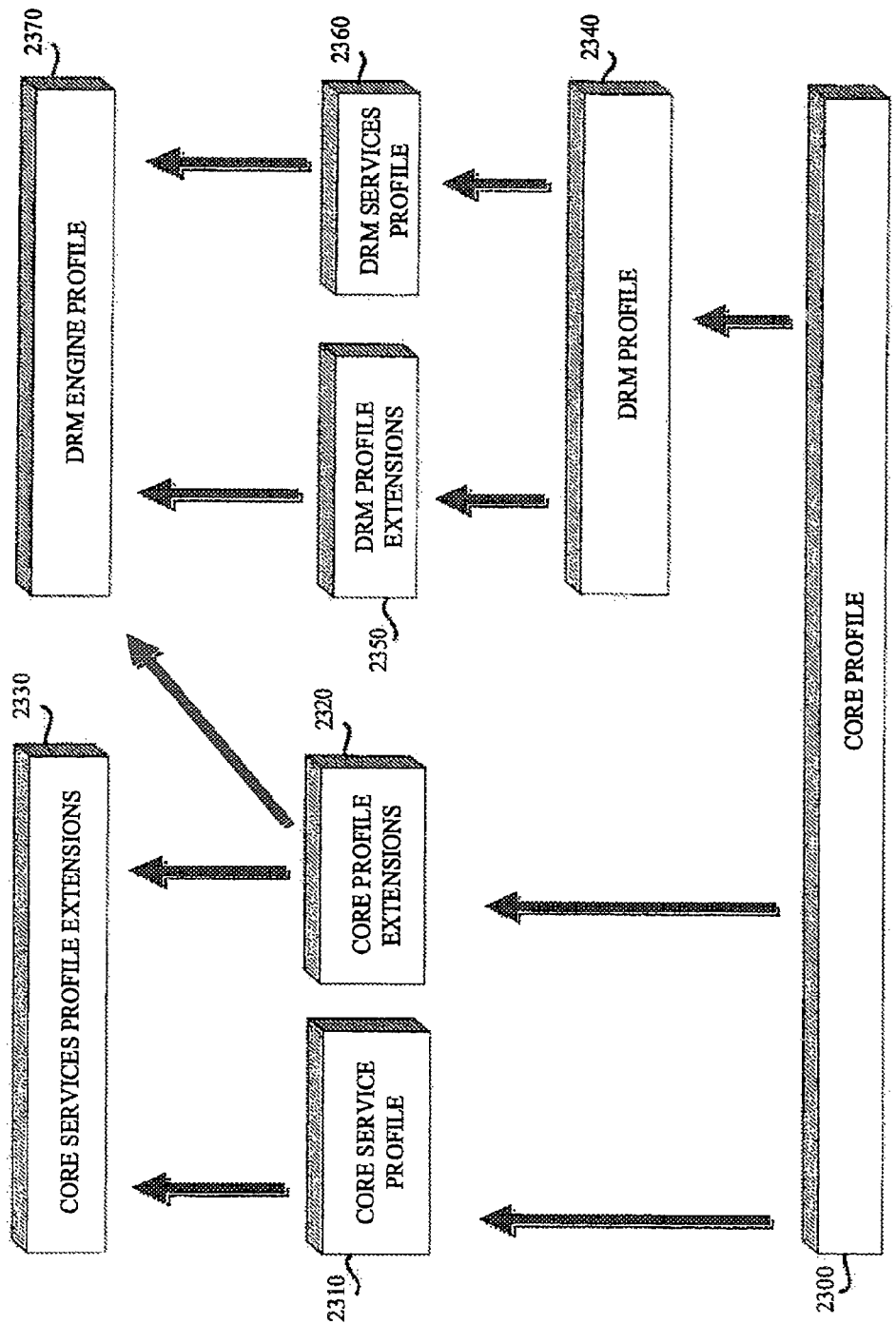
FIG. 23 illustrates a system function profile hierarchy.

FIG. 23 illustrates an exemplary profile hierarchy for NEMO and DRM functionality. The main elements of this profile hierarchy include:

Core Profile—At the base of this profile hierarchy lies Core Profile 2300, which preferably shares both NEMO and DRM functionality. This is the profile on which all other profiles are based. It includes a basic set of generic types (discussed below) that serve as the basis for creating more complex types in the framework. Many of the types in the Core Profile are abstract and will need to be specialized before use.

Core Profile Extensions—Immediately above Core Profile 2300 are the Core Profile Extensions 2320, which are the primary specializations of the types in Core Profile 2300, resulting in concrete representations.

Core Services Profile—Also immediately above Core Profile 2300, the Core Services Profile 2310 defines a set of general infrastructure services, also discussed below. In this profile, the service definitions are abstract and will need to be specialized before use.

Core Services Profile Extensions—Building upon both Core Profile Extensions 2320 and Core Services Profile 2310 are the Core Services Profile Extensions 2330, which are the primary specializations of the services defined in Core Services Profile 2310, resulting in concrete representations.

DRM Profile—Immediately above Core Profile 2300 lies DRM Profile 2340, upon which other DRM-related profiles are based. DRM Profile 2340 includes a basic set of generic types (discussed below) that serve as the basis for creating more complex DRM-specific types. Many of the types in DRM Profile 2340 are abstract and will need to be specialized before use.

DRM Profile Extensions—Building upon DRM Profile 2340 are the DRM Profile Extensions 2350, which are the primary specializations of the types in DRM Profile 2340, resulting in concrete representations.

DRM Services Profile—Also building upon DRM Profile 2340 is DRM Services Profile 2360, which defines a set of general DRM services (discussed below). In this profile, the service definitions are abstract and need to be specialized before use.

Specific DRM Profile—Building upon both DRM Profile Extensions 2350 and DRM Services Profile 2360 is the Specific DRM Profile 2370, which is a further specialization of the DRM services defined in DRM Services Profile 2360. This profile also introduces some new types and further extends certain types specified in Core Profile Extensions 2320.

5.3. NEMO Services and Service Specifications

Within this profile hierarchy lies, in one embodiment, the following main service constructs (as described in more detail above):

Peer Discovery—the ability to have peers in the system discover one another.

Service Discovery—the ability to discover and obtain information about services offered by different peers.

Authorization—the ability to determine if a given peer (e.g., a Node) is authorized to access a given resource (such as a service).

Notification—services related to the delivery of targeted messages, based on specified criteria, to a given set of peers (e.g., Nodes).

Following are definitions (also discussed above) of some of the main DRM constructs within this example profile hierarchy:

Personalization—services to obtain the credentials, policy, and other objects needed for a DRM-related endpoint (such as a CE device, music player, DRM license server, etc.) to establish a valid identity in the context of a specific DRM system.

Licensing Acquisition—services to obtain new DRM licenses.

Licensing Translation—services to exchange one new DRM license format for another.

Membership—services to obtain various types of objects that establish membership within some designated domain.

The NEMO/DRM profile hierarchy can be described, in one embodiment, as a set of Generic Interface Specifications (describing an abstract set of services, communication patterns, and operations), Type Specifications (containing the data types defined in the NEMO profiles), and Concrete Specifications (mapping abstract service interfaces to concrete ones including bindings to specific protocols). One embodiment of these specifications, in the form of Service Definitions and Profile Schemas, is set forth in Appendix 1 (C) hereto.

6. Additional Application Scenarios

FIG. 24 illustrates a relatively simple example of an embodiment of NEMO in operation in the context of a consumer using a new music player to play a DRM-protected song. As shown below, however, even this simple example illustrates many different potential related application scenarios. This example demonstrates the bridging of discovery services—using universal plug and play (UPnP) based service discovery as a mechanism to find and link to a UDDI based directory service. It also details service interactions between Personal Area Network (PAN) and Wide Area Network (WAN) services, negotiation of a trusted context for service use, and provisioning of a new device and DRM service.

Referring to FIG. 24, a consumer, having bought a new music player 2400, desires to play a DRM-protected song. Player 2400 can support this DRM system, but needs to be personalized. In other words, Player 2400, although it includes certain elements (not shown) that render it both NEMO-enabled and DRM-capable, must first perform a personalization process to become part of this system.

Typically, a NEMO client would include certain basic elements illustrated in FIGS. 5a and 6 above, such as a Service Access Point to invoke other Node's services, Trust Management Processing to demonstrate that it is a trusted resource for playing certain protected content, as well as a Web Services layer to support service invocations and the creation and receipt of messages. As discussed below, however, not all of these elements are necessary to enable a Node to participate in a NEMO system.

In some embodiments, client nodes may also include certain basic DRM-related elements, as illustrated in FIGS. 12a and 13-15 above, such as a DRM client engine and cryptographic services (and related objects and cryptographic keys) to enable processing of protected content, including decrypting protected songs, as well as a media rendering engine to play those songs. Here, too, some such elements need not be present. For example, had Player 2400 been a music player that was only capable of playing unprotected content, it might not require the core cryptographic elements present in other music players.

More specifically, in the example shown in FIG. 24, Player 2400 is wireless, supports the UPnP and Bluetooth protocols, and has a set of X.509 certificates it can use to validate signatures and sign messages. Player 2400 is NEMO-enabled in that it can form and process a limited number of NEMO service messages, but it does not contain a NEMO Service Access Point due to resource constraints.

Player 2400, however, is able to participate in a Personal Area Network (PAN) 2410 in the user's home, which includes a NEMO-enabled, Internet-connected, Home Gateway Device 2420 with Bluetooth and a NEMO SAP 2430. The UPnP stacks of both Player 2400 and Gateway 2420 have been extended to support a new service profile type for a "NEMO-enabled Gateway" service, discussed below.

When the user downloads a song and tries to play it, Player 2400 determines that it needs to be personalized, and initiates the process. For example, Player 2400 may initiate a UPnP service request for a NEMO gateway on PAN 2410. It locates a NEMO gateway service, and Gateway 2420 returns the necessary information to allow Player 2400 to connect to that service.

Player 2400 then forms a NEMO Personalization request message and sends it to the gateway service. The request includes an X.509 certificate associated with Player 2400's device identity. Gateway 2420, upon receiving the request, determines that it cannot fulfill the request locally, but has the ability to discover other potential service providers. However, Gateway 2420 has a policy that all messages it receives must be digitally signed, and thus it rejects the request and returns an authorization failure stating the policy associated with processing this type of request.

Player 2400, upon receiving this rejection, notes the reason for the denial of service and then digitally signs (e.g., as discussed above in connection with FIG. 15) and re-submits the request to Gateway 2420, which then accepts the message. As previously mentioned, Gateway 2420 cannot fulfill this request locally, but can perform service discovery. Gateway 2420 is unaware of the specific discovery protocols its SAP 2430 implementation supports, and thus composes a general attribute-based service discovery request based on the type of service desired (personalization), and dispatches the request via SAP 2430.

SAP 2430, configured with the necessary information to talk to UDDI registries, such as Internet-Based UDDI Registry 2440, converts the request into a native UDDI query of the appropriate form and sends the query. UDDI Registry 2440 knows of a service provider that supports DRM personalization and returns the query results. SAP 2430 receives these results and returns an appropriate response, with the necessary service provider information, in the proper format, to Gateway 2420.

Gateway 2420 extracts the service provider information from the service discovery response and composes a new request for Personalization based on the initial request on behalf of Player 2400. This request is submitted to SAP 2430. The service provider information (in particular, the service interface description of Personalization Service 2450) reveals how SAP 2430 must communicate with a personalization service that exposes its service through a web service described in WSDL. SAP 2430, adhering to these requirements, invokes Personalization Service 2450 and receives the response.

Gateway 2420 then returns the response to Player 2400, which can use the payload of the response to personalize its DRM engine. At this point, Player 2400 is provisioned, and can fully participate in a variety of local and global consumer oriented services. These can provide full visibility into and access to a variety of local and remote content services, lookup, matching and licensing services, and additional automated provisioning services, all cooperating in the service of the consumer. As explained above, various decryption keys may be necessary to access certain protected content, assuming the consumer and Player 2400 satisfy whatever policies are imposed by the content provider.

Thus, a consumer using a personal media player at home can enjoy the simplicity of a CE device, but leverage the services provided by both gateway and peer devices. When the consumer travels to another venue, the device can rediscover and use most or all of the services available at home, and, through new gateway services, be logically connected to the home network, while enjoying the services available at the new venue that are permitted according to the various policies associated with those services. Conversely, the consumer's device can provide services to peers found at the new venue.

Clearly, utilizing some or all of these same constructs (NEMO Nodes, SAPs, Service Adaptation Layers, various standards such as XML, WSDL, SOAP, UDDI, etc.), many other scenarios are possible, even within the realm of this DRM music player example. For example, Player 2400 might have contained its own SAP, perhaps eliminating the need for Gateway 2420. UDDI Registry 2440 might have been used for other purposes, such as locating and/or licensing music content. Moreover, many other DRM applications could be constructed, e.g., involving a licensing scheme imposing complex usage and distribution policies for many different types of audio and video, for a variety of different categories of users. Also, outside of the DRM context, virtually any other service-based applications could be constructed using the NEMO framework.

As another example, consider the application of NEMO in a business peer-to-peer environment. Techniques for business application development and integration are quickly evolving beyond the limits of traditional tools and software development lifecycles as practiced in most IT departments. This includes the development of word processing documents, graphic presentations, and spreadsheets. While some would debate whether these documents in their simplest form represent true applications, consider that many forms of these documents have well defined and complex object models that are formally described. Such documents or other objects might include, for example, state information that can be inspected and updated during the lifecycle of the object, the ability for multiple users to work on the objects concurrently, and/or additional arbitrary functionality. In more complicated scenarios, document-based information objects can be programmatically assembled to behave like full-fledged applications.

Just as with traditional software development, these types of objects can also benefit from source control and accountability. There are many systems today that support document management, and many applications directly support some form of document control. However most of these systems in the context of distributed processing environments exhibit limitations, including a centralized approach to version management with explicit check-in and checkout models, and inflexible (very weak or very rigid) coherence policies that are tied to client rendering applications or formats particularly within the context of a particular application (e.g., a document).

Preferred embodiments of NEMO can be used to address these limitation by means of a P2P policy architecture that stresses capability discovery and format negotiation. It is possible to structure the creation of an application (e.g., a document) in richer ways, providing multiple advantages. Rich policy can be applied to the objects and to the structure of the application. For example, a policy might specify some or all of the following:

Only certain modules can be modified.

Only object interfaces can be extended or implementations changed.

Deletions only allowed but not extensions.

How updates are to be applied, including functionality such as automatic merging of non-conflicting updates, and application of updates before a given peer can send any of its updates to other peers.

Policy-based notification such that all peers can be notified of updates if they choose, in order to participate in direct synchronization via the most appropriate mechanisms.

Support updates from different types of clients based on their capabilities.

In order to achieve this functionality, the authoring application used by each participant can be a NEMO-enabled peer. For the document that is created, a template can be used that describes the policy, including who is authorized and what can be done to each part of the document (in addition to the document's normal formatting rules). As long as the policy engine used by the NEMO peer can interpret and enforce policy rules consistent with their semantics, and as long as the operations supported by the peer interfaces allowed in the creation of the document can be mapped to a given peer's environment via the Service Adaptation Layer, then any peer can participate, but may internally represent the document differently.

Consider the case of a system consisting of different NEMO peers using services built on the NEMO framework for collaboration involving a presentation document. In this example, a wireless PDA application is running an application written in Java, which it uses for processing and rendering the document as text. A different implementation running under Microsoft Windows® on a desktop workstation processes the same document using the Microsoft Word® format. Both the PDA and the workstation are able to communicate, for example, by connection over a local area network, thus enabling the user of the PDA and the user of the workstation to collaborate on the same document application. In this example:

- NEMO peers involved in the collaboration can discover each other, their current status, and their capabilities.
- Each NEMO peer submits for each committable change, its identity, the change, and the operation (e.g., deletion, extension, etc.).
- All changes are propagated to each NEMO peer. This is possible because each NEMO peer can discover the profile and capabilities of another peer if advertised. At this point the notifying peer can have the content change encoding in a form acceptable by the notified peer if it is incapable of doing so. Alternatively the accepting peer may represent the change in any format it sees fit upon receipt at its interface.
- Before accepting a change the peer verifies that it is from an authorized NEMO participant.
- The change is applied based on the document policy.

As another example, consider the case of a portable wireless consumer electronics (CE) device that is a NEMO-enabled node (X), and that supports DRM format A, but wants to play content in DRM format B. X announces its desire to render the content as well as a description of its characteristics (e.g., what its identity is, what OS it supports, its renewability profile, payment methods it supports, and/or the like) and waits for responses back from other NEMO peers providing potential solutions. In response to its query, X receives three responses:

(1) Peer 1 can provide a low quality downloadable version of content in clear MP3 form for a fee of $2.00.
(2) Peer 2 can provide high quality pay-per-play streams of content over a secure channel for $0.50 per play.
(3) Peer 3 can provide a software update to X that will permit rendering of content in DRM format B for a fee of $10.00.

After reviewing the offers, X determines that option one is the best choice. It submits a request for content via offer number one. The request includes an assertion for a delegation that allows Peer 1 to deduct $2.00 from X's payment account via another NEMO service. Once X has been charged, then X is given back in a response from Peer 1 a token that allows it to download the MP3 file.

If instead, X were to decide that option three was the best solution, a somewhat more complicated business transaction might ensue. For example, option three may need to be represented as a transactional business process described using a NEMO Orchestration Descriptor (NOD) implemented by the NEMO Workflow Collator (WFC) elements contained in the participating NEMO enabled peers. In order to accomplish the necessary software update to X, the following actions could be executed using the NEMO framework:

- X obtains permission from its wireless service provider (B) that it is allowed to receive the update.
- Wireless service provider B directly validates peer three's credentials in order to establish its identity.
- X downloads from B a mandatory update that allows it to install 3rd party updates, their is no policy restriction on this, but this scenario is the first triggering event to cause this action.
- X is charged for the update that peer three provides.
- X downloads the update from peer three.

In this business process some actions may be able to be carried out concurrently by the WFC elements, while other activities may need to authorized and executed in a specific sequence.

Yet another example of a potential application of the NEMO framework is in the context of online gaming. Many popular multiplayer gaming environment networks are structured as centralized, closed portals that allow online gamers to create and participate in gaming sessions.

One of the limitations of these environments is that the users generally must have a tight relationship with the gaming network and must have an account (usually associated with a particular game title) in order to use the service. The typical gamer must usually manage several game accounts across multiple titles across multiple gaming networks and interact with game-provider-specific client applications in order to organize multiple player games and participate within the networks. This is often inconvenient, and discourages online use.

Embodiments of the NEMO framework can be used to enhance the online gaming experience by creating an environment that supports a more federated distributed gaming experience, making transparent to the user and the service provider the details of specific online game networks. This not only provides a better user experience, thereby encouraging adoption and use of these services, but can also reduce the administrative burden on game network providers.

In order to achieve these benefits, gaming clients can be personalized with NEMO modules so that they can participate as NEMO peers. Moreover, gaming networks can be personalized with NEMO modules so that they can expose their administrative interfaces in standardized ways. Finally, NEMO trust management can be used to ensure that only authorized peers interact in intended ways.

For example, assume there are three gaming network providers A, B, and C, and two users X and Y. User X has an account with A, and User Y has an account with B. X and Y both acquire a new title that works with C and want to play each other. Using the NEMO framework, X's gaming peer can automatically discover online gaming provider C. X's account information can be transmitted to C from A, after A confirms that C is a legitimate gaming network. X is now registered with C, and can be provisioned with correct tokens to interact with C. User Y goes through the same process to gain access to C using its credentials from B. Once both X and Y are registered they can now discover each other and create an online gaming session.

This simple registration example can be further expanded to deal with other services that online gaming environments might provide, including, e.g., game token storage (e.g., in lockers), account payment, and shared state information such as historical score boards.

While several examples were presented in the context of enterprise document management, online gaming, and media content consumption, it will be appreciated that the NEMO framework and the DRM system described herein can be used in any suitable context, and are not limited to these specific examples.

Appendix 1 (A)

Systems and Methods for Peer-to-Peer Service Orchestration

Appendix 1 (B)

Digital Rights Management Engine Systems and Methods

APPENDIX 1 (C)

Service Definitions and Profile Schemas

*Definitions* element nsdlc:Base

| | | | | | | |
|---|---|---|---|---|---|---|
| diagram |  | | | | | |
| namespace | http://www.nemo-community.com/schemas/nemo/nsdl/2003/09/core | | | | | |
| type | nsdlc:Base | | | | | |
| attributes | Name | Type | Use | Default | Fixed | Annotation |
| | Id | xsd:anyURI | optional | | | |
| | description | xsd:string | optional | | | | complexType nsdlc:Base

| | | | | | | |
|---|---|---|---|---|---|---|
| diagram |  | | | | | |
| namespace | http://www.nemo-community.com/schemas/nemo/nsdl/2003/09/core | | | | | |
| used by | element | nsdlc:Base | | | | |
| | complexTypes | CryptoKeyInfo CryptoKeyInfoPair DRMInfo License MembershipToken nsdlc:Evidence nsdlc:InterfaceBinding nsdlc:Node nsdlc:NodeIdentityInfo nsdlc:Policy nsdlc:ServiceAttribute nsdlc:ServiceAttributeValue nsdlc:ServiceInfo nsdlc:ServiceMessage nsdlc:ServicePayload nsdlc:Status nsdlc:TargetCriteria OctopusNode Personality UDDIKeyedReference | | | | |
| attributes | Name | Type | Use | Default | Fixed | Annotation |
| | Id | xsd:anyURI | optional | | | |
| | description | xsd:string | optional | | | | complexType nsdlc:Evidence

| | | | | | | |
|---|---|---|---|---|---|---|
| diagram |  | | | | | |
| namespace | http://www.nemo-community.com/schemas/nemo/nsdl/2003/09/core | | | | | |
| type | extension of nsdlc:Base | | | | | |
| used by | elements | ServiceInterfaceAuthorizationRequest/evidence nsdlc:InterfaceBinding/givenEvidence nsdlc:InterfaceBinding/requiredEvidence | | | | |
| | complexTypes | SAMLAssertionEvidence WSPolicyAssertionEvidence | | | | |
| attributes | Name | Type | Use | Default | Fixed | Annotation |
| | Id | xsd:anyURI | optional | | | |
| | description | xsd:string | optional | | | | complexType nsdlc:InterfaceBinding

| | |
|---|---|
| diagram | 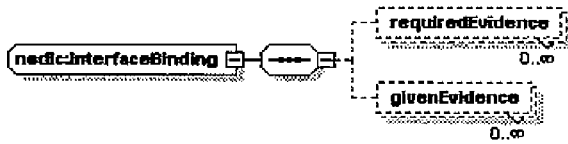 |
| namespace | http://www.nemo-community.com/schemas/nemo/nsdl/2003/09/core |
| type | extension of nsdlc:Base |
| children | requiredEvidence givenEvidence |
| used by | element | nsdlc:ServiceInfo/interface |
| | complexType | WebServiceInterfaceBinding |
| attributes | Name | Type | Use | Default | Fixed | Annotation |
| | Id | xsd:anyURI | optional | | | |
| | description | xsd:string | optional | | | | element nsdlc:InterfaceBinding/requiredEvidence diagram: requiredEvidence namespace: http://www.nemo-community.com/schemas/nemo/nsdl/2003/09/core type: nsdlc:Evidence attributes:

| Name | Type | Use | Default | Fixed | Annotation |
|---|---|---|---|---|---|
| id | xsd:anyURI | optional | | | |
| description | xsd:string | optional | | | | element nsdlc:InterfaceBinding/givenEvidence diagram: givenEvidence namespace: http://www.nemo-community.com/schemas/nemo/nsdl/2003/09/core type: nsdlc:Evidence attributes:

| Name | Type | Use | Default | Fixed | Annotation |
|---|---|---|---|---|---|
| id | xsd:anyURI | optional | | | |
| description | xsd:string | optional | | | | complexType nsdlc:Node diagram: nsdlc:Node — service 0..∞, identityinfo 1..∞ namespace: http://www.nemo-community.com/schemas/nemo/nsdl/2003/09/core type: extension of nsdlc:Base children: service identityinfo used by: complexType SimpleNamedNode attributes:

| Name | Type | Use | Default | Fixed | Annotation |
|---|---|---|---|---|---|
| id | xsd:anyURI | optional | | | |
| description | xsd:string | optional | | | |
| domain | xsd:anyURI | required | | | | element nsdlc:Node/service diagram: nsdlc:ServiceInfo — service, interface 1..∞, attribute 0..∞ namespace: http://www.nemo-community.com/schemas/nemo/nsdl/2003/09/core type: nsdlc:ServiceInfo children: interface attribute attributes:

| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | element nsdlc:Node/identityinfo

| | |
|---|---|
| namespace | http://www.nemo-community.com/schemas/nemo/nsdl/2003/09/core |
| type | nsdlc:NodeIdentityInfo |
| attributes | Name / Type / Use / Default / Fixed / Annotation<br>id / xsd:anyURI / optional<br>description / xsd:string / optional | complexType nsdlc:NodeIdentityInfo

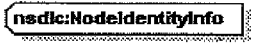

| | |
|---|---|
| namespace | http://www.nemo-community.com/schemas/nemo/nsdl/2003/09/core |
| type | extension of nsdlc:Base |
| used by | elements: nsdlc:Node/identityinfo NodeIdentityInfoTargetCriteria/indentityinfo<br>complexTypes: ReferenceNodeIdentityInfo SimpleIdIdentityInfo SimpleSerialNumberNodeIdentityInfo X509CertificateIdentityInfo |
| attributes | Name / Type / Use / Default / Fixed / Annotation<br>id / xsd:anyURI / optional<br>description / xsd:string / optional | complexType nsdlc:Policy

| | |
|---|---|
| namespace | http://www.nemo-community.com/schemas/nemo/nsdl/2003/09/core |
| type | extension of nsdlc:Base |
| used by | element: ServiceInterfaceAuthorizationResponse/access_policy<br>complexTypes: SAML_AssertionPolicy WSPolicyAssertionPolicy |
| attributes | Name / Type / Use / Default / Fixed / Annotation<br>id / xsd:anyURI / optional<br>description / xsd:string / optional | complexType nsdlc:ServiceAttribute

| | |
|---|---|
| namespace | http://www.nemo-community.com/schemas/nemo/nsdl/2003/09/core |
| type | extension of nsdlc:Base |
| children | value |
| used by | elements: nsdlc:ServiceInfo/attribute AttributeBasedServiceDiscoveryRequest/attribute |
| attributes | Name / Type / Use / Default / Fixed / Annotation<br>id / xsd:anyURI / optional<br>description / xsd:string / optional<br>type / xsd:anyURI | element nsdlc:ServiceAttribute/value

| | |
|---|---|
| namespace | http://www.nemo-community.com/schemas/nemo/nsdl/2003/09/core |
| type | nsdlc:ServiceAttributeValue |
| attributes | Name / Type / Use / Default / Fixed / Annotation<br>id / xsd:anyURI / optional<br>description / xsd:string / optional | complexType nsdic:ServiceAttributeValue diagram

| | | | | | |
|---|---|---|---|---|---|
| namespace | http://www.nemo-community.com/schemas/nemo/nsdl/2003/09/core | | | | |
| type | extension of nsdic:Base | | | | |
| used by | element nsdic:ServiceAttribute/value | | | | |
| | complexType StringServiceAttributeValue | | | | |
| attributes | Name | Type | Use | Default | Fixed | Annotation |
| | id | xsd:anyURI | optional | | | |
| | description | xsd:string | optional | | | | complexType nsdic:ServiceInfo diagram
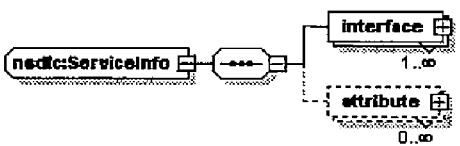

namespace http://www.nemo-community.com/schemas/nemo/nsdl/2003/09/core type extension of nsdic:Base children interface attribute used by
elements nsdic:Node/service nsdic:ServiceMessage/service UDDIBasedServiceDiscoveryResponse/service AttributeBasedServiceDiscoveryResponse/service ServiceInterfaceAuthorizationRequest/serviceInfo ServiceInterfaceAuthorizationResponse/serviceInfo
complexTypes Authorization LicenseAcquisition LicenseTranslation MembershipTokenAcquisition Notification PeerDiscovery Personalization ServiceDiscovery

| attributes | Name | Type | Use | Default | Fixed | Annotation |
|---|---|---|---|---|---|---|
| | id | xsd:anyURI | optional | | | |
| | description | xsd:string | optional | | | |
| | service_profile | xsd:anyURI | required | | | |
| | service_category | xsd:anyURI | required | | | |
| | service_type | xsd:anyURI | required | | | | element nsdic:ServiceInfo/interface diagram
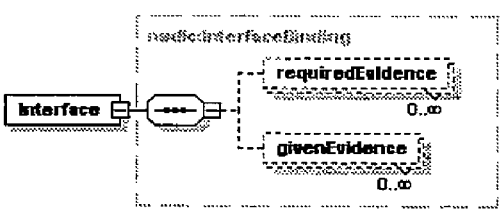

namespace http://www.nemo-community.com/schemas/nemo/nsdl/2003/09/core type nsdic:InterfaceBinding children requiredEvidence givenEvidence

| attributes | Name | Type | Use | Default | Fixed | Annotation |
|---|---|---|---|---|---|---|
| | id | xsd:anyURI | optional | | | |
| | description | xsd:string | optional | | | | element nsdlc:ServiceInfo/attribute diagram

[diagram: attribute — nsdlc:ServiceAttribute — value]

| | |
|---|---|
| namespace | http://www.nemo-community.com/schemas/nemo/nsdl/2003/09/core |
| type | nsdlc:ServiceAttribute |
| children | value |

| attributes | Name | Type | Use | Default | Fixed | Annotation |
|---|---|---|---|---|---|---|
| | id | xsd:anyURI | optional | | | |
| | description | xsd:string | optional | | | |
| | type | xsd:anyURI | | | | | complexType nsdlc:ServiceMessage diagram

[diagram: nsdlc:ServiceMessage — payload 0..∞, status 0..∞, service 1..∞, usage]

| | |
|---|---|
| namespace | http://www.nemo-community.com/schemas/nemo/nsdl/2003/09/core |
| type | extension of nsdlc:Base |
| children | payload status service usage |

| attributes | Name | Type | Use | Default | Fixed | Annotation |
|---|---|---|---|---|---|---|
| | id | xsd:anyURI | optional | | | |
| | description | xsd:string | optional | | | | element nsdlc:ServiceMessage/payload diagram

[diagram: payload — nsdlc:ServicePayload — any 0..∞]

| | |
|---|---|
| namespace | http://www.nemo-community.com/schemas/nemo/nsdl/2003/09/core |
| type | nsdlc:ServicePayload |

| attributes | Name | Type | Use | Default | Fixed | Annotation |
|---|---|---|---|---|---|---|
| | id | xsd:anyURI | optional | | | |
| | description | xsd:string | optional | | | | element nsdlc:ServiceMessage/status

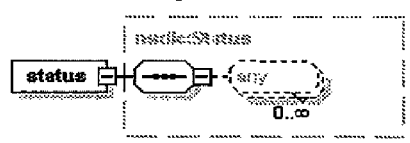

| | | | | | |
|---|---|---|---|---|---|
| namespace | http://www.nemo-community.com/schemas/nemo/nsdl/2003/09/core | | | | |
| type | nsdlc:Status | | | | |
| attributes | Name | Type | Use | Default | Fixed | Annotation |
| | id | xsd:anyURI | optional | | | |
| | description | xsd:string | optional | | | |
| | majorCode | xsd:anyURI | | | | |
| | minorCode | xsd:anyURI | | | | | element nsdlc:ServiceMessage/service

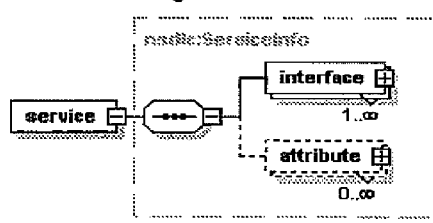

| | |
|---|---|
| namespace | http://www.nemo-community.com/schemas/nemo/nsdl/2003/09/core |
| type | nsdlc:ServiceInfo |
| children | interface attribute |

| attributes | Name | Type | Use | Default | Fixed | Annotation |
|---|---|---|---|---|---|---|
| | id | xsd:anyURI | optional | | | |
| | description | xsd:string | optional | | | |
| | service_profile | xsd:anyURI | required | | | |
| | service_category | xsd:anyURI | required | | | |
| | service_type | xsd:anyURI | required | | | | element nsdlc:ServiceMessage/usage diagram 

| | |
|---|---|
| namespace | http://www.nemo-community.com/schemas/nemo/nsdl/2003/09/core |
| type | nsdlc:MessageUsage |
| facets | enumeration REQUEST |
| | enumeration RESPONSE |
| | enumeration NOTIFICATION | complexType nsdlc:ServicePayload diagram 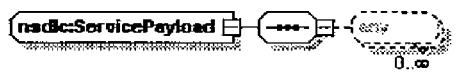

namespace http://www.nemo-community.com/schemas/nemo/nsdl/2003/09/core type extension of nsdlc:Base used by
element nsdlc:ServiceMessage/payload
complexTypes AttributeBasedServiceDiscoveryRequest AttributeBasedServiceDiscoveryResponse OctopusLicenseAcquisitionRequest OctopusLicenseAcquisitionResponse OctopusLicenseTranslationRequest OctopusLicenseTranslationResponse OctopusPersonalizationRequest OctopusPersonalizationResponse ServiceInterfaceAuthorizationRequest ServiceInterfaceAuthorizationResponse UDDIBasedServiceDiscoveryRequest UDDIBasedServiceDiscoveryResponse UPnPPeerDiscoveryRequest UPnPPeerDiscoveryResponse attributes
| Name | Type | Use | Default | Fixed | Annotation |
|---|---|---|---|---|---|
| id | xsd:anyURI | optional | | | |
| description | xsd:string | optional | | | | complexType nsdlc:Status diagram 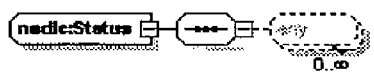

namespace http://www.nemo-community.com/schemas/nemo/nsdl/2003/09/core type extension of nsdlc:Base used by element nsdlc:ServiceMessage/status attributes
| Name | Type | Use | Default | Fixed | Annotation |
|---|---|---|---|---|---|
| id | xsd:anyURI | optional | | | |
| description | xsd:string | optional | | | |
| majorCode | xsd:anyURI | | | | |
| minorCode | xsd:anyURI | | | | | complexType nsdlc:TargetCriteria diagram 

namespace http://www.nemo-community.com/schemas/nemo/nsdl/2003/09/core type extension of nsdlc:Base used by
complexTypes NodeIdentityInfoTargetCriteria SimplePropertyTypeTargetCriteria SimpleServiceTypeTargetCriteria attributes
| Name | Type | Use | Default | Fixed | Annotation |
|---|---|---|---|---|---|
| id | xsd:anyURI | optional | | | |
| description | xsd:string | optional | | | | simpleType nsdlc:MessageUsage namespace http://www.nemo-community.com/schemas/nemo/nsdl/2003/09/core type restriction of xsd:string used by element nsdlc:ServiceMessage/usage facets
enumeration REQUEST
enumeration RESPONSE
enumeration NOTIFICATION complexType NodeIdentityInfoTargetCriteria diagram

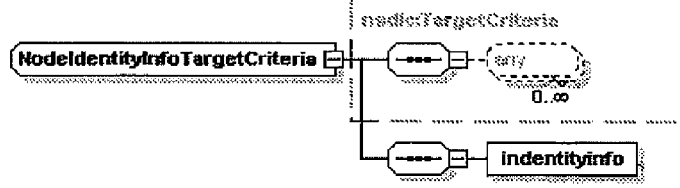

| | |
|---|---|
| namespace | http://www.nemo-community.com/schemas/nemo/nsdl/2003/09/core/ext/01 |
| type | extension of nsdlc:TargetCriteria |
| children | indentityinfo | attributes

| Name | Type | Use | Default | Fixed | Annotation |
|---|---|---|---|---|---|
| id | xsd:anyURI | optional | | | |
| description | xsd:string | optional | | | | element NodeIdentityInfoTargetCriteria/indentityinfo diagram

| | |
|---|---|
| namespace | http://www.nemo-community.com/schemas/nemo/nsdl/2003/09/core/ext/01 |
| type | nsdlc:NodeIdentityInfo | attributes

| Name | Type | Use | Default | Fixed | Annotation |
|---|---|---|---|---|---|
| id | xsd:anyURI | optional | | | |
| description | xsd:string | optional | | | | complexType ReferenceNodeIdentityInfo diagram

| | |
|---|---|
| namespace | http://www.nemo-community.com/schemas/nemo/nsdl/2003/09/core/ext/01 |
| type | extension of nsdlc:NodeIdentityInfo |
| children | reference | attributes

| Name | Type | Use | Default | Fixed | Annotation |
|---|---|---|---|---|---|
| id | xsd:anyURI | optional | | | |
| description | xsd:string | optional | | | | element ReferenceNodeIdentityInfo/reference diagram

| | |
|---|---|
| namespace | http://www.nemo-community.com/schemas/nemo/nsdl/2003/09/core/ext/01 |
| type | xsd:anyURI | complexType SAMLAssertionEvidence diagram

| | |
|---|---|
| namespace | http://www.nemo-community.com/schemas/nemo/nsdl/2003/09/core/ext/01 |
| type | extension of nsdlc:Evidence | attributes

| Name | Type | Use | Default | Fixed | Annotation |
|---|---|---|---|---|---|
| id | xsd:anyURI | optional | | | |
| description | xsd:string | optional | | | | complexType SAMLAssertionPolicy diagram

[SAMLAssertionPolicy diagram with any 0..∞]

namespace http://www.nemo-community.com/schemas/nemo/nsdl/2003/09/core/ext/01 type extension of nsdlc:Policy attributes

| Name | Type | Use | Default | Fixed | Annotation |
|------|------|-----|---------|-------|------------|
| id | xsd:anyURI | optional | | | |
| description | xsd:string | optional | | | | complexType SimpleIdIdentityInfo diagram

[SimpleIdIdentityInfo diagram with simpleid]

namespace http://www.nemo-community.com/schemas/nemo/nsdl/2003/09/core/ext/01 type extension of nsdlc:NodeIdentityInfo children simpleid attributes

| Name | Type | Use | Default | Fixed | Annotation |
|------|------|-----|---------|-------|------------|
| id | xsd:anyURI | optional | | | |
| description | xsd:string | optional | | | | element SimpleIdIdentityInfo/simpleid diagram

[simpleid]

namespace http://www.nemo-community.com/schemas/nemo/nsdl/2003/09/core/ext/01 type xsd:anyURI complexType SimpleNamedNode diagram

[SimpleNamedNode diagram with service 0..∞, identityinfo 1..∞, name]

namespace http://www.nemo-community.com/schemas/nemo/nsdl/2003/09/core/ext/01 type extension of nsdlc:Node children service identityinfo name attributes

| Name | Type | Use | Default | Fixed | Annotation |
|------|------|-----|---------|-------|------------|
| id | xsd:anyURI | optional | | | |
| description | xsd:string | optional | | | |
| domain | xsd:anyURI | required | | | | element SimpleNamedNode/name diagram

[name]

namespace http://www.nemo-community.com/schemas/nemo/nsdl/2003/09/core/ext/01 type xsd:anyURI complexType SimplePropertyTypeTargetCriteria diagram 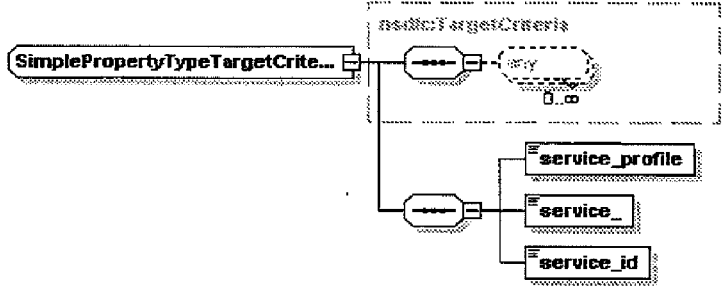

| | | | | | |
|---|---|---|---|---|---|
| namespace | http://www.nemo-community.com/schemas/nemo/nsdl/2003/09/core/ext/01 | | | | |
| type | extension of nsdlc:TargetCriteria | | | | |
| children | service_profile service_ service_id | | | | |
| attributes | Name | Type | Use | Default | Fixed | Annotation |
| | id | xsd:anyURI | optional | | | |
| | description | xsd:string | optional | | | | element SimplePropertyTypeTargetCriteria/service_profile diagram 

namespace http://www.nemo-community.com/schemas/nemo/nsdl/2003/09/core/ext/01 type xsd:anyURI element SimplePropertyTypeTargetCriteria/service_ diagram 

namespace http://www.nemo-community.com/schemas/nemo/nsdl/2003/09/core/ext/01 type xsd:anyURI element SimplePropertyTypeTargetCriteria/service_id diagram 

namespace http://www.nemo-community.com/schemas/nemo/nsdl/2003/09/core/ext/01 type xsd:anyURI complexType SimpleSerialNumberNodeIdentityInfo diagram 

| | | | | | |
|---|---|---|---|---|---|
| namespace | http://www.nemo-community.com/schemas/nemo/nsdl/2003/09/core/ext/01 | | | | |
| type | extension of nsdlc:NodeIdentityInfo | | | | |
| children | serialnumber | | | | |
| attributes | Name | Type | Use | Default | Fixed | Annotation |
| | id | xsd:anyURI | optional | | | |
| | description | xsd:string | optional | | | | element SimpleSerialNumberNodeIdentityInfo/serialnumber diagram 

namespace http://www.nemo-community.com/schemas/nemo/nsdl/2003/09/core/ext/01 type xsd:string complexType SimpleServiceTypeTargetCriteria diagram 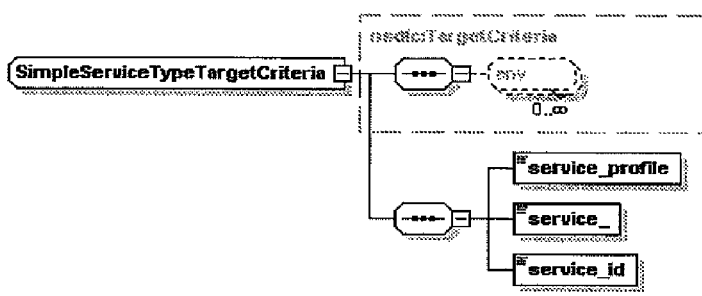

namespace http://www.nemo-community.com/schemas/nemo/nsdl/2003/09/core/ext/01 type extension of nsdlc:TargetCriteria children service_profile service_ service_id

| attributes | Name | Type | Use | Default | Fixed | Annotation |
|---|---|---|---|---|---|---|
| | id | xsd:anyURI | optional | | | |
| | description | xsd:string | optional | | | | element SimpleServiceTypeTargetCriteria/service_profile diagram 

namespace http://www.nemo-community.com/schemas/nemo/nsdl/2003/09/core/ext/01 type xsd:anyURI element SimpleServiceTypeTargetCriteria/service_ diagram 

namespace http://www.nemo-community.com/schemas/nemo/nsdl/2003/09/core/ext/01 type xsd:anyURI element SimpleServiceTypeTargetCriteria/service_id diagram 

namespace http://www.nemo-community.com/schemas/nemo/nsdl/2003/09/core/ext/01 type xsd:anyURI complexType StringServiceAttributeValue

- diagram: StringServiceAttributeValue → stringvalue
- namespace: http://www.nemo-community.com/schemas/nemo/nsdl/2003/09/core/ext/01
- type: extension of nsdlc:ServiceAttributeValue
- children: stringvalue
- attributes:

| Name | Type | Use | Default | Fixed | Annotation |
|------|------|-----|---------|-------|------------|
| id | xsd:anyURI | optional | | | |
| description | xsd:string | optional | | | | element StringServiceAttributeValue/stringvalue

- diagram: stringvalue
- namespace: http://www.nemo-community.com/schemas/nemo/nsdl/2003/09/core/ext/01
- type: xsd:string complexType WebServiceInterfaceBinding

- diagram: WebServiceInterfaceBinding → nsdlc:InterfaceBinding → requiredEvidence 0..∞, givenEvidence 0..∞
- namespace: http://www.nemo-community.com/schemas/nemo/nsdl/2003/09/core/ext/01
- type: extension of nsdlc:InterfaceBinding
- children: requiredEvidence givenEvidence
- used by: complexTypes WebServiceInterfaceBindingLiteral WebServiceInterfaceBindingWSDL
- attributes:

| Name | Type | Use | Default | Fixed | Annotation |
|------|------|-----|---------|-------|------------|
| id | xsd:anyURI | optional | | | |
| description | xsd:string | optional | | | | complexType WebServiceInterfaceBindingLiteral

- diagram: WebServiceInterfaceBindingLite... → WebServiceInterfaceBinding → requiredEvidence 0..∞, givenEvidence 0..∞; service_namespace, soap_action, service_interfacename, service_interfaceurl
- namespace: http://www.nemo-community.com/schemas/nemo/nsdl/2003/09/core/ext/01
- type: extension of WebServiceInterfaceBinding

| children | requiredEvidence givenEvidence service_namespace soap_action service_interfacename service_interfaceurl | | | | | |
|---|---|---|---|---|---|---|
| attributes | Name | Type | Use | Default | Fixed | Annotation |
| | id | xsd:anyURI | optional | | | |
| | description | xsd:string | optional | | | | element WebServiceInterfaceBindingLiteral/service_namespace diagram: service_namespace namespace: http://www.nemo-community.com/schemas/nemo/nsdl/2003/09/core/ext/01 type: xsd:string element WebServiceInterfaceBindingLiteral/soap_action diagram: soap_action namespace: http://www.nemo-community.com/schemas/nemo/nsdl/2003/09/core/ext/01 type: xsd:string element WebServiceInterfaceBindingLiteral/service_interfacename diagram: service_interfacename namespace: http://www.nemo-community.com/schemas/nemo/nsdl/2003/09/core/ext/01 type: xsd:string element WebServiceInterfaceBindingLiteral/service_interfaceurl diagram: service_interfaceurl namespace: http://www.nemo-community.com/schemas/nemo/nsdl/2003/09/core/ext/01 type: xsd:string complexType WebServiceInterfaceBindingWSDL diagram:

namespace: http://www.nemo-community.com/schemas/nemo/nsdl/2003/09/core/ext/01 type: extension of WebServiceInterfaceBinding children: requiredEvidence givenEvidence wsdl_description

| attributes | Name | Type | Use | Default | Fixed | Annotation |
|---|---|---|---|---|---|---|
| | id | xsd:anyURI | optional | | | |
| | description | xsd:string | optional | | | | element WebServiceInterfaceBindingWSDL/wsdl_description diagram: wsdl_description namespace: http://www.nemo-community.com/schemas/nemo/nsdl/2003/09/core/ext/01 type: xsd:anyURI complexType WSPolicyAssertionEvidence

- diagram: WSPolicyAssertionEvidence — any 0..∞
- namespace: http://www.nemo-community.com/schemas/nemo/nsdl/2003/09/core/ext/01
- type: extension of nsdlc:Evidence
- attributes:

| Name | Type | Use | Default | Fixed | Annotation |
|---|---|---|---|---|---|
| id | xsd:anyURI | optional | | | |
| description | xsd:string | optional | | | | complexType WSPolicyAssertionPolicy

- diagram: WSPolicyAssertionPolicy — any 0..∞
- namespace: http://www.nemo-community.com/schemas/nemo/nsdl/2003/09/core/ext/01
- type: extension of nsdlc:Policy
- attributes:

| Name | Type | Use | Default | Fixed | Annotation |
|---|---|---|---|---|---|
| id | xsd:anyURI | optional | | | |
| description | xsd:string | optional | | | | complexType X509CertificateIdentityInfo

- diagram: X509CertificateIdentityInfo — x509certdata
- namespace: http://www.nemo-community.com/schemas/nemo/nsdl/2003/09/core/ext/01
- type: extension of nsdlc:NodeIdentityInfo
- children: x509certdata
- used by: element OctopusPersonalizationRequest/identity
- attributes:

| Name | Type | Use | Default | Fixed | Annotation |
|---|---|---|---|---|---|
| id | xsd:anyURI | optional | | | |
| description | xsd:string | optional | | | | element X509CertificateIdentityInfo/x509certdata

- diagram: x509certdata
- namespace: http://www.nemo-community.com/schemas/nemo/nsdl/2003/09/core/ext/01
- type: xsd:base64Binary complexType Authorization

- diagram: Authorization — nsdlc:ServiceInfo { interface 1..∞, attribute 0..∞ }
- namespace: http://www.nemo-community.com/schemas/nemo/nsdl/2003/09/core/svc
- type: extension of nsdlc:ServiceInfo
- children: interface attribute
- used by: complexType ServiceInterfaceAuthorization
- attributes:

| Name | Type | Use | Default | Fixed | Annotation |
|---|---|---|---|---|---|
| id | xsd:anyURI | optional | | | |
| description | xsd:string | optional | | | |

| | service_profile | xsd:anyURI | required |
| | service_category | xsd:anyURI | required |
| | service_type | xsd:anyURI | required | complexType Notification diagram

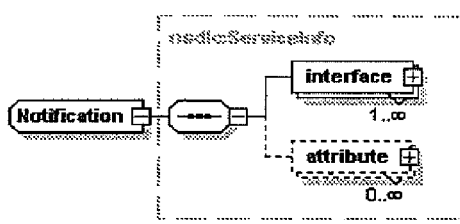

| namespace | http://www.nemo-community.com/schemas/nemo/nsdl/2003/09/core/svc |
|---|---|
| type | extension of nsdlc:ServiceInfo |
| children | interface attribute |

| attributes | Name | Type | Use | Default | Fixed | Annotation |
|---|---|---|---|---|---|---|
| | id | xsd:anyURI | optional | | | |
| | description | xsd:string | optional | | | |
| | service_profile | xsd:anyURI | required | | | |
| | service_category | xsd:anyURI | required | | | |
| | service_type | xsd:anyURI | required | | | | complexType PeerDiscovery diagram

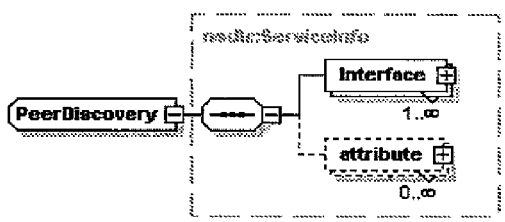

| namespace | http://www.nemo-community.com/schemas/nemo/nsdl/2003/09/core/svc |
|---|---|
| type | extension of nsdlc:ServiceInfo |
| children | interface attribute |
| used by | complexType UPnPPeerDiscovery |

| attributes | Name | Type | Use | Default | Fixed | Annotation |
|---|---|---|---|---|---|---|
| | id | xsd:anyURI | optional | | | |
| | description | xsd:string | optional | | | |
| | service_profile | xsd:anyURI | required | | | |
| | service_category | xsd:anyURI | required | | | |
| | service_type | xsd:anyURI | required | | | | complexType ServiceDiscovery diagram

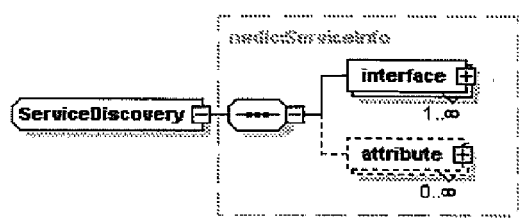

namespace  http://www.nemo-community.com/schemas/nemo/nsdl/2003/09/core/svc type  extension of nsdlc:ServiceInfo children  interface attribute used by  complexTypes  AttributeBasedServiceDiscovery UDDIBasedServiceDiscovery attributes

| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | complexType AttributeBasedServiceDiscovery diagram

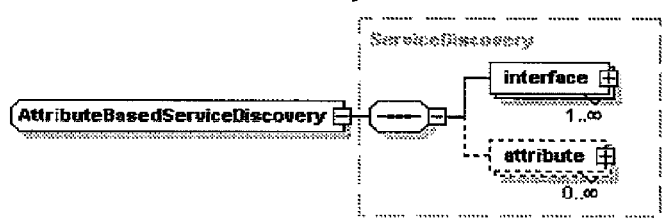

namespace  http://www.nemo-community.com/schemas/nemo/nsdl/2003/09/core/svc/ext/01 type  extension of ServiceDiscovery children  interface attribute attributes

| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | complexType AttributeBasedServiceDiscoveryRequest diagram

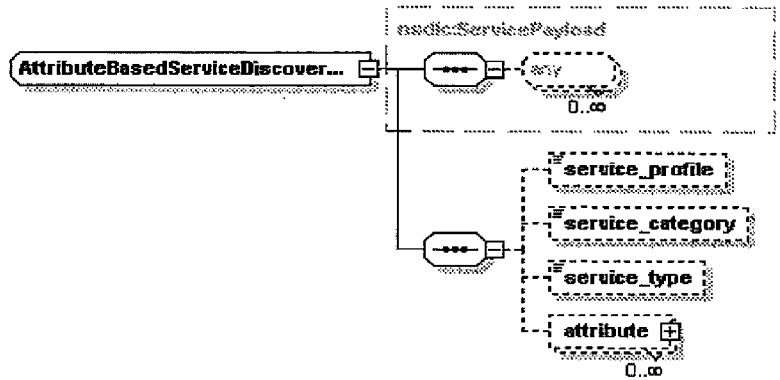

| namespace | http://www.nemo-community.com/schemas/nemo/nsd/2003/09/core/svc/ext/01 |
|---|---|
| type | extension of nadlc:ServicePayload |
| children | service_profile service_category service_type attribute |

| attributes | Name | Type | Use | Default | Fixed | Annotation |
|---|---|---|---|---|---|---|
| | Id | xsd:anyURI | optional | | | |
| | description | xsd:string | optional | | | | element AttributeBasedServiceDiscoveryRequest/service_profile diagram 

| namespace | http://www.nemo-community.com/schemas/nemo/nsd/2003/09/core/svc/ext/01 |
|---|---|
| type | xsd:anyURI | element AttributeBasedServiceDiscoveryRequest/service_category diagram 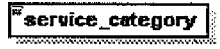

| namespace | http://www.nemo-community.com/schemas/nemo/nsd/2003/09/core/svc/ext/01 |
|---|---|
| type | xsd:anyURI | element AttributeBasedServiceDiscoveryRequest/service_type diagram 

| namespace | http://www.nemo-community.com/schemas/nemo/nsd/2003/09/core/svc/ext/01 |
|---|---|
| type | xsd:anyURI | element AttributeBasedServiceDiscoveryRequest/attribute diagram 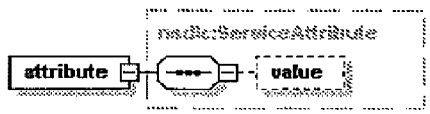

namespace http://www.nemo-community.com/schemas/nemo/nsdl/2003/09/core/svc/ext/01 type nsdlc:ServiceAttribute children value attributes
| Name | Type | Use | Default | Fixed | Annotation |
|---|---|---|---|---|---|
| id | xsd:anyURI | optional | | | |
| description | xsd:string | optional | | | |
| type | xsd:anyURI | | | | | complexType AttributeBasedServiceDiscoveryResponse diagram 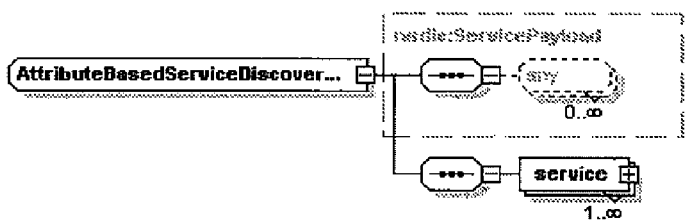

namespace http://www.nemo-community.com/schemas/nemo/nsdl/2003/09/core/svc/ext/0t type extension of nsdlc:ServicePayload children service attributes
| Name | Type | Use | Default | Fixed | Annotation |
|---|---|---|---|---|---|
| id | xsd:anyURI | optional | | | |
| description | xsd:string | optional | | | | element AttributeBasedServiceDiscoveryResponse/service diagram 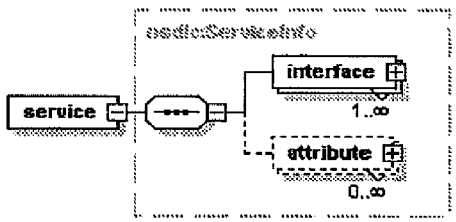

namespace http://www.nemo-community.com/schemas/nemo/nsdl/2003/09/core/svc/ext/01 type nsdlc:ServiceInfo children interface attribute attributes
| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | complexType ServiceInterfaceAuthorization diagram

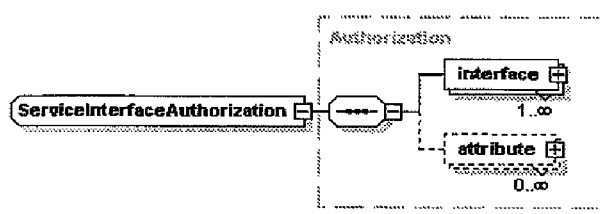

namespace  http://www.nemo-community.com/schemas/nemo/nsdl/2003/09/core/svc/ext/01
type       extension of Authorization
children   interface attribute
attributes

| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | complexType ServiceInterfaceAuthorizationRequest diagram

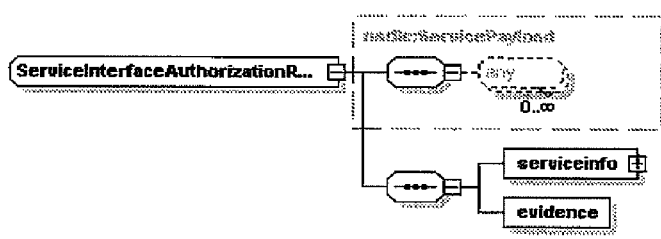

namespace  http://www.nemo-community.com/schemas/nemo/nsdl/2003/09/core/svc/ext/01
type       extension of nsdlc:ServicePayload
children   serviceinfo evidence
attributes

| Name | Type | Use | Default | Fixed | Annotation |
|---|---|---|---|---|---|
| id | xsd:anyURI | optional | | | |
| description | xsd:string | optional | | | | element ServiceInterfaceAuthorizationRequest/serviceinfo diagram

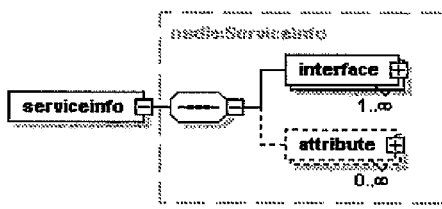

namespace  http://www.nemo-community.com/schemas/nemo/nsdl/2003/09/core/svc/ext/01
type       nsdlc:ServiceInfo
children   interface attribute
attributes

| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |

| | service_type | xsd:anyURI | required | element ServiceInterfaceAuthorizationRequest/evidence diagram 

namespace http://www.nemo-community.com/schemas/nemo/nsdl/2003/09/core/svc/ext/01 type nsdlc:Evidence

| attributes | Name | Type | Use | Default | Fixed | Annotation |
|---|---|---|---|---|---|---|
| | id | xsd:anyURI | optional | | | |
| | description | xsd:string | optional | | | | complexType ServiceInterfaceAuthorizationResponse diagram 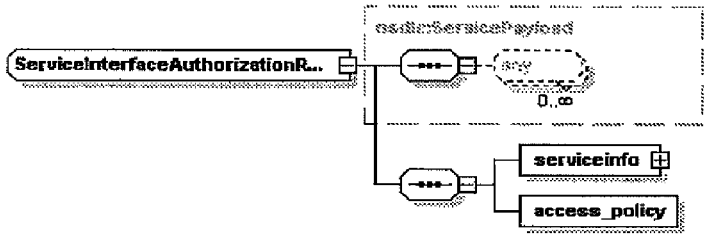

namespace http://www.nemo-community.com/schemas/nemo/nsdl/2003/09/core/svc/ext/01 type extension of nsdlc:ServicePayload children serviceinfo access_policy

| attributes | Name | Type | Use | Default | Fixed | Annotation |
|---|---|---|---|---|---|---|
| | id | xsd:anyURI | optional | | | |
| | description | xsd:string | optional | | | | element ServiceInterfaceAuthorizationResponse/serviceinfo diagram 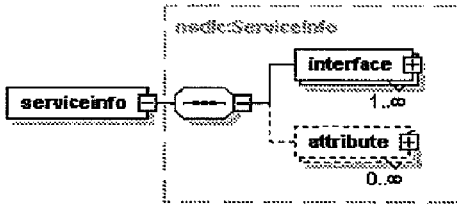

namespace http://www.nemo-community.com/schemas/nemo/nsdl/2003/09/core/svc/ext/01 type nsdlc:ServiceInfo children interface attribute

| attributes | Name | Type | Use | Default | Fixed | Annotation |
|---|---|---|---|---|---|---|
| | id | xsd:anyURI | optional | | | |
| | description | xsd:string | optional | | | |
| | service_profile | xsd:anyURI | required | | | |
| | service_category | xsd:anyURI | required | | | |
| | service_type | xsd:anyURI | required | | | | element ServiceInterfaceAuthorizationResponse/access_policy diagram 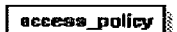

namespace http://www.nemo-community.com/schemas/nemo/nsdl/2003/09/core/svc/ext/01 type nsdlc:Policy

| attributes | Name | Type | Use | Default | Fixed | Annotation |
|---|---|---|---|---|---|---|
| | id | xsd:anyURI | optional | | | |
| | description | xsd:string | optional | | | | complexType UDDIBasedServiceDiscovery diagram

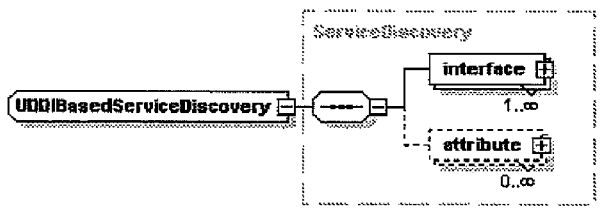

namespace http://www.nemo-community.com/schemas/nemo/nsdl/2003/09/core/svc/ext/01 type extension of ServiceDiscovery children interface attribute attributes

| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | complexType UDDIBasedServiceDiscoveryRequest diagram

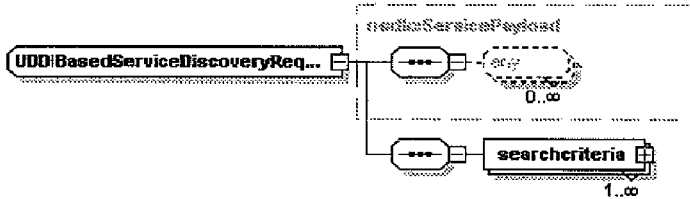

namespace http://www.nemo-community.com/schemas/nemo/nsdl/2003/09/core/svc/ext/01 type extension of nsdlc:ServicePayload children searchcriteria attributes

| Name | Type | Use | Default | Fixed | Annotation |
|---|---|---|---|---|---|
| id | xsd:anyURI | optional | | | |
| description | xsd:string | optional | | | | element UDDIBasedServiceDiscoveryRequest/searchcriteria diagram

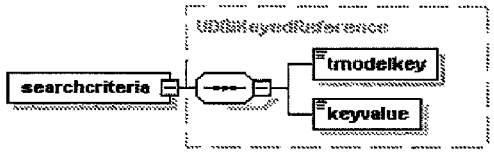

namespace http://www.nemo-community.com/schemas/nemo/nsdl/2003/09/core/svc/ext/01 type UDDIKeyedReference children tmodelkey keyvalue attributes

| Name | Type | Use | Default | Fixed | Annotation |
|---|---|---|---|---|---|
| id | xsd:anyURI | optional | | | |
| description | xsd:string | optional | | | | complexType UDDIBasedServiceDiscoveryResponse diagram
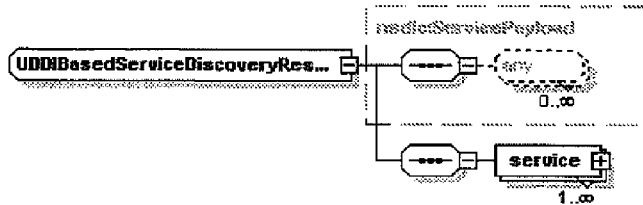

| namespace | http://www.nemo-community.com/schemas/nemo/nsdl/2003/09/core/svc/ext/01 |
|---|---|
| type | extension of nsdlc:ServicePayload |
| children | service | attributes
| Name | Type | Use | Default | Fixed | Annotation |
|---|---|---|---|---|---|
| Id | xsd:anyURI | optional | | | |
| description | xsd:string | optional | | | | element UDDIBasedServiceDiscoveryResponse/service diagram
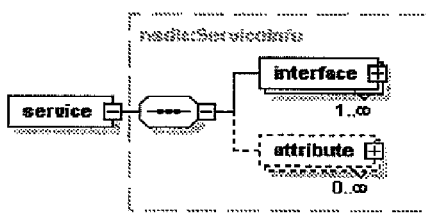

| namespace | http://www.nemo-community.com/schemas/nemo/nsdl/2003/09/core/svc/ext/01 |
|---|---|
| type | nsdlc:ServiceInfo |
| children | interface attribute | attributes
| Name | Type | Use | Default | Fixed | Annotation |
|---|---|---|---|---|---|
| Id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | complexType UDDIKeyedReference diagram
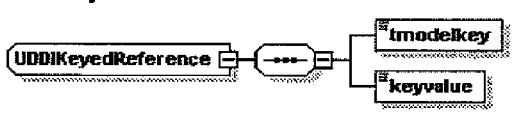

| namespace | http://www.nemo-community.com/schemas/nemo/nsdl/2003/09/core/svc/ext/01 |
|---|---|
| type | extension of nsdlc:Base |
| children | tmodelkey keyvalue |
| used by | element UDDIBasedServiceDiscoveryRequest/searchcriteria | attributes
| Name | Type | Use | Default | Fixed | Annotation |
|---|---|---|---|---|---|
| Id | xsd:anyURI | optional | | | |
| description | xsd:string | optional | | | | element UDDIKeyedReference/tmodelkey

namespace http://www.nemo-community.com/schemas/nemo/nsdl/2003/09/core/svc/ext/01
type xsd:string element UDDIKeyedReference/keyvalue

namespace http://www.nemo-community.com/schemas/nemo/nsdl/2003/09/core/svc/ext/01
type xsd:string complexType UPnPPeerDiscovery

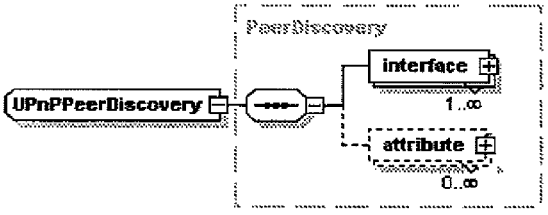

namespace http://www.nemo-community.com/schemas/nemo/nsdl/2003/09/core/svc/ext/01
type extension of PeerDiscovery
children interface attribute attributes

| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | complexType UPnPPeerDiscoveryRequest

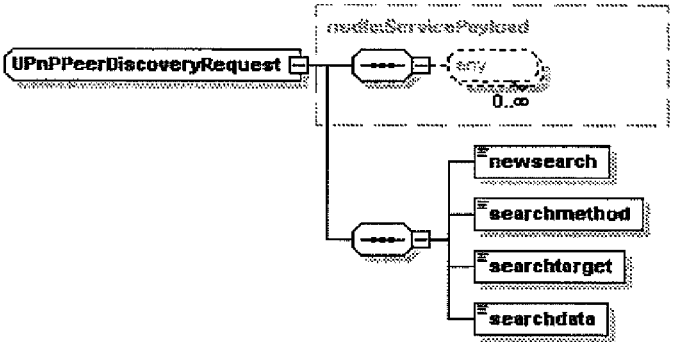

namespace http://www.nemo-community.com/schemas/nemo/nsdl/2003/09/core/svc/ext/01
type extension of nsdlc:ServicePayload
children newsearch searchmethod searchtarget searchdata attributes

| Name | Type | Use | Default | Fixed | Annotation |
|---|---|---|---|---|---|
| id | xsd:anyURI | optional | | | |
| description | xsd:string | optional | | | | element UPnPPeerDiscoveryRequest/newsearch diagram

namespace   http://www.nemo-community.com/schemas/nemo/nsdl/2003/09/core/svc/ext/01 type   xsd:boolean element UPnPPeerDiscoveryRequest/searchmethod diagram

namespace   http://www.nemo-community.com/schemas/nemo/nsdl/2003/09/core/svc/ext/01 type   UPnPPeerSearchMethod facets   enumeration   M-SEARCH element UPnPPeerDiscoveryRequest/searchtarget diagram

namespace   http://www.nemo-community.com/schemas/nemo/nsdl/2003/09/core/svc/ext/01 type   UPnPPeerSearchTarget facets   enumeration   ALL
         enumeration   ROOTDEVICE
         enumeration   DEVICETYPE element UPnPPeerDiscoveryRequest/searchdata diagram

namespace   http://www.nemo-community.com/schemas/nemo/nsdl/2003/09/core/svc/ext/01 type   xsd:string complexType UPnPPeerDiscoveryResponse diagram

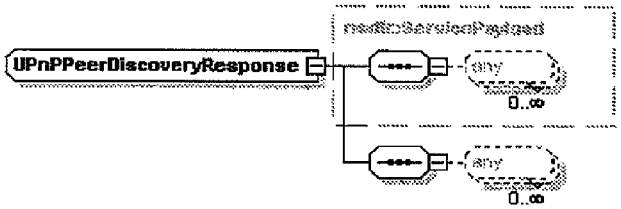

namespace   http://www.nemo-community.com/schemas/nemo/nsdl/2003/09/core/svc/ext/01 type   extension of nsdlc:ServicePayload attributes

| Name | Type | Use | Default | Fixed | Annotation |
|---|---|---|---|---|---|
| id | xsd:anyURI | optional | | | |
| description | xsd:string | optional | | | | simpleType UPnPPeerSearchMethod namespace   http://www.nemo-community.com/schemas/nemo/nsdl/2003/09/core/svc/ext/01 type   restriction of xsd:string used by   element   UPnPPeerDiscoveryRequest/searchmethod facets   enumeration   M-SEARCH simpleType UPnPPeerSearchTarget

| | | |
|---|---|---|
| namespace | http://www.nemo-community.com/schemas/nemo/nsdl/2003/09/core/svc/ext/01 | |
| type | restriction of xsd:string | |
| used by | element | UPnPPeerDiscoveryRequest/searchtarget |
| facets | enumeration | ALL |
| | enumeration | ROOTDEVICE |
| | enumeration | DEVICETYPE | complexType CryptoKeyInfo diagram

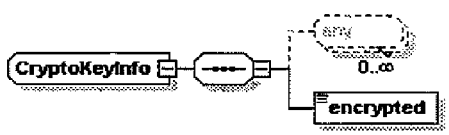

| | |
|---|---|
| namespace | http://www.nemo-community.com/schemas/nemo/nsdl/2003/09/drm |
| type | extension of nsdlc:Base |
| children | encrypted |
| used by | elements CryptoKeyInfoPair/privatekey CryptoKeyInfoPair/publickey |

| attributes | Name | Type | Use | Default | Fixed | Annotation |
|---|---|---|---|---|---|---|
| | id | xsd:anyURI | optional | | | |
| | description | xsd:string | optional | | | | element CryptoKeyInfo/encrypted diagram 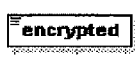

| | |
|---|---|
| namespace | http://www.nemo-community.com/schemas/nemo/nsdl/2003/09/drm |
| type | xsd:boolean | complexType CryptoKeyInfoPair diagram

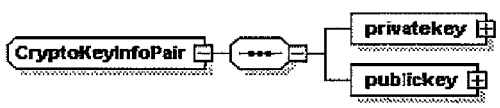

| | |
|---|---|
| namespace | http://www.nemo-community.com/schemas/nemo/nsdl/2003/09/drm |
| type | extension of nsdlc:Base |
| children | privatekey publickey |
| used by | elements DeviceAOctopusNode/contentprotectionkey DeviceAOctopusNode/secretprotectionkey |

| attributes | Name | Type | Use | Default | Fixed | Annotation |
|---|---|---|---|---|---|---|
| | id | xsd:anyURI | optional | | | |
| | description | xsd:string | optional | | | | element CryptoKeyInfoPair/privatekey diagram

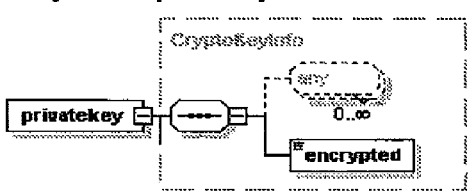

| | |
|---|---|
| namespace | http://www.nemo-community.com/schemas/nemo/nsdl/2003/09/drm |
| type | CryptoKeyInfo |
| children | encrypted |

| attributes | Name | Type | Use | Default | Fixed | Annotation |
|---|---|---|---|---|---|---|
| | id | xsd:anyURI | optional | | | |
| | description | xsd:string | optional | | | | element CryptoKeyInfoPair/publickey diagram

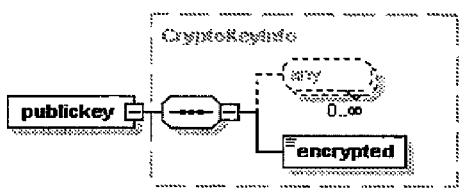

namespace http://www.nemo-community.com/schemas/nemo/nsdl/2003/09/drm
type CryptoKeyInfo
children encrypted

| attributes | Name | Type | Use | Default | Fixed | Annotation |
|---|---|---|---|---|---|---|
| | id | xsd:anyURI | optional | | | |
| | description | xsd:string | optional | | | | complexType DRMInfo diagram 

namespace http://www.nemo-community.com/schemas/nemo/nsdl/2003/09/drm
type extension of nsdlc:Base
used by elements Personality/drminfo License/drminfo MembershipToken/drminfo
complexType OctopusDRMInfo

| attributes | Name | Type | Use | Default | Fixed | Annotation |
|---|---|---|---|---|---|---|
| | id | xsd:anyURI | optional | | | |
| | description | xsd:string | optional | | | | complexType License diagram

namespace http://www.nemo-community.com/schemas/nemo/nsdl/2003/09/drm
type extension of nsdlc:Base
children drminfo
used by complexType OctopusLicense

| attributes | Name | Type | Use | Default | Fixed | Annotation |
|---|---|---|---|---|---|---|
| | id | xsd:anyURI | optional | | | |
| | description | xsd:string | optional | | | | element License/drminfo diagram 

namespace http://www.nemo-community.com/schemas/nemo/nsdl/2003/09/drm
type DRMInfo

| attributes | Name | Type | Use | Default | Fixed | Annotation |
|---|---|---|---|---|---|---|
| | id | xsd:anyURI | optional | | | |
| | description | xsd:string | optional | | | | complexType MembershipToken diagram 

namespace http://www.nemo-community.com/schemas/nemo/nsdl/2003/09/drm type extension of nsdlc:Base children drminfo used by  complexType  OctopusMembershipToken attributes
| Name | Type | Use | Default | Fixed | Annotation |
|---|---|---|---|---|---|
| id | xsd:anyURI | optional | | | |
| description | xsd:string | optional | | | | element MembershipToken/drminfo diagram 

namespace http://www.nemo-community.com/schemas/nemo/nsdl/2003/09/drm type DRMInfo attributes
| Name | Type | Use | Default | Fixed | Annotation |
|---|---|---|---|---|---|
| id | xsd:anyURI | optional | | | |
| description | xsd:string | optional | | | | complexType Personality diagram 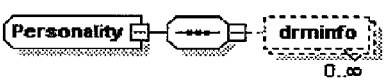

namespace http://www.nemo-community.com/schemas/nemo/nsdl/2003/09/drm type extension of nsdlc:Base children drminfo used by  complexType  OctopusPersonality attributes
| Name | Type | Use | Default | Fixed | Annotation |
|---|---|---|---|---|---|
| id | xsd:anyURI | optional | | | |
| description | xsd:string | optional | | | | element Personality/drminfo diagram 

namespace http://www.nemo-community.com/schemas/nemo/nsdl/2003/09/drm type DRMInfo attributes
| Name | Type | Use | Default | Fixed | Annotation |
|---|---|---|---|---|---|
| id | xsd:anyURI | optional | | | |
| description | xsd:string | optional | | | | complexType LicenseAcquisition diagram 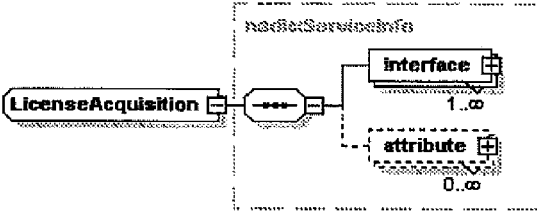

namespace http://www.nemo-community.com/schemas/nemo/nsdl/2003/09/drm/svc type extension of nsdlc:ServiceInfo

| | | | | | | |
|---|---|---|---|---|---|---|
| children | interface attribute | | | | | |
| used by | complexType | OctopusLicenseAcquisition | | | | |
| attributes | Name | Type | Use | Default | Fixed | Annotation |
| | id | xsd:anyURI | optional | | | |
| | description | xsd:string | optional | | | |
| | service_profile | xsd:anyURI | required | | | |
| | service_categor y | xsd:anyURI | required | | | |
| | service_type | xsd:anyURI | required | | | | complexType LicenseTranslation diagram

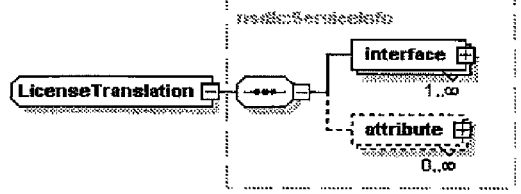

namespace http://www.nemo-community.com/schemas/nemo/nsdl/2003/09/drm/svc type extension of nsdlc:ServiceInfo

| | | | | | | |
|---|---|---|---|---|---|---|
| children | interface attribute | | | | | |
| used by | complexType | OctopusLicenseTranslation | | | | |
| attributes | Name | Type | Use | Default | Fixed | Annotation |
| | id | xsd:anyURI | optional | | | |
| | description | xsd:string | optional | | | |
| | service_profile | xsd:anyURI | required | | | |
| | service_categor y | xsd:anyURI | required | | | |
| | service_type | xsd:anyURI | required | | | | complexType MembershipTokenAcquisition diagram

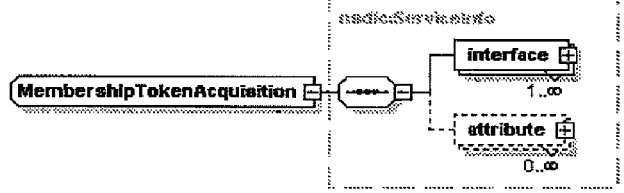

namespace http://www.nemo-community.com/schemas/nemo/nsdl/2003/09/drm/svc type extension of nsdlc:ServiceInfo children interface attribute

| | | | | | |
|---|---|---|---|---|---|
| attributes | Name | Type | Use | Default | Fixed | Annotation |
| | id | xsd:anyURI | optional | | | |
| | description | xsd:string | optional | | | |
| | service_profile | xsd:anyURI | required | | | |
| | service_categor y | xsd:anyURI | required | | | |
| | service_type | xsd:anyURI | required | | | | complexType Personalization diagram

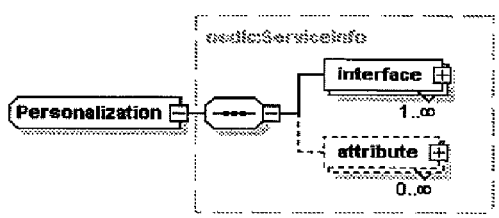

| namespace | http://www.nemo-community.com/schemas/nemo/nsdl/2003/09/drm/svc | | | | | |
|---|---|---|---|---|---|---|
| type | extension of nsdlc:ServiceInfo | | | | | |
| children | interface attribute | | | | | |
| used by | complexType | OctopusPersonalization | | | | |
| attributes | Name | Type | Use | Default | Fixed | Annotation |
| | id | xsd:anyURI | optional | | | |
| | description | xsd:string | optional | | | |
| | service_profile | xsd:anyURI | required | | | |
| | service_category | xsd:anyURI | required | | | |
| | service_type | xsd:anyURI | required | | | | element OctopusPersonalization diagram

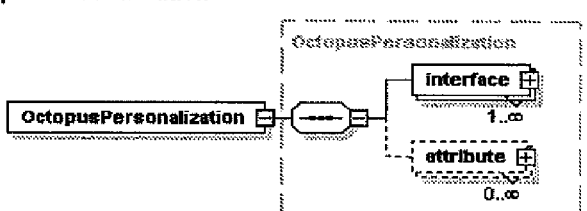

| namespace | http://www.nemo-community.com/schemas/nemo/nsdl/2003/09/drm/svc/ext/octopus | | | | | |
|---|---|---|---|---|---|---|
| type | OctopusPersonalization | | | | | |
| children | interface attribute | | | | | |
| attributes | Name | Type | Use | Default | Fixed | Annotation |
| | id | xsd:anyURI | optional | | | |
| | description | xsd:string | optional | | | |
| | service_profile | xsd:anyURI | required | | | |
| | service_category | xsd:anyURI | required | | | |
| | service_type | xsd:anyURI | required | | | | complexType DeviceAOctopusNode diagram

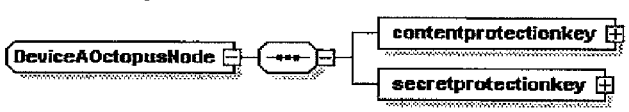

| namespace | http://www.nemo-community.com/schemas/nemo/nsdl/2003/09/drm/svc/ext/octopus | | | | | |
|---|---|---|---|---|---|---|
| type | extension of OctopusNode | | | | | |
| children | contentprotectionkey secretprotectionkey | | | | | |
| attributes | Name | Type | Use | Default | Fixed | Annotation |
| | id | xsd:anyURI | optional | | | |
| | description | xsd:string | optional | | | |
| | nodetype | xsd:anyURI | | | | | element DeviceAOctopusNode/contentprotectionkey diagram 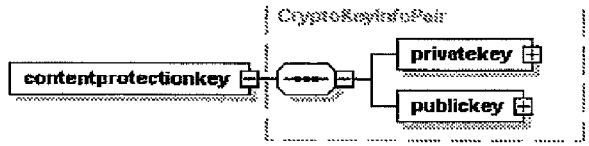

| | |
|---|---|
| namespace | http://www.nemo-community.com/schemas/nemo/nsdl/2003/09/drm/svc/ext/octopus |
| type | CryptoKeyInfoPair |
| children | privatekey publickey | attributes
| Name | Type | Use | Default | Fixed | Annotation |
|---|---|---|---|---|---|
| id | xsd:anyURI | optional | | | |
| description | xsd:string | optional | | | | element DeviceAOctopusNode/secretprotectionkey diagram 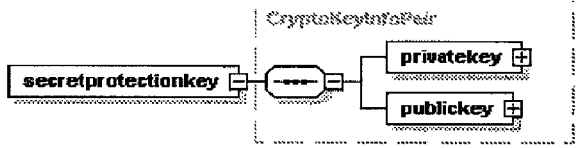

| | |
|---|---|
| namespace | http://www.nemo-community.com/schemas/nemo/nsdl/2003/09/drm/svc/ext/octopus |
| type | CryptoKeyInfoPair |
| children | privatekey publickey | attributes
| Name | Type | Use | Default | Fixed | Annotation |
|---|---|---|---|---|---|
| id | xsd:anyURI | optional | | | |
| description | xsd:string | optional | | | | complexType OctopusDRMinfo diagram 

| | |
|---|---|
| namespace | http://www.nemo-community.com/schemas/nemo/nsdl/2003/09/drm/svc/ext/octopus |
| type | extension of DRMinfo | attributes
| Name | Type | Use | Default | Fixed | Annotation |
|---|---|---|---|---|---|
| id | xsd:anyURI | optional | | | |
| description | xsd:string | optional | | | | complexType OctopusLicense diagram 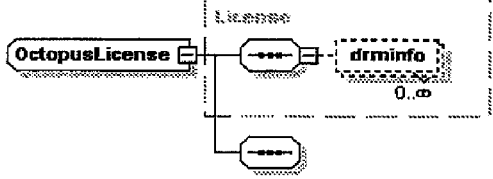

| | |
|---|---|
| namespace | http://www.nemo-community.com/schemas/nemo/nsdl/2003/09/drm/svc/ext/octopus |
| type | extension of License |
| children | drminfo | attributes
| Name | Type | Use | Default | Fixed | Annotation |
|---|---|---|---|---|---|
| id | xsd:anyURI | optional | | | |
| description | xsd:string | optional | | | | complexType OctopusLicenseAcquisition diagram

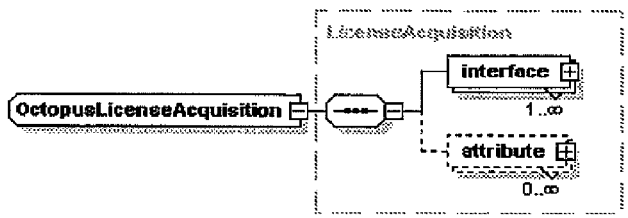

namespace  http://www.nemo-community.com/schemas/nemo/nsdl/2003/09/drm/svc/ext/octopus type  extension of LicenseAcquisition children  interface attribute attributes
| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | complexType OctopusLicenseAcquisitionRequest diagram

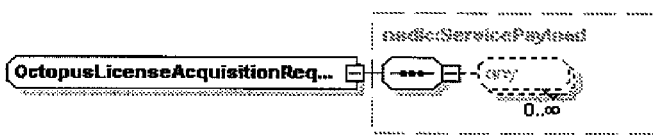

namespace  http://www.nemo-community.com/schemas/nemo/nsdl/2003/09/drm/svc/ext/octopus type  extension of nsdlc:ServicePayload attributes
| Name | Type | Use | Default | Fixed | Annotation |
|---|---|---|---|---|---|
| id | xsd:anyURI | optional | | | |
| description | xsd:string | optional | | | | complexType OctopusLicenseAcquisitionResponse diagram

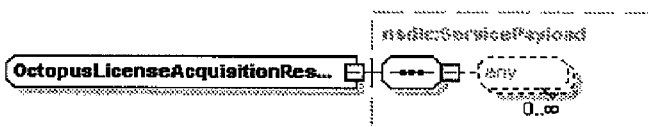

namespace  http://www.nemo-community.com/schemas/nemo/nsdl/2003/09/drm/svc/ext/octopus type  extension of nsdlc:ServicePayload attributes
| Name | Type | Use | Default | Fixed | Annotation |
|---|---|---|---|---|---|
| id | xsd:anyURI | optional | | | |
| description | xsd:string | optional | | | | complexType OctopusLicenseTranslation diagram

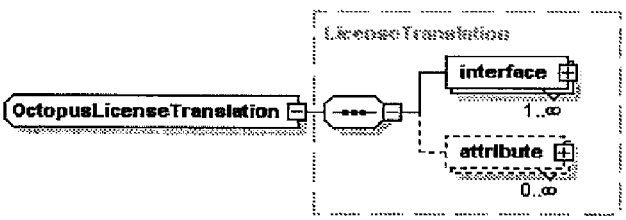

namespace  http://www.nemo-community.com/schemas/nemo/nsdl/2003/09/drm/svc/ext/octopus

| | | | | | | |
|---|---|---|---|---|---|---|
| type | extension of LicenseTranslation | | | | | |
| children | interface attribute | | | | | |
| attributes | Name | Type | Use | Default | Fixed | Annotation |
| | id | xsd:anyURI | optional | | | |
| | description | xsd:string | optional | | | |
| | service_profile | xsd:anyURI | required | | | |
| | service_category | xsd:anyURI | required | | | |
| | service_type | xsd:anyURI | required | | | | complexType OctopusLicenseTranslationRequest diagram

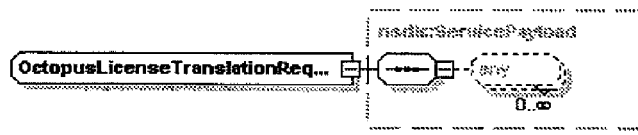

| | |
|---|---|
| namespace | http://www.nemo-community.com/schemas/nemo/nsdl/2003/09/drm/svc/ext/octopus |
| type | extension of nsdlc:ServicePayload |

| attributes | Name | Type | Use | Default | Fixed | Annotation |
|---|---|---|---|---|---|---|
| | id | xsd:anyURI | optional | | | |
| | description | xsd:string | optional | | | | complexType OctopusLicenseTranslationResponse diagram

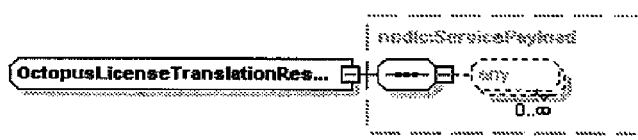

| | |
|---|---|
| namespace | http://www.nemo-community.com/schemas/nemo/nsdl/2003/09/drm/svc/ext/octopus |
| type | extension of nsdlc:ServicePayload |

| attributes | Name | Type | Use | Default | Fixed | Annotation |
|---|---|---|---|---|---|---|
| | id | xsd:anyURI | optional | | | |
| | description | xsd:string | optional | | | | complexType OctopusMembershipToken diagram

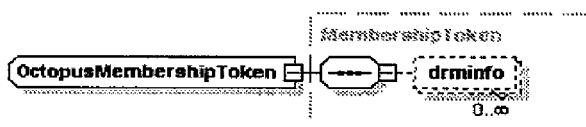

| | |
|---|---|
| namespace | http://www.nemo-community.com/schemas/nemo/nsdl/2003/09/drm/svc/ext/octopus |
| type | extension of MembershipToken |
| children | drminfo |

| attributes | Name | Type | Use | Default | Fixed | Annotation |
|---|---|---|---|---|---|---|
| | id | xsd:anyURI | optional | | | |
| | description | xsd:string | optional | | | | complexType OctopusNode diagram 

namespace http://www.nemo-community.com/schemas/nemo/nsdl/2003/09/drm/svc/ext/octopus type extension of nsdlc:Base used by element OctopusPersonalizationResponse/personalitynode
complexType DeviceAOctopusNode attributes

| Name | Type | Use | Default | Fixed | Annotation |
|---|---|---|---|---|---|
| id | xsd:anyURI | optional | | | |
| description | xsd:string | optional | | | |
| nodetype | xsd:anyURI | | | | | complexType OctopusPersonality diagram 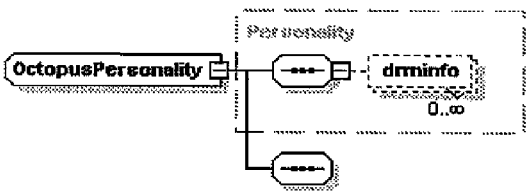

namespace http://www.nemo-community.com/schemas/nemo/nsdl/2003/09/drm/svc/ext/octopus type extension of Personality children drminfo attributes

| Name | Type | Use | Default | Fixed | Annotation |
|---|---|---|---|---|---|
| id | xsd:anyURI | optional | | | |
| description | xsd:string | optional | | | | complexType OctopusPersonalization diagram 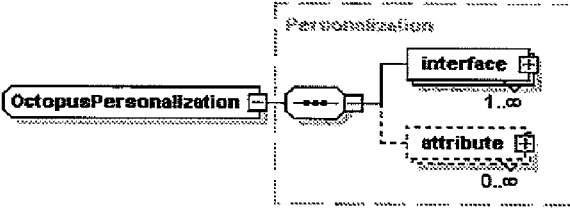

namespace http://www.nemo-community.com/schemas/nemo/nsdl/2003/09/drm/svc/ext/octopus type extension of Personalization children Interface attribute used by element OctopusPersonalization attributes

| Name | Type | Use | Default | Fixed | Annotation |
|---|---|---|---|---|---|
| id | xsd:anyURI | optional | | | |
| description | xsd:string | optional | | | |
| service_profile | xsd:anyURI | required | | | |
| service_category | xsd:anyURI | required | | | |
| service_type | xsd:anyURI | required | | | | complexType OctopusPersonalizationRequest diagram

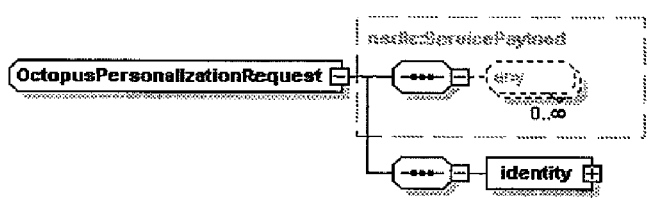

namespace http://www.nemo-community.com/schemas/nemo/nsdl/2003/09/drm/svc/ext/octopus type extension of nsdlc:ServicePayload children identity attributes
| Name | Type | Use | Default | Fixed | Annotation |
|---|---|---|---|---|---|
| id | xsd:anyURI | optional | | | |
| description | xsd:string | optional | | | | element OctopusPersonalizationRequest/identity diagram

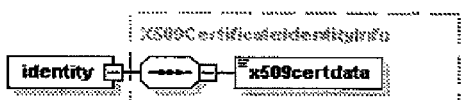

namespace http://www.nemo-community.com/schemas/nemo/nsdl/2003/09/drm/svc/ext/octopus type X509CertificateIdentityInfo children x509certdata attributes
| Name | Type | Use | Default | Fixed | Annotation |
|---|---|---|---|---|---|
| id | xsd:anyURI | optional | | | |
| description | xsd:string | optional | | | | complexType OctopusPersonalizationResponse diagram

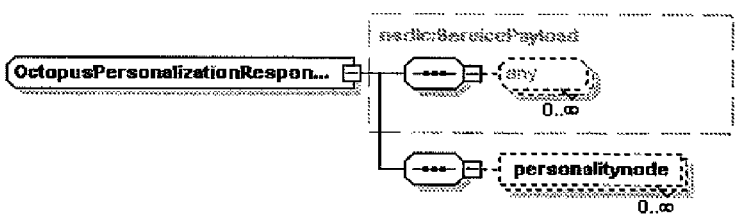

namespace http://www.nemo-community.com/schemas/nemo/nsdl/2003/09/drm/svc/ext/octopus type extension of nsdlc:ServicePayload children personalitynode attributes
| Name | Type | Use | Default | Fixed | Annotation |
|---|---|---|---|---|---|
| id | xsd:anyURI | optional | | | |
| description | xsd:string | optional | | | | element OctopusPersonalizationResponse/personalitynode diagram

namespace http://www.nemo-community.com/schemas/nemo/nsdl/2003/09/drm/svc/ext/octopus type OctopusNode attributes
| Name | Type | Use | Default | Fixed | Annotation |
|---|---|---|---|---|---|
| id | xsd:anyURI | optional | | | |
| description | xsd:string | optional | | | |
| nodetype | xsd:anyURI | | | | |

Profile Schemas

*Core Profile* schema location: C:\ws\nemo\schema\nemo-schema-core-01.xsd
targetNamespace: http://www.nemo-community.com/schemas/nemo/nsdl/2003/09/core

| Elements | Complex types | Simple types |
|---|---|---|
| Base | Base | MessageUsage |
| | Evidence | |
| | InterfaceBinding | |
| | Node | |
| | NodeIdentityInfo | |
| | Policy | |
| | ServiceAttribute | |
| | ServiceAttributeValue | |
| | ServiceInfo | |
| | ServiceMessage | |
| | ServicePayload | |
| | Status | |
| | TargetCriteria | |

*Core Profile Extension* schema location: C:\ws\nemo\schema\nemo-schema-core-extension-01.xsd
targetNamespace: http://www.nemo-community.com/schemas/nemo/nsdl/2003/09/core/ext/01

Complex types
NodeIdentityInfoTargetCriteria
ReferenceNodeIdentityInfo
SAMLAssertionEvidence
SAMLAssertionPolicy
SimpleIdIdentityInfo
SimpleNamedNode
SimplePropertyTypeTargetCriteria
SimpleSerialNumberNodeIdentityInfo
SimpleServiceTypeTargetCriteria
StringServiceAttributeValue
WebServiceInterfaceBinding
WebServiceInterfaceBindingLiteral
WebServiceInterfaceBindingWSDL
WSPolicyAssertionEvidence
WSPolicyAssertionPolicy
X509CertificateIdentityInfo

*Core Service Profile* schema location: C:\ws\nemo\schema\nemo-schema-core-service-01.xsd
targetNamespace: http://www.nemo-community.com/schemas/nemo/nsdl/2003/09/core/svc Complex types
Authorization
Notification
PeerDiscovery
ServiceDiscovery

Core Service Profile Extension schema location: C:\ws\nemo\schema\nemo-schema-core-service-extension-01.xsd
targetNamespace: http://www.nemo-community.com/schemas/nemo/nsdl/2003/09/core/svc/ext/01

Complex types
AttributeBasedServiceDiscovery
AttributeBasedServiceDiscoveryRequest
AttributeBasedServiceDiscoveryResponse
ServiceInterfaceAuthorization
ServiceInterfaceAuthorizationRequest
ServiceInterfaceAuthorizationResponse
UDDIBasedServiceDiscovery
UDDIBasedServiceDiscoveryRequest
UDDIBasedServiceDiscoveryResponse
UDDIKeyedReference
UPnPPeerDiscovery
UPnPPeerDiscoveryRequest
UPnPPeerDiscoveryResponse

Simple types
UPnPPeerSearchMethod
UPnPPeerSearchTarget

DRM Profile schema location: C:\ws\nemo\schema\nemo-schema-drm-01.xsd
targetNamespace: http://www.nemo-community.com/schemas/nemo/nsdl/2003/09/drm Complex types
CryptoKeyInfo
CryptoKeyInfoPair
DRMInfo
License
MembershipToken
Personality

DRM Profile Extension schema location: C:\ws\nemo\schema\nemo-schema-drm-extension-01.xsd
targetNamespace: h/pt   . .nemo-community.com/schemas/nemo/nsdl/2003/09/drm/ext/01

DRM Service Profile schema location: C:\ws\nemo\schema\nemo-schema-drm-service-01.xsd
targetNamespace: http://www.nemo-community.com/schemas/nemo/nsdl/2003/09/drm/svc Complex types
LicenseAcquisition
LicenseTranslation
MembershipTokenAcquisition
Personalization

*Octopus DRM Profile* schema location: C:\ws\nemo\schema\nemo-schema-drm-service-extension-octopus.xsd
targetNamespace: http://www.nemo-community.com/schemas/nemo/nsdl/2003/09/drm/svc/ext/octopus Elements
OctopusPersonalization

Complex types
DeviceAOctopusNode
OctopusDRMInfo
OctopusLicense
OctopusLicenseAcquisition
OctopusLicenseAcquisitionRequest
OctopusLicenseAcquisitionResponse
OctopusLicenseTranslation
OctopusLicenseTranslationRequest
OctopusLicenseTranslationResponse
OctopusMembershipToken
OctopusNode
OctopusPersonality
OctopusPersonalization
OctopusPersonalizationRequest
OctopusPersonalizationResponse

Although the foregoing has been described in some detail for purposes of clarity, it will be apparent that certain changes and modifications may be practiced within the scope of the appended claims. It should be noted that there are many alternative ways of implementing both the processes and apparatuses of the present inventions. Accordingly, the present embodiments are to be considered as illustrative and not restrictive, and the inventive body of work is not to be limited to the details given herein, but may be modified within the scope and equivalents of the appended claims.

What is claimed is:

1. A method of accessing content according to a DRM policy, comprising:
   communicating, using a service access point of a device, with one or more web services agents to receive:
      a content object including an encrypted content item,
      a license object comprising a control object including a control program containing instructions for querying an authorization graph for an existence of a path from a first node to a second node, and a content key object including an encrypted content key for decrypting the encrypted content item,
      a first link object associated with a validity constraint comprising authorization conditions governing the use of a first link key to sign the first link object, the authorization conditions expressed by a control program, a certificate for the first link key comprising the constraint program;
   determining authorization to access the encrypted content item using a DRM engine on the device, the DRM engine requesting cryptographic services from a host environment, comprising:
      verifying, by the DRM engine, the license object,
      validating, by the DRM engine, the first link object according to the validity constraint and cryptographic services requested from the host environment, validation comprising:
         determining satisfaction of the authorization conditions for the first link key by executing the constraint program using the DRM engine,
         verifying the certificate for the first link key based on satisfaction of the authorization conditions using the cryptographic services, and
         validating the first link object based on verification of the certificate using the DRM engine,
      constructing, by the DRM engine, an authorization graph comprising nodes connected by links, construction using valid link objects, the valid link objects comprising the first link object, and
      querying, by the DRM engine, the authorization graph by executing the control program and determining by the control program the existence of the path from the first node to the second node;
   providing by the DRM engine based on a result of the query:
      an indication that the encrypted content item may be accessed, and
      a decrypted version of the encrypted content key for decrypting the encrypted content item;
   generating a decrypted version of the encrypted content item by decrypting the encrypted content item using the decrypted version of the encrypted content key, based on the indication;
   and
   accessing the decrypted version of the encrypted content item based on the indication.

2. The method of claim 1, wherein executing the control program comprises using a virtual machine to execute the control program and validating the first link object comprises using the virtual machine to validate the first link object according to the validity constraint.

3. The method of claim 1, wherein requesting cryptographic services from the host environment comprises requesting cryptographic services indirectly from a cryptographic services module of the host environment using a host services module.

4. The method of claim 1, wherein the DRM engine indirectly requests information for validating the first link object from the one or more web services agents using a host services module and the service access point.

5. The method of claim 1, wherein the DRM engine indirectly provides the content key for decrypting the encrypted content item to a host application using a host services module.

6. The method of claim 1, wherein the requested cryptographic services comprise decryption of the encrypted content key.

7. The method of claim 1, wherein the instructions for querying an authorization graph comprise byte code executed by the DRM engine.

8. The method of claim 1, wherein:
   the license object further comprises a controller object binding the control object to the contentkey object, and a protector object binding the contentkey contentkey object to the content object, and
   verifying the license object comprises verifying the binding between the control object and the contentkey object and verifying the binding between the contentkey object and the content object.

9. The method of claim 8, wherein:
   the content object further comprises a content object id,
   the control object further comprises a control object id,
   the contentkey object further comprises a contentkey id,
   the controller object further comprises a reference to the control object id, and a controller reference to the contentkey id,
   the protector object further comprises a protector reference to the contentkey id and a reference to the content object,
   the binding between the control object and the contentkey object is verified based on the controller reference to the contentkey id and the reference to the control object id, and
   the binding between the contentkey object and the content object is verified based on the protector reference to the contentkey id and the reference to the content object id.

10. The method of claim 9, wherein the controller object further includes a hash of the control object and a hash of the contentkey object, and verifying the license object further comprises:
   verifying the control object using the hash of the control object included in the controller object, and
   verifying the contentkey object using the hash of the contentkey object included in the controller object.

11. The method of claim 9, wherein the controller object is digitally signed using a message authentication code keyed with a key that encrypted the content key, and verifying the license object further comprises verifying the digital signature of the controller object.

12. The method of claim 9, wherein the controller object is digitally signed using a private key, and the controller object binds the private key to the content key based on a hash of the signing private key, and verifying the license object further comprises verifying the digital signature of the controller object.

13. The method of claim 1, wherein:
a first node object includes first node attributes;
a second node object includes second node attributes;
the first link object represents a relationship between the first node and the second node and references the first node attributes and the second node attributes; and
the validity constraint depends on the first node attributes and the second node attributes.

14. The method of claim 13, wherein a DRM profile defines the first node attributes and the second node atributes.

15. The method of claim 13, wherein a DRM profile defines a semantics of the relationship represented by the first link object.

16. The method of claim 15, wherein the DRM profile defines the relationship as an ownership relationship.

17. The method of claim 15, wherein the DRM profile defines the relationship as a membership relationship.

18. The method of claim 15, wherein the DRM policy imposes the validity constraint based the semantics defined by the DRM profile.

19. The method of claim 18, wherein the DRM profile is expressed in WSDL and the first node object and the second node object are web services agents.

20. A non-transitory computer readable medium containing instructions that, when executed by a processor of a device, cause the device to perform operations comprising:
communicating, using a service access point of a device, with one or more web services agents to receive:
a content object including an encrypted content item,
a license object comprising a control object including a control program containing instructions for querying an authorization graph for an existence of a path from a first node to a second node, and a contentkey object including an encrypted content key for decrypting the encrypted content item,
a first link object associated with a validity constraint comprising authorization conditions governing the use of a first link key to sign the first link object, the authorization conditions expressed by a control program, a certificate for the first link key comprising the constraint program;
determining authorization to access the encrypted content item using a DRM engine on the device, comprising:
verifying, by the DRM engine, the license object,
validating, by the DRM engine, the first link object according to the validity constraint and cryptographic services requested by the DRM engine from a cryptographic services module of a host environment indirectly using a host services module, validation comprising:
determining satisfaction of the authorization conditions for the first link key by executing the constraint program using the DRM engine,
verifying the certificate for the first link key based on satisfaction of the authorization conditions using the cryptographic services, and
validating the first link object based on verification of the certificate using the DRM engine,
constructing, by the DRM engine, an authorization graph comprising nodes connected by links, construction using valid link objects, the valid link objects comprising the first link object, and
querying, by the DRM engine, the authorization graph by executing the control program and determining by the control program the existence of the path from the first node to the second node;
providing by the DRM engine based on a result of the query:
an indication that the encrypted content item may be accessed, and
a decrypted version of the encrypted content key for decrypting the encrypted content item;
generating a decrypted version of the encrypted content item by decrypting the encrypted content item using the decrypted version of the encrypted content key, based on the indication; and
accessing the decrypted version of the encrypted content item based on the indication.

21. The non-transitory computer readable medium of claim 20, wherein the instructions for querying an authorization graph comprise byte code executed by the DRM engine.

22. The non-transitory computer readable medium of claim 20, wherein:
the content object further comprises a content object id,
the control object further comprises a control object id,
the contentkey object further comprises a contentkey id,
the license object further comprises:
a controller object binding the control object to the contentkey object and including a controller reference to the control object id and a reference to the contentkey id, and
a protector object binding the contentkey object to the content object and including a protector reference to the contentkey id and a reference to the content object; and
verifying the license object comprises:
verifying the binding between the control object and the contentkey object based on the controller reference to the contentkey id and the reference to the control object id, and
verifying the binding between the contentkey object and the content object based on the protector reference to the contentkey id and the reference to the content object id.

23. The non-transitory computer readable medium of claim 20, wherein:
a first node object includes first node attributes;
a second node object includes second node attributes;
the first link object represents a relationship between the first node and the second node and references the first node attributes and the second node attributes; and
the validity constraint depends on the first node attributes and the second node attributes.

24. The non-transitory computer readable medium of claim 23, wherein the first node object and the second node object are web services agents, and the validity constraint implements a DRM policy according to a DRM profile expressed in WSDL that defines a semantics of the relationship represented by the first link object.

25. A device for obtaining and accessing a content item, comprising:
at least one processer, and
a non-transitory computer memory containing instructions that, when executed by the at least one processor, cause the device to perform operations comprising:
communicating, using a service access point of a device, with one or more web services agents to receive:
a content object including an encrypted content item,
a license object comprising a control object including a control program containing instructions for querying an authorization graph for an existence of a path from a first node to a second node, and a contentkey object including an encrypted content key for decrypting the encrypted content item, and a first link object associated with a validity constraint comprising authorization conditions governing the use of a first link key to sign the first link object, the authorization conditions expressed by a control program, a certificate for the first link key comprising the constraint program;

determining authorization to access the encrypted content item using a DRM engine on the device, comprising:

verifying, by the DRM engine, the license object, validating, by the DRM engine, the first link object according to the validity constraint and cryptographic services requested by the DRM engine from a cryptographic services module of a host environment indirectly using a host services module, validation comprising:

determining satisfaction of the authorization conditions for the first link key by executing the constraint program using the DRM engine, verifying the certificate for the first link key based on satisfaction of the authorization conditions using the cryptographic services, and validating the first link object based on verification of the certificate using the DRM engine, constructing, by the DRM engine, an authorization graph comprising nodes connected by links, construction using valid link objects, the valid link objects comprising the first link object, and querying, by the DRM engine, the authorization graph by executing the control program and determining by the control program the existence of the path from the first node to the second node;

providing, by the DRM engine, based on a result of the query:

an indication that the encrypted content item may be accessed, and a decrypted version of the encrypted content key for decrypting the encrypted content item;

generating a decrypted version of the encrypted content item by decrypting the encrypted content item using the decrypted version of the encrypted content key, based on the indication; and accessing the decrypted version of the encrypted content item based on the indication.

26. The device of claim 25, wherein the instructions for querying an authorization graph comprise byte code executed by the DRM engine.

27. The device of claim 25, wherein:
the content object further comprises a content object id,
the control object further comprises a control object id,
the contentkey object further comprises a contentkey id,
the license object further comprises:
a controller object binding the control object to the contentkey object and including a reference to the control object id and a reference to the contentkey id, and
a protector object binding the contentkey object to the content object and including a reference to the contentkey id and a reference to the content object; and
verifying the license object comprises:
verifying the binding between the control object and the contentkey object based on the reference to the contentkey id and the reference to the control object id, and
verifying the binding between the contentkey object and the content object based on the reference to the contentkey id and the reference to the content object id.

28. The device of claim 25, wherein:
a first node object includes first node attributes;
a second node object includes second node attributes;
the first link object represents a relationship between the first node and the second node and references the first node attributes and the second node attributes; and
the validity constraint depends on the first node attributes and the second node attributes.

29. The device of claim 28, wherein the first node object and the second node object are web services agents, and the validity constraint implements a DRM policy according to a DRM profile expressed in WSDL that defines a semantics of the relationship represented by the first link object.

* * * * *